United States Patent [19]

Moe et al.

[11] 4,189,752
[45] Feb. 19, 1980

[54] ELECTRONIC SCREENING WITH GALVANOMETER RECORDERS

[75] Inventors: William W. Moe, Stratford; Robert W. Lotz, Darien; Ethan R. Green, Monroe; Rodolfo Fazio, Southport, all of Conn.

[73] Assignee: Printing Developments, Inc., New York, N.Y.

[21] Appl. No.: 936,810

[22] Filed: Aug. 25, 1978

Related U.S. Application Data

[60] Continuation of Ser. No. 714,483, Aug. 16, 1976, abandoned, which is a division of Ser. No. 414,798, Nov. 12, 1973, Pat. No. 3,983,319.

[51] Int. Cl.² .................................................. H04N 1/22
[52] U.S. Cl. ..................................... 358/298; 358/302; 346/109
[58] Field of Search ............... 358/298, 302, 297, 296, 358/299, 283, 285, 289; 179/100.3 H, 100.31; 346/109, 108, 76 L; 365/120, 215

[56] References Cited

U.S. PATENT DOCUMENTS

| | | | |
|---|---|---|---|
| 2,818,465 | 12/1957 | Brink | 358/298 |
| 3,153,698 | 10/1964 | Hall | 358/298 |
| 3,197,558 | 7/1965 | Ernst | 358/283 |
| 3,413,411 | 11/1968 | Stauffer | 358/302 |
| 3,506,779 | 4/1970 | Brown | 358/297 |
| 3,627,908 | 12/1971 | Dalley | 355/32 |
| 3,636,251 | 1/1972 | Daly | 358/298 |
| 3,646,262 | 2/1972 | Moe | 358/298 |
| 3,887,939 | 6/1975 | Hart | 358/901 |
| 3,956,587 | 5/1976 | Nelson | 358/901 |
| 3,983,319 | 9/1976 | Moe | 358/298 |

FOREIGN PATENT DOCUMENTS

| | | | |
|---|---|---|---|
| 1772022 | 8/1970 | Fed. Rep. of Germany | 358/296 |
| 2012728 | 9/1971 | Fed. Rep. of Germany | 358/296 |
| 2208658 | 9/1973 | Fed. Rep. of Germany | 358/296 |
| 1605174 | 5/1973 | France | 358/296 |
| 6804028 | 3/1977 | Netherlands | 358/296 |
| 656235 | 8/1951 | United Kingdom | 358/296 |
| 1181153 | 2/1970 | United Kingdom | 358/296 |
| 1206681 | 9/1970 | United Kingdom | 358/296 |

Primary Examiner—Bernard Konick
Assistant Examiner—Alan Faber
Attorney, Agent, or Firm—Brumbaugh, Graves, Donohue & Raymond

[57] ABSTRACT

A continuous-tone image, which can be in full color, is scanned to produce color-separation images in halftone dots. Edges of features in the scanned image are sensed, and the positions and shapes of the halftone dots that define corresponding edges in the halftone reproductions are adjusted so that they conform better to the feature edges. This reduces or eliminates the apparent serrations or roughness of feature edges in the halftone reproductions otherwise caused by misalignment of the halftone dots with the feature edges and improves image definition.

7 Claims, 41 Drawing Figures

CONTROLLER BLOCK DIAGRAM

60°-75°-105°-120° DOT FORMING BLOCK DIAGRAM

45° DOT FORMING CIRCUITRY DIAGRAM

90° DOT FORMING CIRCUITRY DIAGRAM

DOT OFFSET LOGIC SCHEMATIC

I/O BOARD BLOCK DIAGRAM

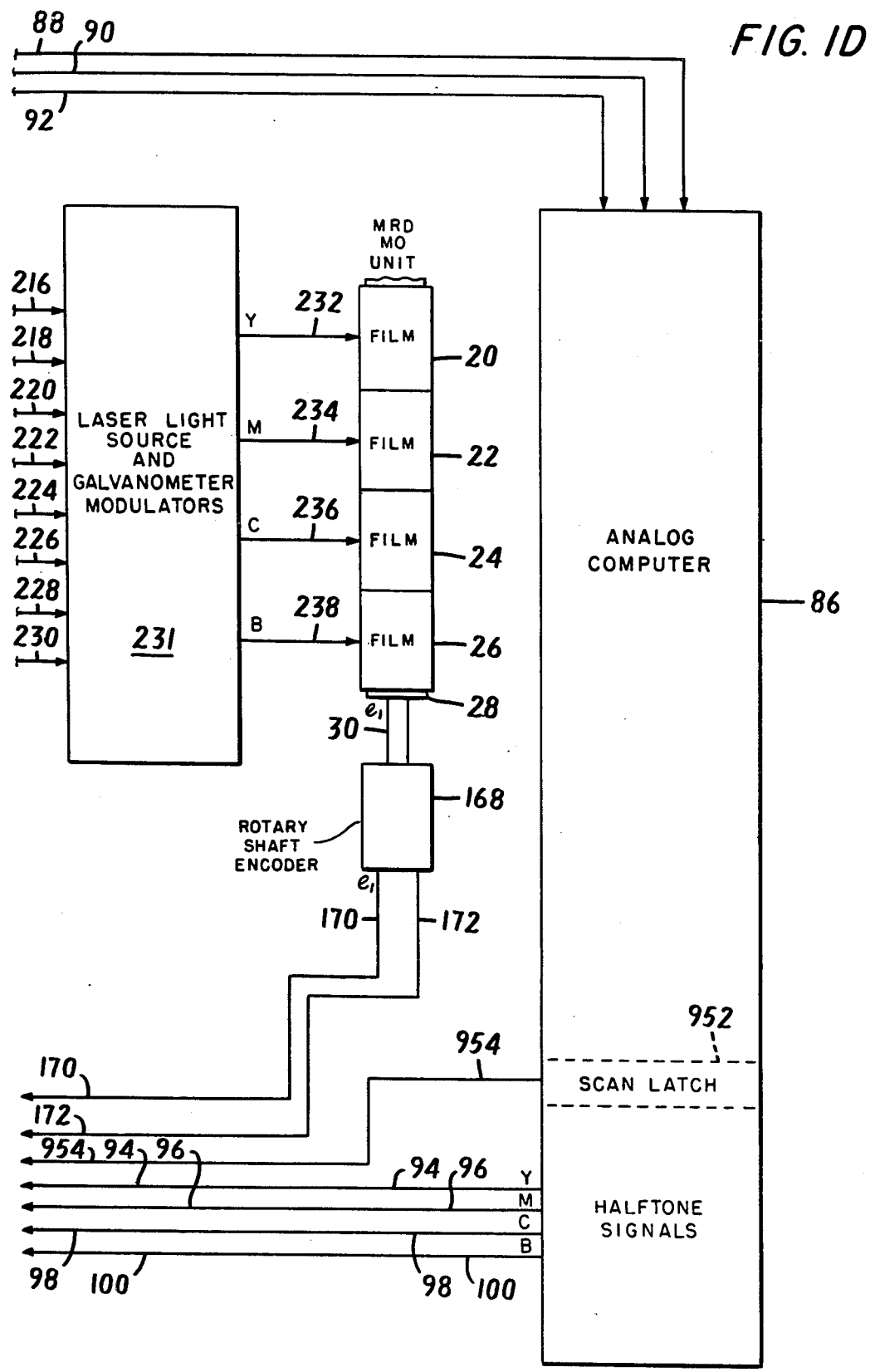

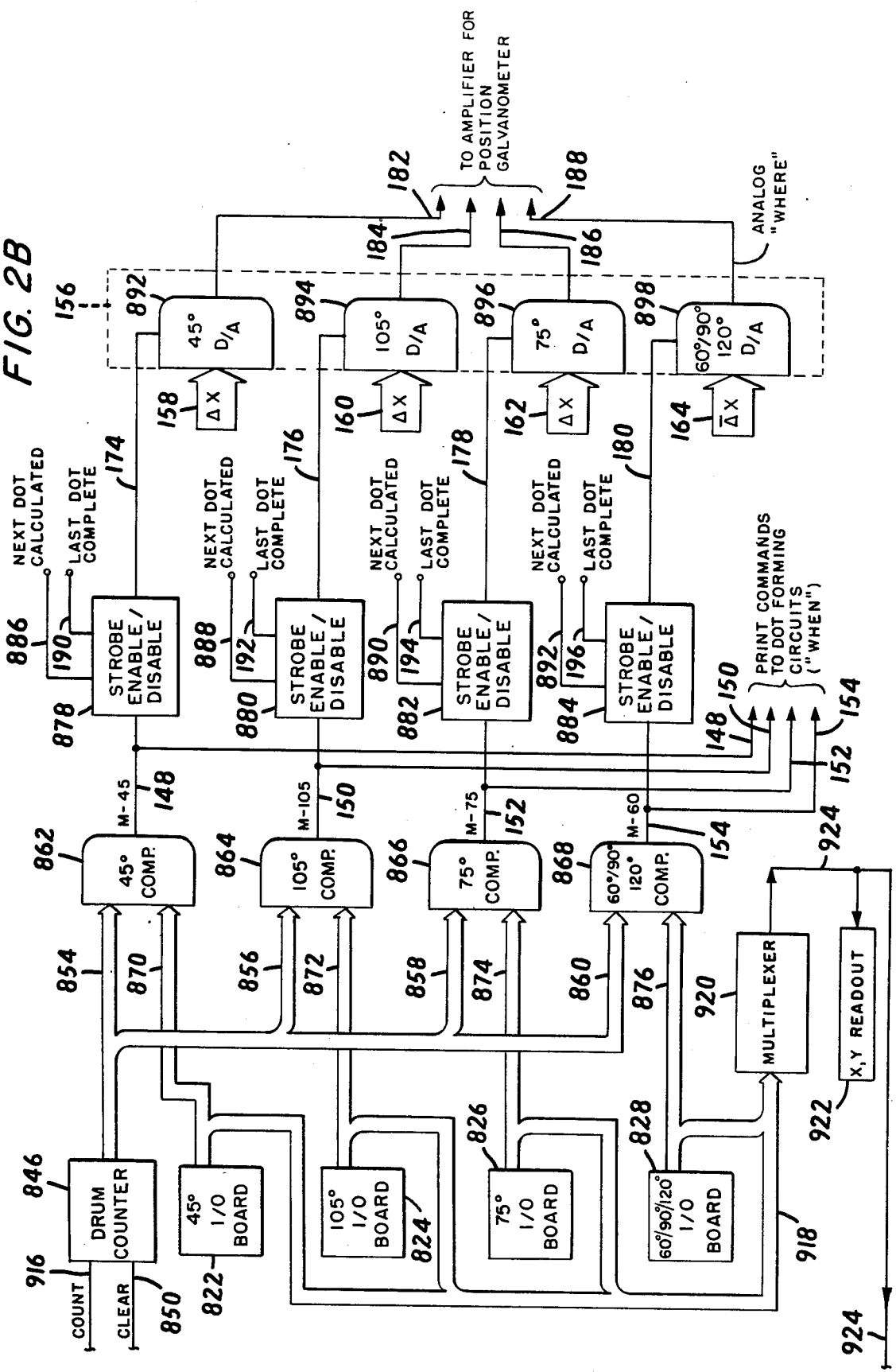

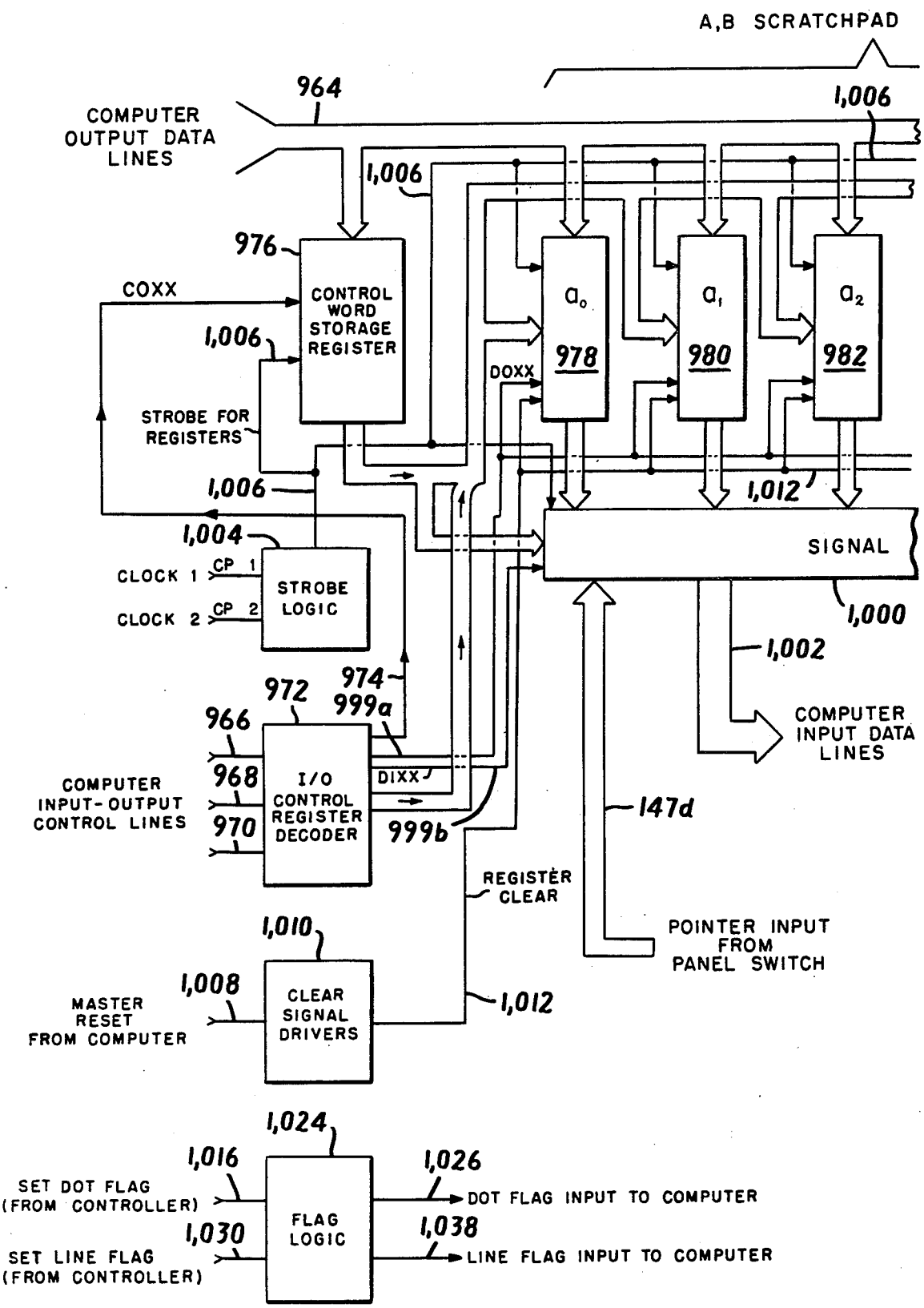

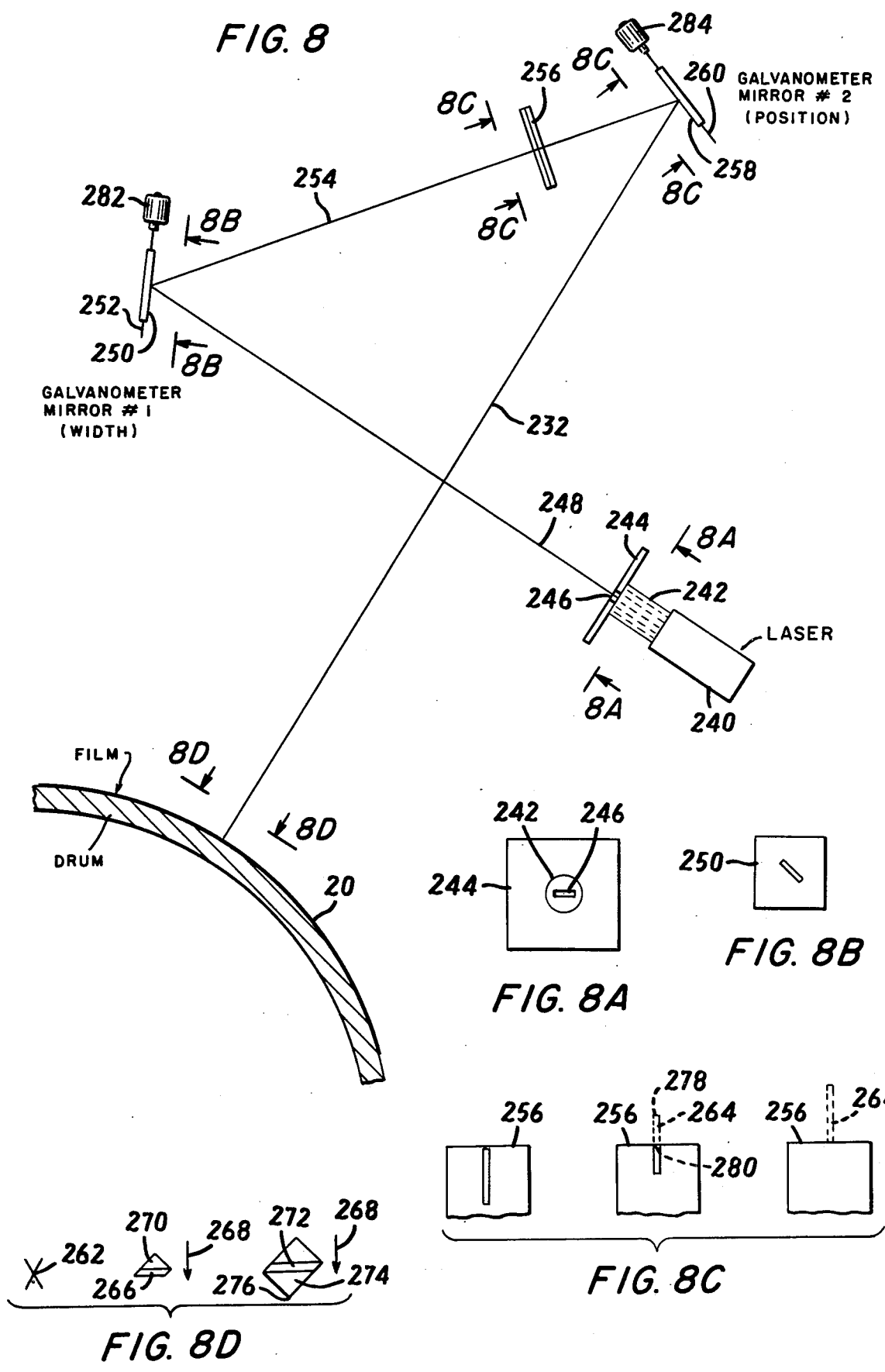

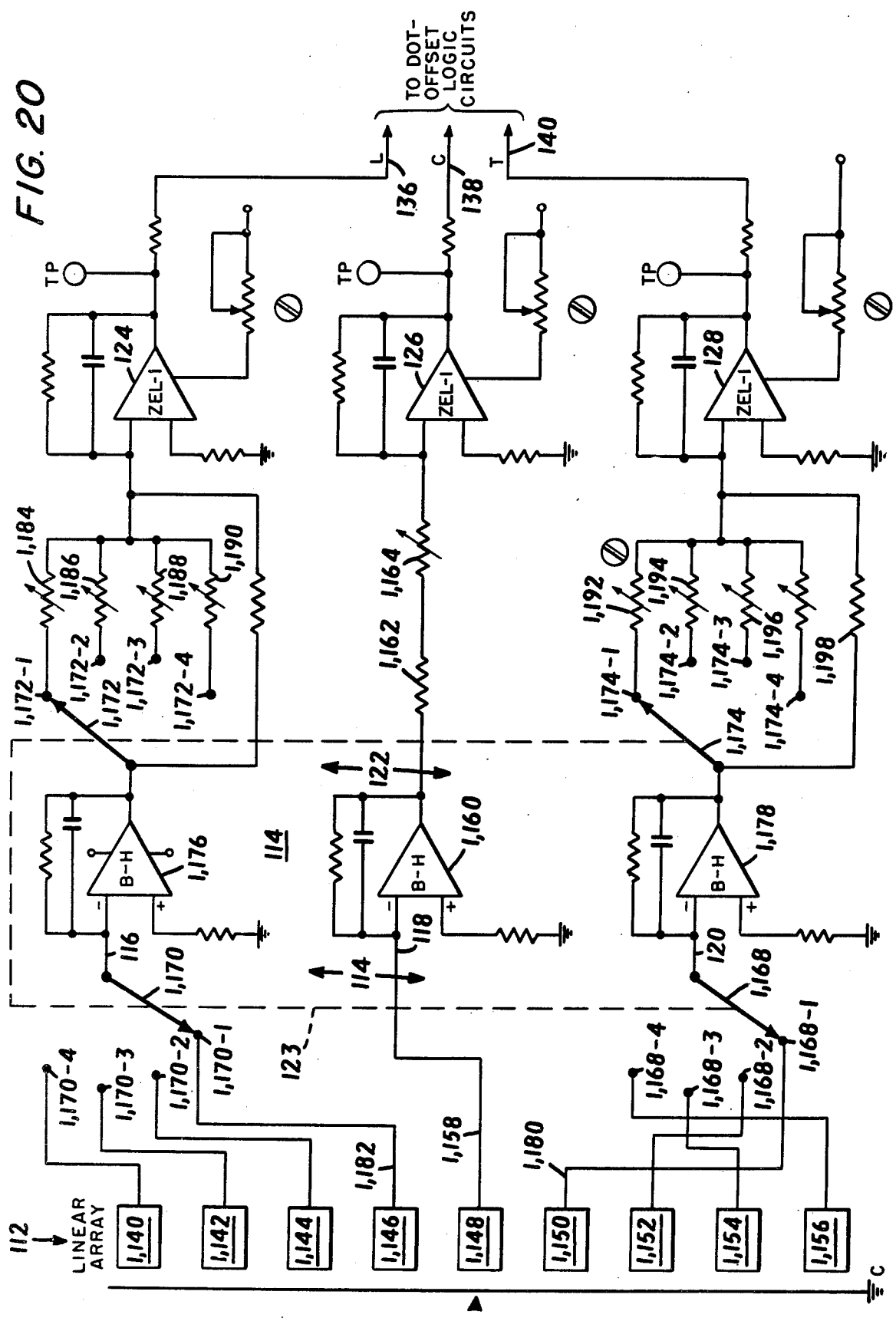

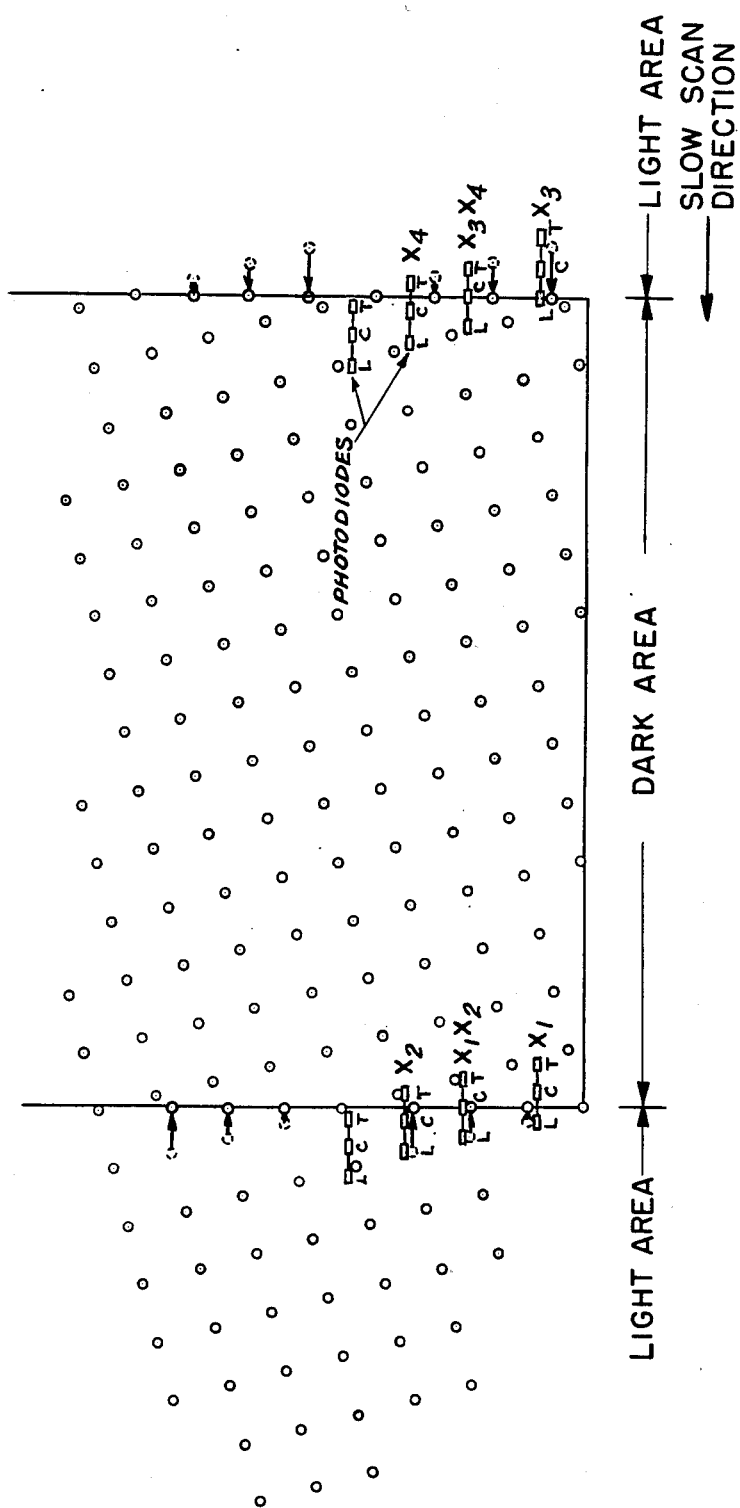

ELECTRONIC SCREENING WITH GALVANOMETER RECORDERS

This is a continuation of application Ser. No. 714,483, filed Aug. 16, 1976, now abandoned, which is in turn a division of application Ser. No. 414,798, filed on Nov. 12, 1973, now U.S. Pat. No. 3,983,319.

BACKGROUND OF THE INVENTION

This invention relates to the electronic reproduction of images and, more particularly, to novel and highly-effective methods and apparatus facilitating high-quality halftone reproduction of images in color or black and white for use in the printing art.

For many years the reproduction of images for use in the printing art was done without the benefit of electronics. Recently, electronic reproduction techniques have been developed, including means for halftone reproduction.

Modern electronic screening techniques obviate the physical devices such as halftone screens otherwise required in order to form the dot structure. Even the most advanced techniques heretofore have suffered, however, from serious deficiencies. For example, in conventional practice, the locations of the dots and the features of the images have an essentially random relation with respect to each other. This randomness results in a visible roughness, serration, or fuzziness of feature edges that should be smooth and sharp. Various proposals have been made for modifying the dot structure so that the edges of features in the images are made sharper, but the best dot structure heretofore achieved leaves a roughness or fuzziness of edges that remains noticeable at the screen rulings generally used. Very fine rulings can be used to achieve sharp edges, but this causes the printing inks to tend to bridge the dots and greatly increases the cost.

SUMMARY OF THE INVENTION

An object of the invention is to remedy the problems outlined above and, in particular, to provide a method and apparatus that can be used for improved halftone reproduction of images in color or black and white.

Another object of the invention is to provide a technique for adjusting the dot positions in halftone reproduction so that the edges of features in the images have no noticeable serrations or roughness attributable to misalignment of the dots with edges of features in the images.

Another object of the invention is to make color-separation images for halftone reproduction in which the exposing dots are sharply defined.

The foregoing and other objects of the invention are attained by providing apparatus for halftone reproduction of images in color or black and white, by repositioning the dots defining the edges of features in the images so that they lie substantially along lines coincident with the edges, and by employing lasers and galvanometer modulators to form the image reproductions.

BRIEF DESCRIPTION OF THE DRAWING

A better understanding of the invention can be gained from a consideration of the following detailed description of the preferred embodiments thereof in conjunction with the appended figures of the drawing, wherein:

FIGS. 1A through D when arranged according to FIG. 1 constitute a block diagram of a preferred embodiment of apparatus in accordance with the invention for making four halftone color-separation reproductions from an original full-color image;

FIG. 8 is a more detailed diagram of a portion of the apparatus of FIGS. 1A-D including laser beams modulated by position and width galvanometers for recording the images;

FIGS. 8A through D are views taken respectively along the lines 8A—8A through 8D—8D in FIG. 8 and looking in the directions of the arrows;

FIG. 20 is a schematic view of dot-shaping electro-optical means and dot-shaping preamplifiers according to the invention; and FIG. 21 is a schematic view showing the displacements of the dots in light-to-dark and dark-to-light transitions.

DESCRIPTION OF THE PREFERRED EMBODIMENTS

In the following description of the preferred embodiments of the invention, reference will be first to FIGS. 1A-D, in which various subsystems are illustrated as "blackboxes" respectively labeled "dot-forming circuits", "dot-offset circuits", etc. Then a description of the various subsystems will be given with reference to other figures, which illustrate the "insides" of the black boxes. A number of patents will also be cited for supplemental descriptions of various details known to those skilled in the art.

I. General Description

Figure 1A:
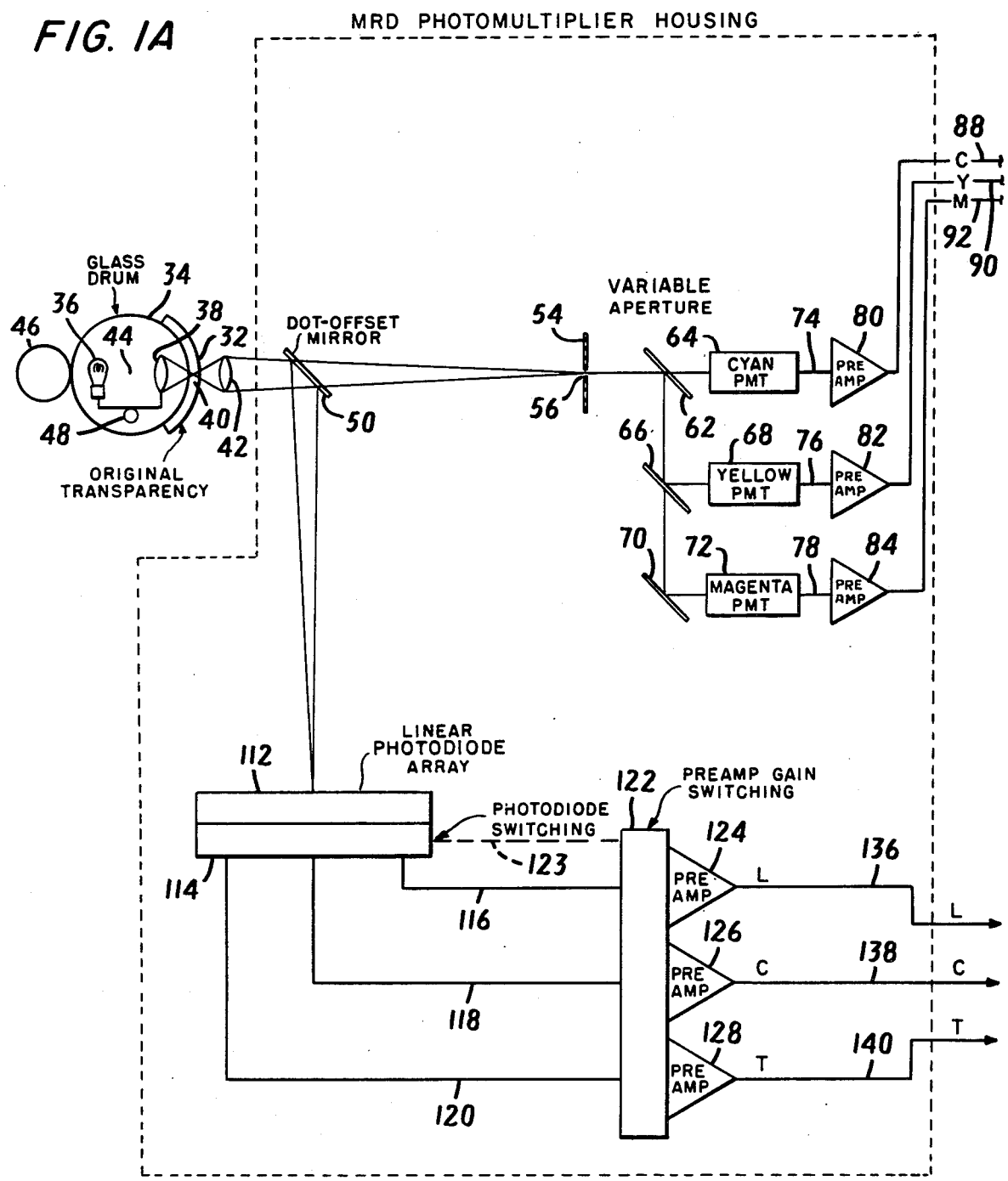

FIGS. 1A-D disclose in broad outline the method and apparatus in accordance with the invention for producing four halftone color-separation images 20, 22, 24, 26 mounted on a drum 28 rotatable about a shaft 30 and representing, respectively, the yellow, magenta, cyan, and black content of an original photograph or drawing 32, such as a 35-mm transparency (FIG. 1A). The color-separation images 20, 22, 24, 26 can be optically reproduced or formed by engraving, and the original 32 can be opaque or transparent. For purposes of illustration, the color-separation images 20, 22, 24, 26 are represented as optically-formed photographic images, and the original 32 is represented as a full-color transparency.

The original transparency 32 is mounted in any suitable conventional manner on a glass drum or other transparent member 34 within which are a light source 36 and a positive lens 38. The latter forms an image of the light 36 on a portion 40 of the transparency 32. The portion 40 is not a mere point but has an area sufficient to illuminate considerable detail in the transparency 32. A projection lens 42 projects an image of the portion of the transparency 32 illuminated by the light 36, and the projected image is divided by a number of dichroic mirrors for different purposes described below. In place of the dichroic mirrors, any other suitable conventional beam-splitting device can be used, such as a prism or a half-silvered mirror in combination with a color filter.

If an opaque image is employed in place of the transparency 32, then the light 36 and the positive lens 38 are mounted on the same side of the image as the projection lens 42, but the principle of operation is otherwise the same.

The glass drum 34 is rotated about its axis 44 by motive means 46 so that the illuminated portion 40 effectively scans the transparency 32 along a scan line extending circumferentially of the drum. Furthermore, the light 36 and lens 38 are displaced a push distance P (typically equal to 1/439 inches; the push distance P is represented also by the vertical lines in FIG. 19) in a direction parallel to the drum axis 44 during each rotation of the drum by means such as a lead screw 48 (FIG. 1A), so that the line scan is developed as a raster scan and the entire surface of the transparency 32 is scanned line by line. The diameter of the illuminated portion 40 of the transparency 32 is considerably greater than, and preferably at least twenty times, the distance between push lines (scan lines), so that various techniques for image enhancement can be employed.

The purpose, of course, is to produce the four monochromatic color-separation images 20, 22, 24, 26 of a four-color printing system, each being responsive to information in the transparency 32 transmitted in a different region of the electromagnetic spectrum. For example, the image 20 records in black and white the yellow information in the transparency 32; the image 22 records in black and white the magenta information in the transparency 32; the image 24 records in black and white the cyan information in the transparency 32; and the image 26 records in black and white the black information in the transparency 32.

Theoretically, the black information, which relates only to brightness and not saturation or hue, is not necessary, since the three primary colors yellow, magenta, and cyan collectively carry information relating to not only the saturation and hue but also the brightness of the transparency 32. In practice, however, it is desirable in the printing art to include separate black information that can be used to control the addition of a black pigment. This offers several advantages. First, in case of any error with respect to the relative proportions of yellow, magenta, and cyan, an intended black turns out to be not a true black; it has a definite hue because of the predominance of one or another of the pigments. The addition of a separately-controlled black pigment masks this error. Second, a black pigment needs to be applied only once, as opposed to three times. Third, to the extent that a black pigment is used, pigments for the primary colors need not be used, and this means a financial saving, since black pigment is cheaper than color pigments. For more information on this subject, see U.S. Pat. No. 3,194,883.

The image projected by the projection lens 42 is picked off by a dot-offset and unsharp-masking pick-off mirror 50. The mirror 50 is partially reflecting (it transmits as well as reflects a portion of the incident light). The portion transmitted through the mirror 50 then passes through aperture means 54 defining an aperture 56 of predetermined size.

The aperture means 54 preferably has a rectangular aperture 56, of small and constant length in the direction of fast scan (the y direction). The length of each aperture in the direction of slow scan (the push or x direction) is several times the push distance P. The reason for providing a rectangular aperture having its small dimension in the y direction and its large dimension in the x direction is that the y dimension of the aperture is inversely proportional to resolution (subject to the limit set by noise), whereas the x dimension should correspond to the maximum dot dimension (in shadow), since the dot, whatever its actual size, is intended to represent the average tonal density in an area having a diameter equal to the maximum dot dimension. Clearly, the smaller the aperture (up to the limit imposed by noise) the higher the resolution. Of course, the increase in resolution necessitates a higher frequency response of the system or a reduction in scanning speed.

A portion of the light passing through the aperture means 54 is transmitted by a dichroic mirror 62 and impinges on a photomultiplier tube 64 responsive to the red region of the electromagnetic spectrum. Another portion is reflected by the mirror 62 and by a dichroic mirror 66 and impinges on a photomultiplier tube 68 responsive to the blue region of the electromagnetic spectrum. A portion of the light impinging on the dichroic mirror 66 is transmitted by that mirror and reflected by a dichroic mirror 70 so that it impinges on a photomultiplier tube 72 responsive to the green region of the electromagnetic spectrum. The complements of red, blue, and green are cyan, yellow, and magenta, respectively. In converting from an additive combination to a substractive combination, minus colors must be substituted. The tubes 64, 68, 72 therefore develop signals representing cyan, yellow, and magenta, respectively. The mirror 62 is selected to transmit one-third and reflect two-thirds of the incident light, the mirror 66 to transmit half and reflect half of the incident light, and the mirror 70 to reflect all of the incident light. These figures disregard small losses due to absorption.

The photomultiplier tubes 64, 68, 72 develop output analog signals on leads 74, 76, 78, respectively, that are individually representative only of the brightness (and not the saturation or hue) of the light instantaneously passing through the aperture means 54 in the cyan, yellow, and magenta regions of the electromagnetic spectrum, respectively. These signals are amplified by preamplifiers 80, 82, 84, respectively, and the amplified signals are transmitted to a conventional analog computer or other circuitry 86 (FIG. 1D) of the type disclosed in, for example U.S. Pat. Nos. 2,605,245 and 3,588,322, over leads 88, 90, 92. The computer 86 processes the signals and generates tonal-density analog color signals for yellow, magenta, cyan and black and supplies them on leads 94, 96, 98, 100 to dot-forming circuits 102. The signals for black is derived from the signals for the three primary colors in a conventional way by the computer 86.

A portion of the light projected by the lens 42 is reflected by the dot-offset mirror 50 and impinges on a number of photodiodes 112, which are disclosed with their switches 114 schematically in FIG. 1A and in greater detail in FIG. 20. In the embodiment of FIG. 20, there are nine individual photodiodes altogether. Only three of these are switched in during a particular scan: the center photodiode plus any two photodiodes at equal distances from the center photodiode on opposite sides. The photodiodes 112 are disposed in a linear array extending in the x direction (the push direction or slow scan direction). They are not covered by a shield with a small aperture like the aperture 56; they therefore respond respectively to a leading portion (in the push direction) of the image area instantaneously scanned, the center of the image area instantaneously scanned, and the trailing portion (in the push direction) of the image area instantaneously scanned and generate three corresponding outputs on leads 116, 118, and 120. The signals pass through preamp gain switch means 122 mechanically coupled to the photodiode switching 114 as indicated by a dotted line 123 and are amplified by preamplifiers 124, 126, and 128. The preamplifiers 124, 126, 128 produce signals L (for leading), C (for center), and T (for trailing) on lines 136, 138, 140, respectively.

The amplified signals L, C, and T from the preamplifiers 124, 126, 128 are supplied to dot-offset circuits 134 (FIG. 1B) over leads 136, 138, 140. These circuits, disclosed in detail in FIGS. 6A and E, process the signals L, C, T and generate a voltage on a line 142 that causes galvanometer drive amplifiers 144 for each of the four channels (yellow, magenta, cyan, and black) to offset in certain cases the halftone dots from the positions they would otherwise occupy and to modify their shapes. The amount and direction of the offset depend on the relative brightness of the leading, center, and trailing portions of the image area instantaneously scanned. The purpose is to align the dots with feature edges. In this way, edges that would otherwise appear rough are made smooth.

The dots occupy positions that are measured with respect to a dot coordinate grid (FIG. 19) generated electronically by a dot-position generator 146. The dot-position generator 146 is disclosed schematically in FIG. 1B and in detail in FIGS. 2A and B, 7A and B, 17, and 18. It receives inputs from a number of sources, including a ruling selector 147a, an angle selector 147b, and a pusher selector 147c.

Figure 1B:
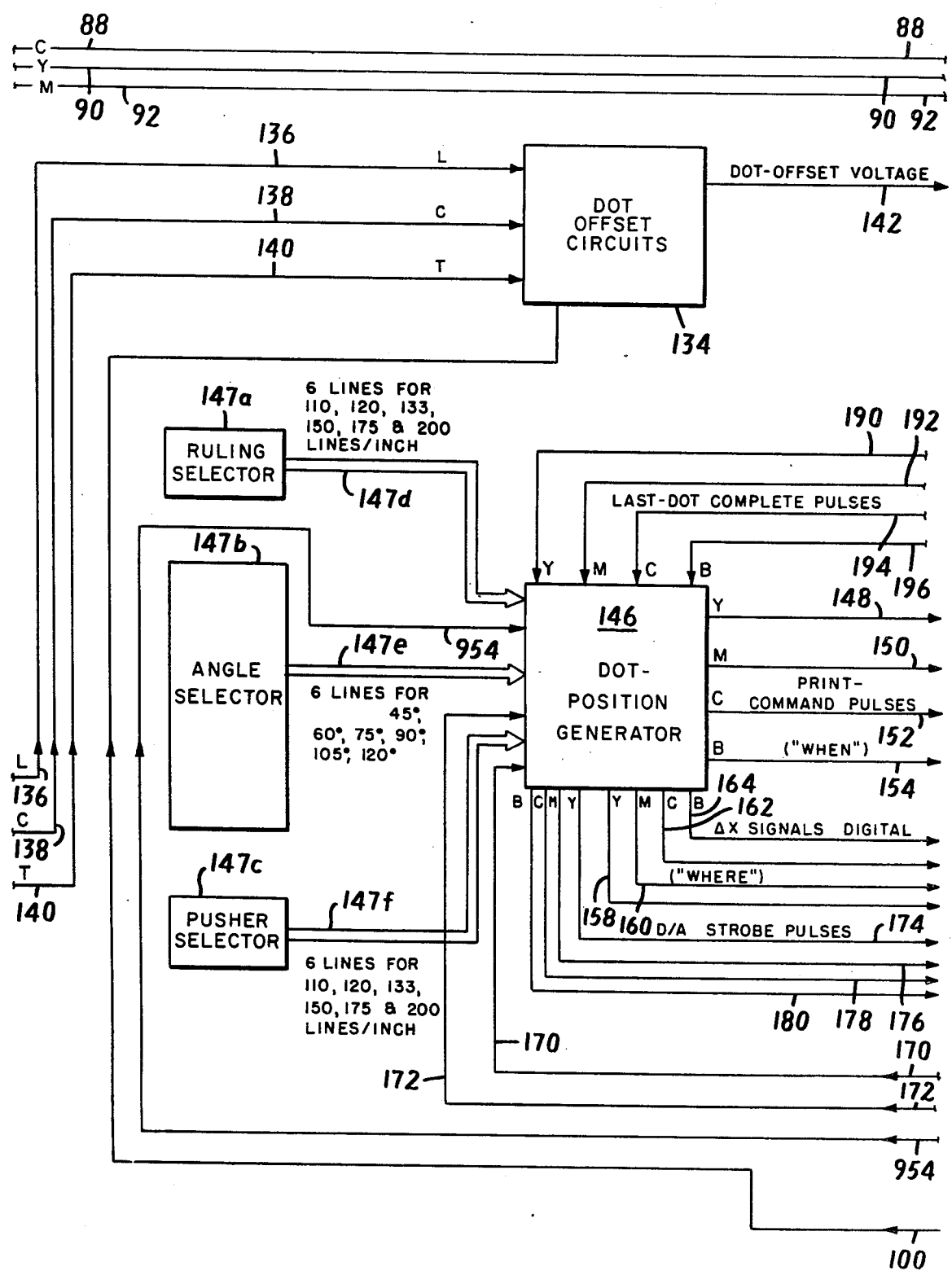

The ruling selector produces an output on one of six lines 147d shown schematically in FIG. 1B. By adjusting the ruling selector, an operator of the system supplies an input to the dot-position generator 146 indicating the screen ruling to be employed. The precise values from which the selection is made are not critical so far as the present invention is concerned and may be, for example, 110, 120, 133, 150, 175, and 200 lines per inch.

The angle selector 147b produces outputs on four of six lines 147e shown schematically in FIG. 1B. By adjusting the angle selector, an operator of the system supplies inputs to the dot-position generator 146 indicating four screen angles to be respectively employed in the case of the four color channels. The precise values from which the selection is made are not critical so far as the present invention is concerned and may be, for example, 15°, 30°, 45°, 60°, 75°, and 90°. The definitions of these screen angles are given later.

The pusher selector 147c produces an output on one of six lines 147f shown schematically in FIG. 1B. By adjusting the pusher selector, an operator of the systems supplies an input to the dot-position generator 146 indicating the push distance to be employed. The precise values from which the selection is made are not critical so far as the present invention is concerned and may be, for example, 110, 120, 133, 150, 175, and 200 lines per inch.

The dot-position generator 146 produces four "when" or print-command output pulses, one each for yellow, magenta, cyan, and black, that supplied to the dot-forming circuits 102 over lines 148, 150, 152, and 154, respectively, and four "where" or $\Delta x$ signals, one each for yellow, magenta, cyan, and black, that are supplied to a digital-to-analog (D/A) converter 156 over lines 158, 160, 162, and 164, respectively.

Each "when" signal determines the time when a particular dot is formed and hence its position along the fast direction of scan (the position along the y axis, measured from the start of the scan line). The "when" signals are developed, in a way explained below, in dependence partly on signals from a rotary shaft encoder 168. The rotary-shaft encoder 168 develops high-resolution pulses on a line 170 and index or "once-around" pulses on a line 172. Both lines 170, 172 are connected to the dot-position generator 146. The high-resolution pulses are generated, say, $2^{12}$ or 4,096 times per scan line, and the once-around pulses are generated once per scan line. They enable the dot-position generator 146 to stay synchronized with the rotary-shaft encoder 168 and hence with the drum 28 on which the output images 20–26 are formed and therefore to generate the "when" pulses at the proper times.

Each "where" signal determines the displacement of the dot towards the right from the left edge of the scan line (the position along the x axis, measured from the left edge of the scan line). The positions of the dots are fully determined by the "when" and "where" signals if the image portion instantaneously scanned is uniform. However, where a feature edge is being scanned, this is sensed by the photodiode array 112, and the dot-offset circuits 134 develop a dot-offset voltage that adjusts the positions of the dots so that they are properly aligned with the feature edges. All this is explained in detail below.

The dot-position generator 146 also generates D/A strobe pulses on lines 174, 176, 178, 180 that are supplied to the D/A converter 156. The D/A converter 156 generates signals on lines 182, 184, 186, 188 that are supplied to the galvanometer drive amplifiers 144. The $\Delta x$ information in digital form is continuously supplied to the D/A converter 156 and is strobed out in analog form at times dependent on the pulses on the lines 174–180 to control the "position" galvanometers described below.

Figure 1:
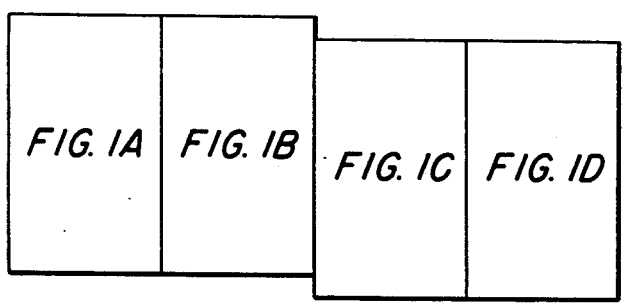
FIGS. 1-7 show how the sheets containing FIGS. 1A through D, 2A and B, 3A and B, 4A and B, 5A and B, 6A and B, and 7A and B are to be arranged in order to stand in the proper relation.
Figure 2:
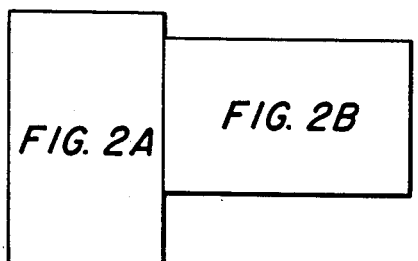
Figure 3:
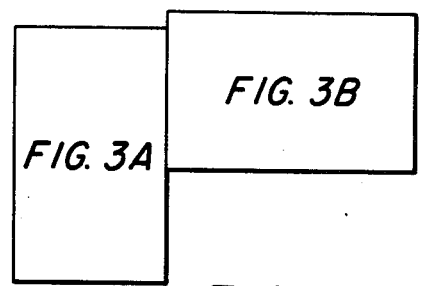
Figure 4:
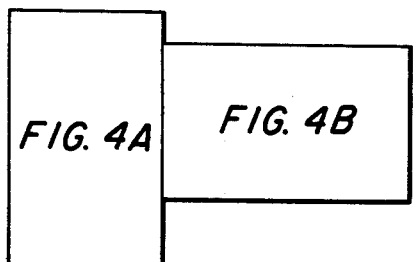
Figure 5:
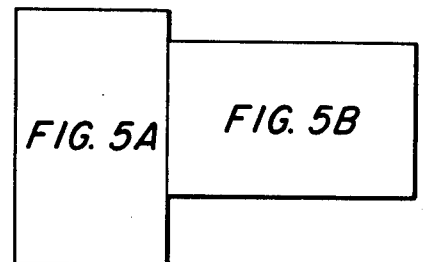
Figure 6:
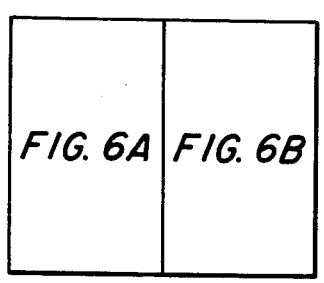

The strobe pulses on the lines 174–180 are not generated until dot-complete pulses for the appropriate color channel are supplied by the dot-forming circuits 102 to the dot-position generator 146 over lines 190, 192, 194, 196, and furthermore until "next-dot-calculated" pulses, internally generated by the dot-position generator 146 and shown in FIG. 2B, provide an indication that the appropriate computer within the dot-position generator 146 has completed its calculation of the next dot position.

The actual printing is not begun until the print command or "when" pulses are generated, even though the position galvanometers described below are pre-positioned as soon as the dot-position generator 146 has calculated the position of the next dot and the "dot complete" pulse has been generated.

Figure 1C:
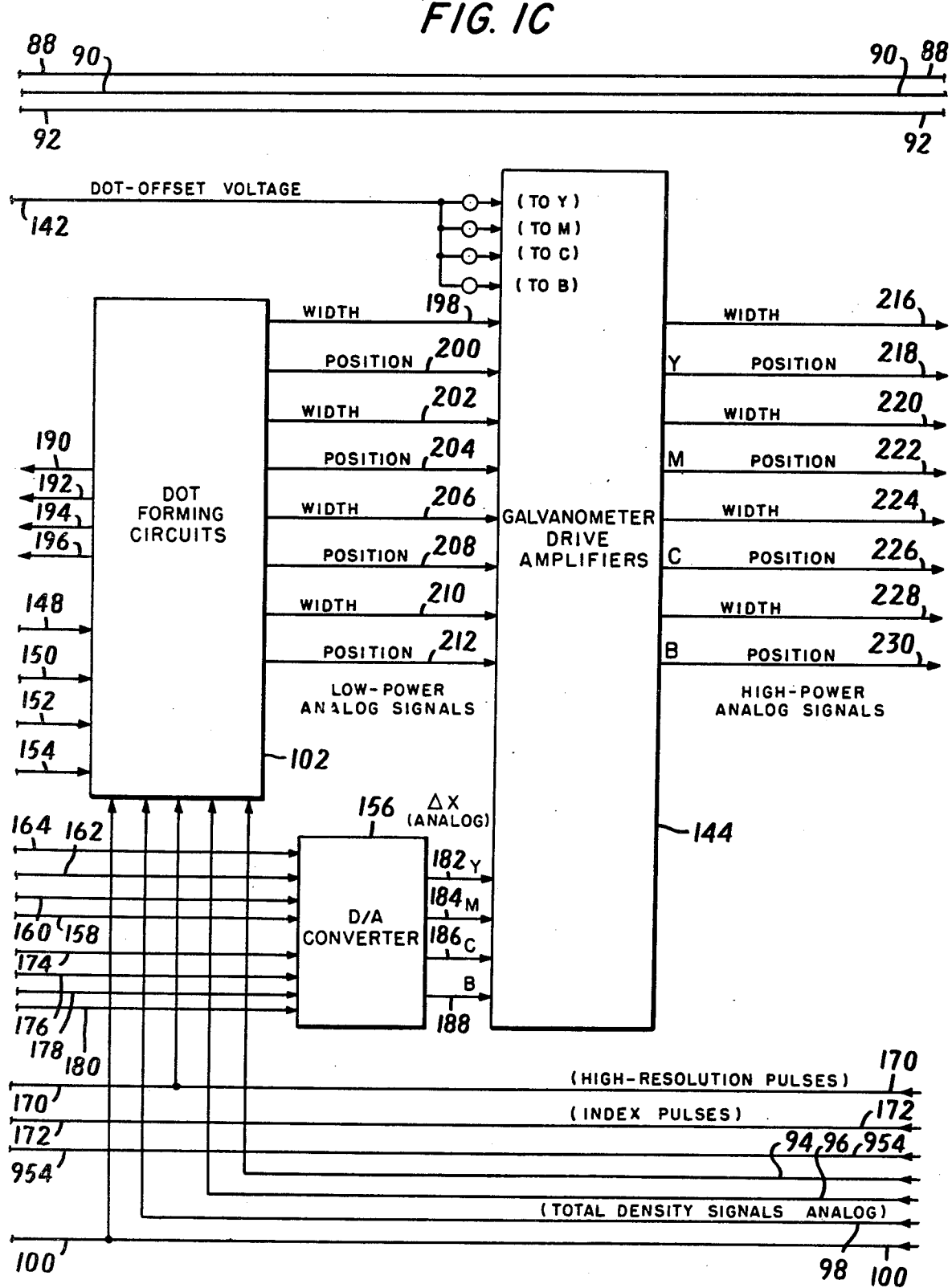
Figure 3A:
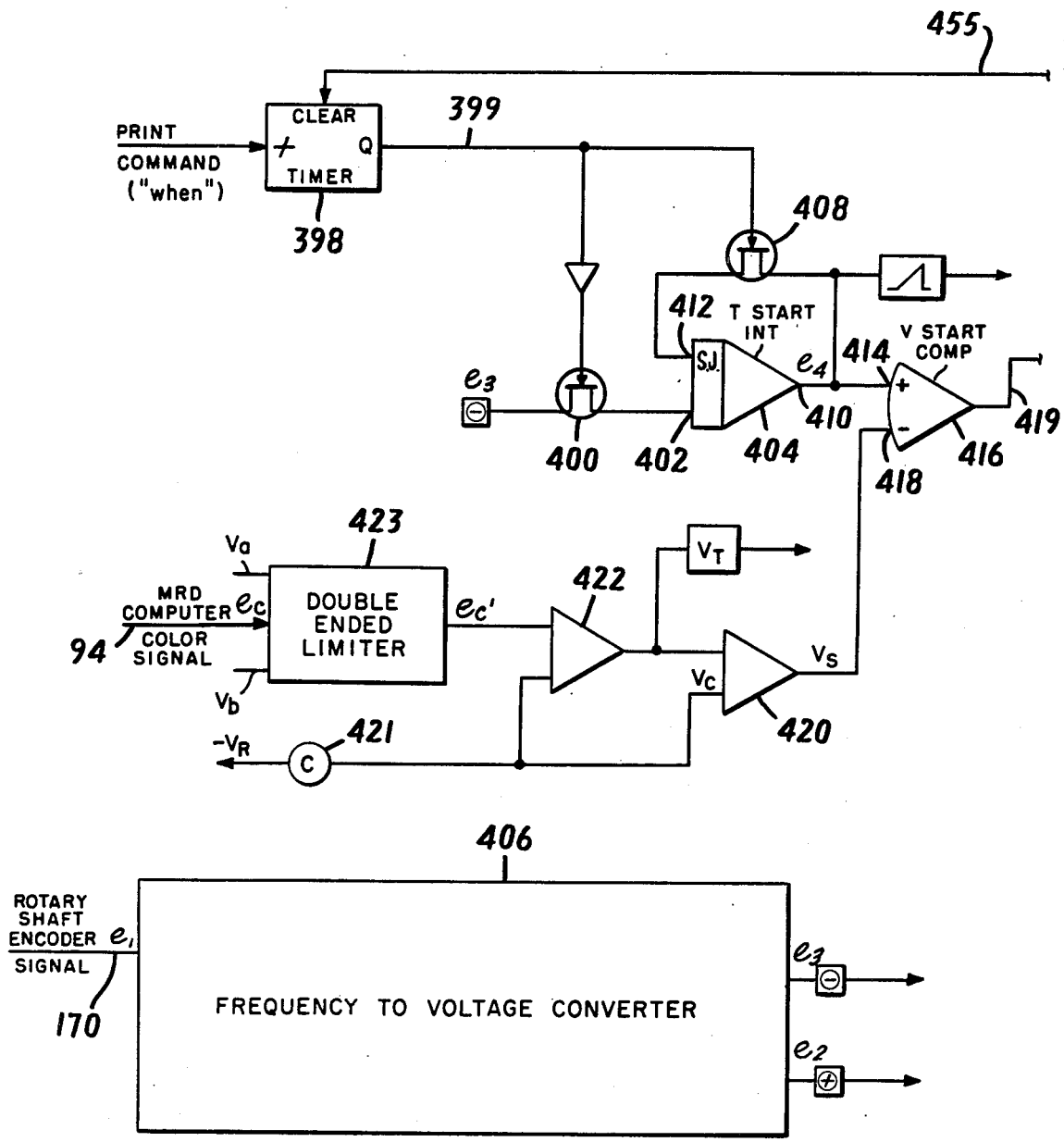
FIGS. 3A and B, 4A and B, and 5A and B, when arranged according to FIGS. 3-5 respectively, constitute schematic views of halftone-dot-forming circuits in accordance with the invention.

The dot-forming circuits 102 shown schematically in FIG. 1C are disclosed in detail in FIGS. 3A & B, 4A & B, and 5A & B. Under the control of the dot-position generator 146, these circuits develop signals for controlling the position and width of the dots that form the images 20, 22, 24, 26. The dots for each channel are, however, offset, at feature edges that have a component parallel to the y direction, from the nominal positions indicated by the dot-position generator 146 as a function of the dot offset voltage generated by the dot offset circuits 134.

The dot-forming circuits 102 generate signals on leads 198, 200, 202, 204, 206, 208, 210, 212 that control any suitable means for forming the images 20, 22, 24, 26.

Figure 4A:
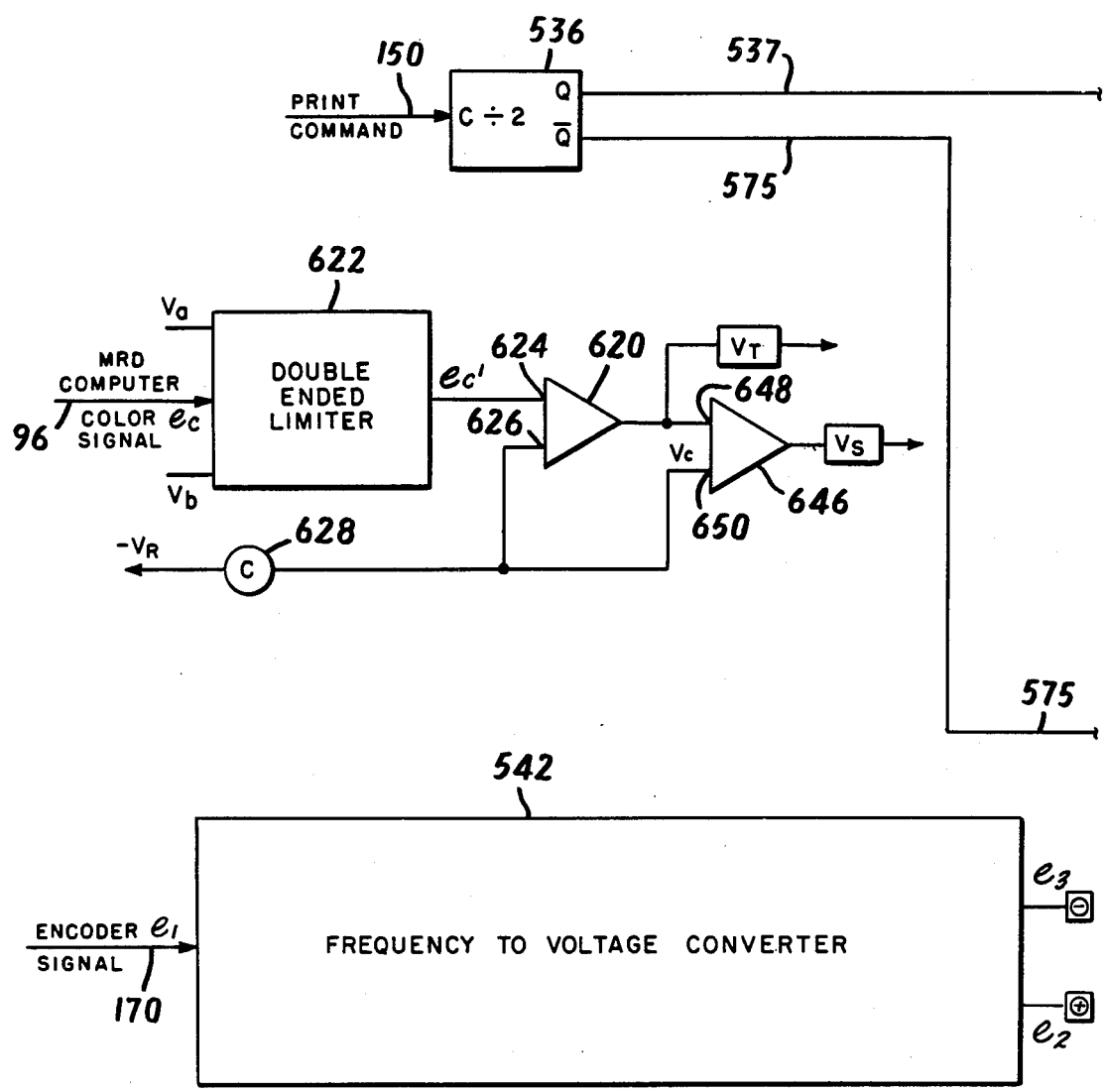
Figure 4B:
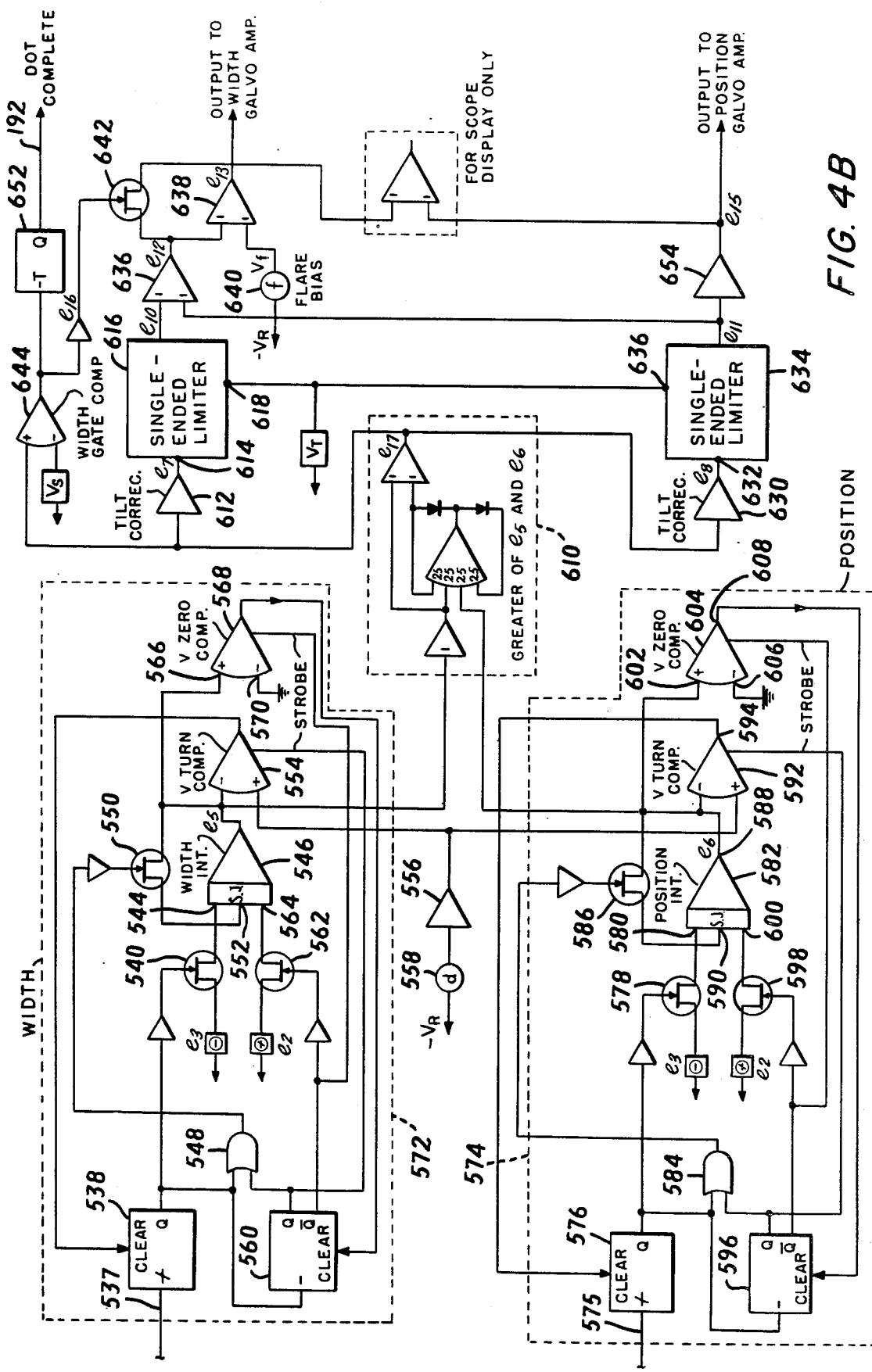
Figure 5A:
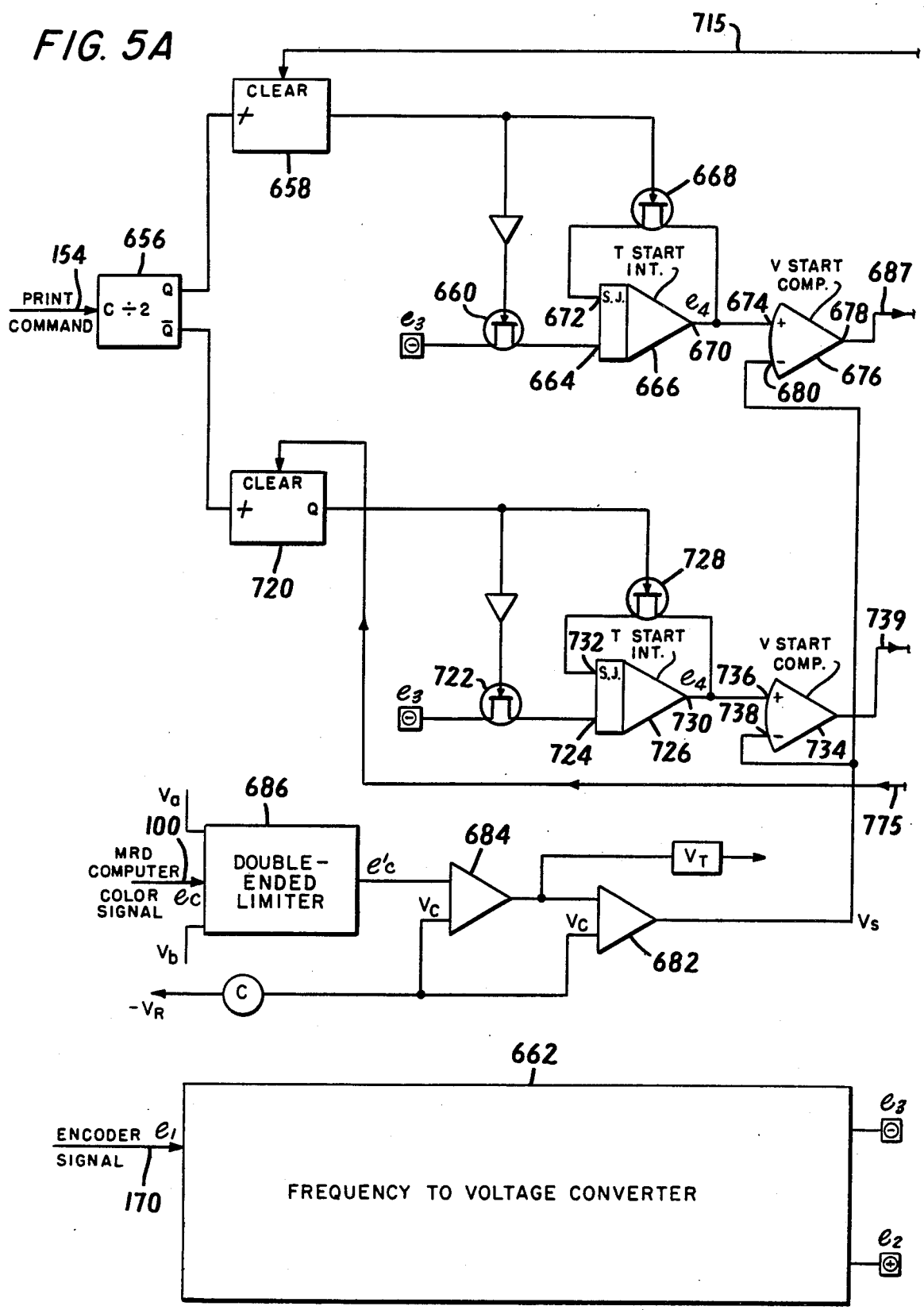

Two of the four circuits size and shape dots with respect to two screen angles, which can be 30°, 60°, 75° or 105°, depending on the setting of the angle-selector switch means 147b. One of these two circuits is shown in FIGS. 3A & B, and the other is identical to it. The other two circuits are similar but not exactly the same, and they size and shape dots with respect to screen angles of 45° and 90°, respectively. The circuit for screen angles of 45° is shown in FIGS. 4A & B and that for screen angles of 90° is shown in FIGS. 5A & B.

Figure 9:
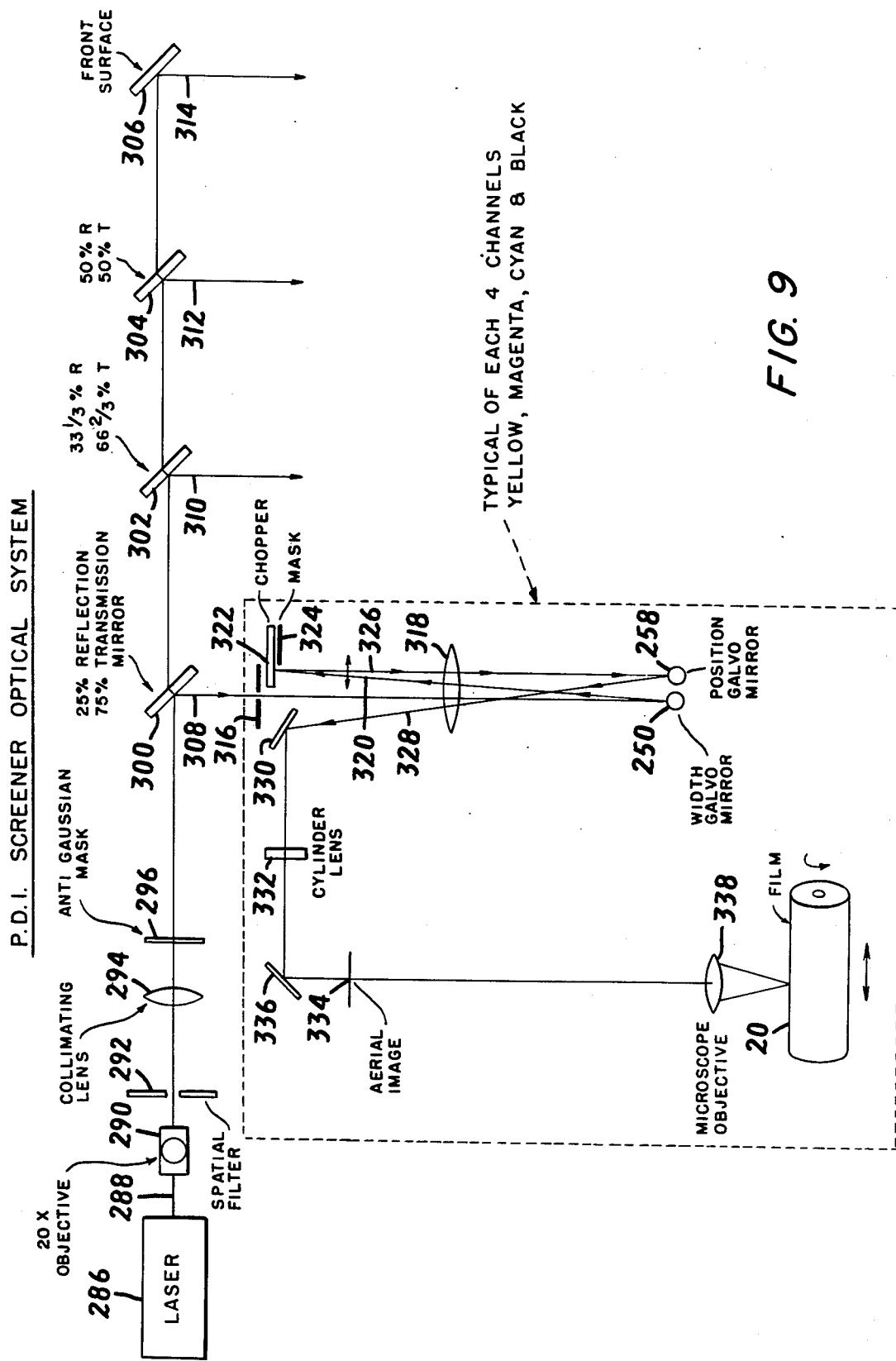
FIG. 9 is a diagram of an alternate embodiment of the portion of the apparatus represented by FIG. 8.
Figure 10:
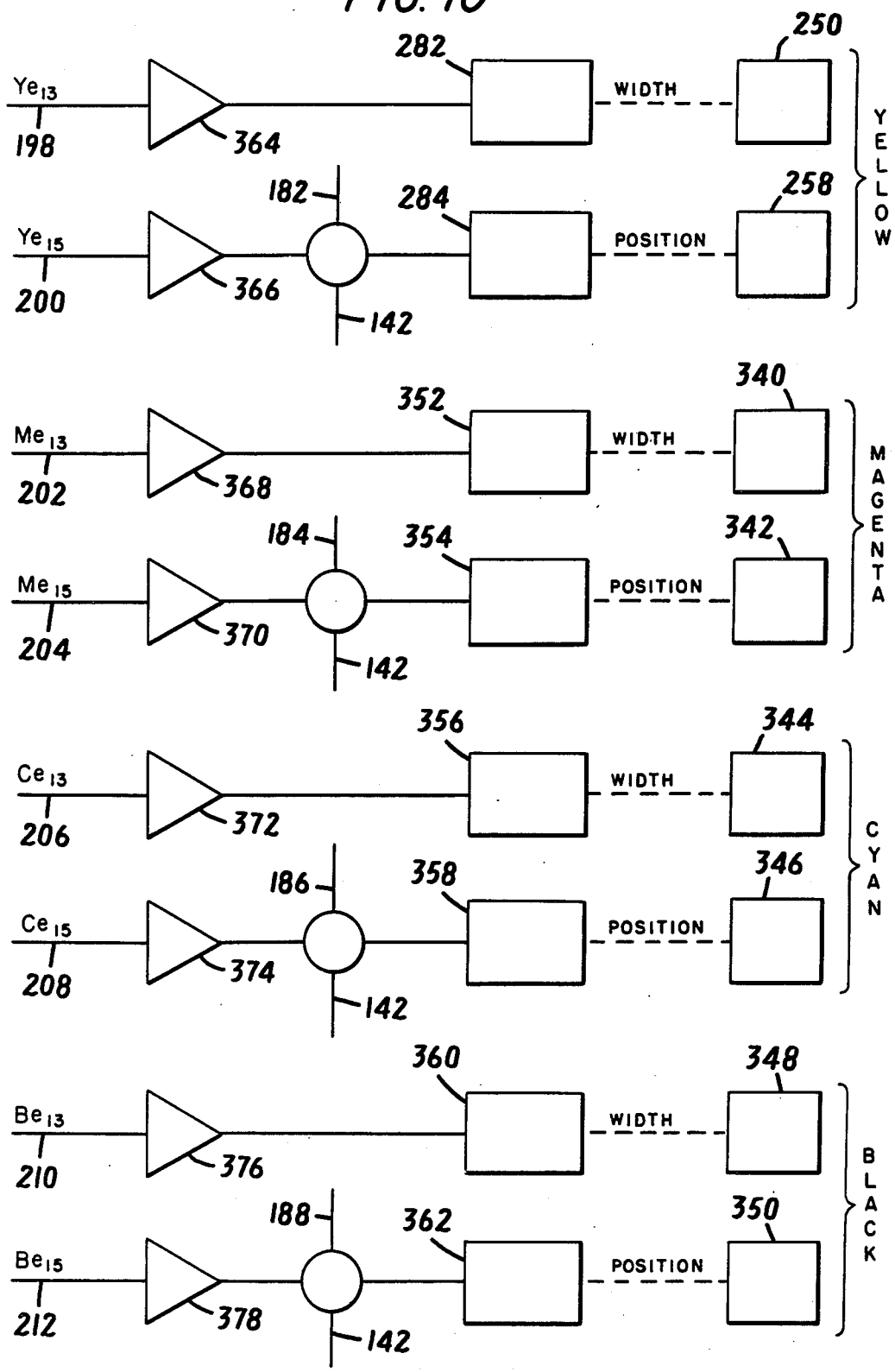
FIG. 10 is a schematic representation of galvanometer drive means for controlling the galvanometers in accordance with the invention.

In the preferred embodiment, these signals control galvanometer drive amplifiers shown collectively and schematically at 144 in FIG. 10 and in greater detail in FIGS. 8, 9, and 10.

The galvanomter drive amplifiers 144 develop high-power width and position signals on lines 216 and 218 for yellow, on lines 220 and 222 for magenta, on lines 224 and 226 for cyan, and on lines 228 and 230 for black. These width and position signals drive galvanometer modulators included in the box 231 (FIG. 1D). There are four galvanometer sets (FIG. 8 or 9 plus FIG. 10) that, in conjunction with a light chopper, modulate four laser beams 232, 234, 236, 238. The laser beams 232–238 are reflected onto or past a chopper or knife edge to expose photographic film to form the color-separation images 20, 22, 24, 26. The position signals on the lines 218, 222, 226, 230 determine one boundary of each dot formed on the color-separation images 20–26 by moving the "image" of the chopper or knife edge as each dot is drawn. The width signals on the lines 216, 220, 224, 228 determine the opposite boundary of each dot formed on the color-separation images 20–26 by continuously adjusting the width of each dot as it is drawn.

An alternative means of forming the halftone dots involves high-intensity lamps, glow lamps, fiber optics, or engraving techniques (not shown). In any case, the images 20, 22, 24, 26 are formed in accordance with the invention in such a manner that the dot structure is inconspicuous, edges between portions of the images of different tonal densities are sharply defined, and contrast is enhanced.

II. Description of Subsystems

A. Laser light souce and galvanomter modulators

FIGS. 8 and 8A–D illustrate a first embodiment and the principle of operation of the laser light source and galvanometer modulators 231 (screener optical system).

A conventional light source, preferably a laser 240, projects a beam of light, preferably coherent light (laser light) 242, at a plurality of wavelengths to break up diffraction rings, onto a gate 244. The laser light 242 has a circular aperture, as illustrated in FIG. 8A. The gate 244 is formed with a rectangular aperture 246 having its long dimension normal to the plane of FIG. 8. This permits a rectangular beam of light 248 to pass and impinge on a first galvanometer mirror 250. This mirror is known as the width mirror, since its displacement about its pivot axis 252 causes different widths of the reflected bean 254 to pass a knife edge 256 and thereby determines the instantaneous width of the dot as it is being formed. For example, the beam 254 can be entirely intercepted by the knife edge 256, as shown at the left of FIG. 8C; or it can be partly intercepted and partly not intercepted by the knife edge 256, as shown in the middle of FIG. 8C; or it can entirely pass the knife edge 256, as shown at the right of FIG. 8C. Thus, the width of the beam portion 232 beyond the knife edge 256 is adjustable.

The second galvanometer mirror 258 is called the position galvanometer, since, by pivoting about its pivot axis 260, it adjusts the position of impingement on the film 20, 22, 24 o r 26 (the film 20 is illustrated by way of example in FIG. 8) of the portion 232 of the laser beam that passes the knife edge 256 and is reflected by the mirror 258.

FIG. 8D shows the effect of a movement of the width galvanometer 250 between the positions shown in FIG. 8C and of a simultaneous movement of the position galvanometer mirror 258 to control the formation of a dot. In the case of the left of FIG. 8C, the laser beam 254 is entirely intercepted by the knife edge 256, so that the beam 232 vanishes and, in the position 262 (left of FIG. 8D) where a dot would be in the process of formation if the laser beam 254 were not entirely intercepted by the knife edge 256, there is no dot at all. In case a portion 264 (middle of FIG. 8C) escapes past the knife edge 256, it is imaged at 266 (middle of FIG. 8D). The direction of the scan is illustrated by an arrow 268, and earlier-formed portions 270 are also represented in the middle of FIG. 8D. It is evident that the formation of the dot begins as a pointand that the dot grows progressively as the portion 264 (FIG. 8C) escaping past the knife edge 256 becomes progressively larger.

The right side of FIG. 8C shows that the portion 264 escaping past the knife edge 256 is at a maximum. In this case, the dot has grown to its maximum width, which it may retain in a narrow band 272, and then it will decrease in a further band 274 back to a point at 276, as illustrated in FIG. 8D.

In FIG. 8C, the portion 264 that passes the knife edge 256 is bounded on the outer edge at 278 and on the inner edge at 280. The inner terminal portion 280 corresponds to the "image" of the knife edge 256. Thus the width mirror 250 alone determines the width of the recording beam in the x direction, the position mirror 258 alone determines the position of the inner terminal portion 280 of the recording beam 232 on the film 20, and the width mirror 250 and the position mirror 258 together determine the position of the outer terminal portion 278 of the recording beam 232 on the film.

The mirrors 250 and 258 are moved by galvanometer modulators 282, 284, respectively, in such a manner as to modulate the beam 232 and form halftone dots on the film 20. The way in which the galvanometer modulators 282, 284 are driven is described in detail below.

In addition to the set of galvanometer mirrors and modulators shown in FIG. 8 for the yellow channel, there are, of course, three additional sets for the remaining three channels.

FIG. 9 discloses a second embodiment of the screener optical system (laser light source and galvanometer modulators) and the one that is preferred at present. A source of light, preferably a laser 286, generates a beam 288 of coherent electromagnetic radiation. A twenty-power objective lens 290 brings the laser beam 288 to a focus at the spatial filter 292. The purpose of the spatial filter 292 is to reduce or eliminate any irregularities present in the laser beam 288 as generated. A collimating lens 294 collimates the beam 288, so that all rays of the beam are parallel. An antigaussian mask 296 performs two functions: it defines the shape of the laser beam 288 and provides approximately uniform intensity of unit areas in the beam.

Beam-splitting mirrors 300, 302, 304, 306 divide the beam 288 into four beams 308, 310, 312, 314 of equal intensity. To this end, the mirror 308 transmits three-fourths of the light incident on it and reflects one-fourth; the mirror 310 transmits two-thirds of the light incident on it and reflects one-third; the mirror 312 transmits half the light incident on it and reflects half; and the mirror 314 reflects all of the light incident on it, except for minor inevitable losses.

The beams 308, 310, 312, 314 are all processed in the same way. The processing of the beam 308 is representative and is illustrated in FIG. 9. A gate 316 defines the sides of the beam 308, and a lens 318 forms an image of the beam 308 on the width mirror 250 of the width galvanometer.

The beam 320 reflected by the width galvanometer mirror 250 is collimated by the lens 318 and impinges on a chopper mirror 322 having a non-reflective chopper mask 324. The mask 324 corresponds to the knife edge 256 of FIG. 8. The position in space of the beam 320 is adjustable by electrical signals supplied to the width galvanometer controlling the width mirror 250, so that varying proportions of the width of the beam 320 incident on the chopper mirror 322 are reflected as a beam 326, the remaining part of the width of the beam 320 being absorbed by the mask 324. This reflected portion 326 is focused by the lens 318 onto the position galvanometer mirror 258. The beam 328 reflected by the position galvanometer mirror 258 is collimated by the lens 318 and is positionally adjustable in accordance with electrical signals supplied to the position galvanometer modulator. This beam 328 is redirected by a front-surface mirror 330 through a cylindrical lens 332. The cylindrical lens 332 forms an aerial image (real image) of the beam at a point 334 following reflection of the beam from a mirror 336.

The width of the aerial image 334 is determined by the adjustment of the width galvanometer mirror 250 and the position of the adjustment of the position galvanometer mirror 258.

The rays diverge from the aerial image 334 and pass through a microscope objective 338, which forms a small image of the selected portion of the laser beam on the output film 20.

The beams 310, 312, 314 are similarly processed to form images on the output films 22, 24, 26, respectively.

B. Galvanometer drive amplifiers and their relation to position and width mirrors and modulators FIG. 10 shows the galvanometer drive amplifiers and modulators in greater detail. There are eight modulating mirrors in all, two for each of the four channels: a width mirror 250 and a position mirror 258 for the yellow channel: a width mirror 340 and a position mirror 342 for the magenta channel; a width mirror 344 and a position mirror 346 for the cyan channel; and a width mirror 348 and a position mirror 350 for the block channel.

Each mirror is controlled by galvanometer. The galvanometer 282 controls the mirror 250, and the galvanometer 284 controls the mirror 258. These have already been described. Similarly, a galvanometer 352 controls the mirror 340, a galvanometer 354 controls the mirror 342, a galvanometer 356 controls the mirror 344, a galvanometer 358 controls the mirror 346, a galvanometer 360 controls the mirror 348, and an galvanometer 362 controls the mirror 350.

The structure described above is a part of the box 231 in FIG. 1D. The box 144 in FIG. 1C comprises galvanometer drive amplifiers 364, 366, 368, 370, 372, 374, 376, and 378 for driving the galvanometers 282, 284, 352, 354, 356, 358, 360, 362, respectively. These galvanometer drive amplifiers 364–378 respectively receive controlling analog input signals $Ye_{13}$, $Ye_{15}$, $Me_{13}$, $Me_{15}$, $Ce_{13}$, $Ce_{15}$, $Be_{13}$, and $Be_{15}$ from the dot-forming circuits 102 on lines 198–212, respectively, also shown in FIG. 1C. The signals from the dot-forming circuits 102 identified by reference characters having the subscript 13 control the respective width galvanometers, and those identified by reference charcters having the subscript 15 control the respective position galvanometers.

The position galvanometers 284, 354, 358, 362 are driven also by analog signals representing $\Delta_x$ information for yellow, magenta, cyan and black, respectively. These signals are generated on the lines 182, 184, 186, 188, respectively, by the D/A converter 156 (FIGS. 1C and 10).

Finally, the position galvanometers receive the dot-offset voltage on the line 142 (FIGS. 1C and 10).

C. Dot-Forming circuits

The dot-forming circuits 102 (FIG. 1C) generate signals that largely control the galvanometer drive amplifiers and therefore the position and width of the dots in the images 20, 22, 24, 26. The dots for each color-separation image 20, 22, 24, 26 are arranged in a grid-like pattern, and, to prevent moire effects, the four patterns are all oriented differently (i.e., each dot grid has a different "screen angle" $\theta$). The screen angle $\theta$ for a given grid, measured with respect to a reference such as the direction of scan or a line normal to the directions of scan, can theoretically have any value but in practice has one of six values conventionally designated 45°, 60°, 75°, 90°, 105° or 120°. In the printing art, these angles are customarily measured in a clockwise direction, the zero-degree line extending from the origin horizontally to the left. The screen angle of 105° is alternatively referred to as an angle of 15° (105°–90°), and a screen angle of 120° as an angle of 30° (120°–90°). In a typical case, where, say four color-separation images 20, 22, 24, 26 are formed, only four of the six possible screen angles are selected.

For purposes of the calculations in accordance with which the dot-forming circuits of this invention function, the screen angle reference line is the direction of fast scan, and angles are measured clockwise. Thus, a screen angle conventionally designated 105° or 15° is treated for purposes of these calculations as one of 15°. Similarly, a conventional 120° or 30° becomes 30° for present purposes, 45° remains 45°, 60° becomes 30°, 75° becomes 15°, and 90° becomes 0°. Note that, for present purposes, the screen angle $\theta$ need never be more than 45°; the complement of larger angles can be substituted since the dot-coordinate grid pattern is square. In the calculations presented later and in the statements regarding the relation of various signals generated by the dot-forming circuits to the screen angle, $\theta$ has, not the conventional meaning, but the special meaning indicated above. However, it has its conventional meaning in other places as dictated by the context.

The dot-forming circits 102 are disclosed in FIGS. 3A and B, 4A and B, and 5A and B, which will now be described in turn. The signals $e_{13}$ and $e_{15}$ are developed by the circuitry shown in FIGS. 3A and B (for forming dots where the screen angle as conventionally designated is 60°, 75°, 105° or 120°), FIGS. 4A and B (for forming dots where the screen angle as conventionally designated is 45°), and FIGS. 5A and B (for forming dots where the screen angle as conventionally designated is 90°).

Since a dot must grow symmetrically about its center as calculated by the dot-position generator 146, the time and location of the beginning of any dot, regardless of the size of the dot, is proportional to $e_c$, which is the color signal supplied by the analog computer 86, and the speed of rotation of the spindle 30. This is accomplished automatically as follows: A print command or "when" signal from one of four dedicated digital minicomputers 814, 816, 818, 820 (FIG. 17) in the dot-position generator 146, is supplied on one of the four lines 148, 150, 152, 154 (FIG. 1B). Let us assume it appears on the line 148. This starts a timer 398 (FIG. 3A). The timer 398 then generates a positive voltage level on a line 399 that closes a field-effect transistor (FET) switch 400 so that a negative voltage $e_{13}$ is supplied to the input 402 of a time-start integrator 404. The signal $e_3$ is generated by a frequency-to-voltage converter 406. The converter 406 generates positive and negative voltages, $e_2$ and $e_3$, respectively, which are equal in absolute magnitude and proportional to the speed of rotation of the drum 28 (FIG. 1D). This speed of rotation is measured by the frequency of the high-resolution pulses appearing on the output line 170 of the rotary shaft encoder 168. The signal from the timer 398 also opens an FET switch 408, which removes the short between the output 410 of the integrator 404 and its summing junction 412. The integrator 404 begins to integrate and produces a ramp voltage $e_4$, which is supplied to the positive input terminal 414 of a V-start comparator 416. The input to the negative input terminal 418 of the comparator 416 is a voltage $V_S$, which is the output of an operational amplifier 420. One input to the amplifier 420 is the voltage $V_T$, which is the voltage at the turnaround. (The turnaround is the point at which the dot-forming voltage controlling a galvanometer begins to decrease. It may be thought of as the halfway point in the dot formation. Actually, the position and width galvanometers are both subject to a turnaround, and the turnarounds do not, in general, coincide or occur precisely at the halfway point in dot formation. This will become clear in connection with the description below of FIGS. 11-16.) The other input to the amplifier 420 is a reference voltage $V_C$, which is a constant such as minus 6.5 volts. It is derived by a potentiometer 421 from the reference voltage—$V_R$. The voltage $V_T$ is produced by an operational amplifier 422, which has as one of its inputs the same reference voltage $V_C$ and as its other input the signal $e_c{}^1$, which is the tonal-density or color signal $e_c$ from the computer 86 for the color channel in question limited by a double-ended limiter 423 so that it cannot be greater than $V_b$, corresponding to the absolute minimum dot size, or less than $V_a$, corresponding to the absolute maximum dot. The signal $e_c$ appears on one of the lines 94-100 (FIGS. 1C and D), say the line 94.

The comparator 416 changes states when the voltage $e_4$ supplied to its plus input terminal 414 exceeds the voltage $V_s$ supplied to its minus input terminal 418. When the comparator 416 changes states, it produces an output on a line 419 that causes the actual drawing of a dot to begin. The voltages necessary to draw the dot are generated as follows: a timer 422' goes positive and closes an FET switch 424 when it receives an input from the comparator 416. This permits the negative voltage $e_3$ generated by the frequency-to-voltage converter 406 to be supplied as an input to the terminal 426 of a "width" integrator 428 having a gain for signals applied to the terminal 426 proportional to $1/(\cos\theta + \sin\theta)$, where $\theta$ is the screen angle. The voltage $e_3$ is used instead of a constant d.c. voltage so that the formation of the dot will remain symmetrical on the film regardless of possible changes in scanning speed. The output of the timer 422 is supplied also as an input to an OR-gate 430. The OR-gate 430 produces an output in response which opens an FET switch 432. This opens the short between the summing junction 434 of the width integrator 428 and the output terminal 436 and allows integration to start, and a signal $e_5$ appears at the output terminal 436. The output $e_5$ is supplied as an input to the negative terminal 438 of a turnaround comparator 440. The input to the positive terminal 442 of the comparator 440 is the voltage $V_T$ produced by the operational amplifier 422 (FIG. 3A).

Figure 3B:
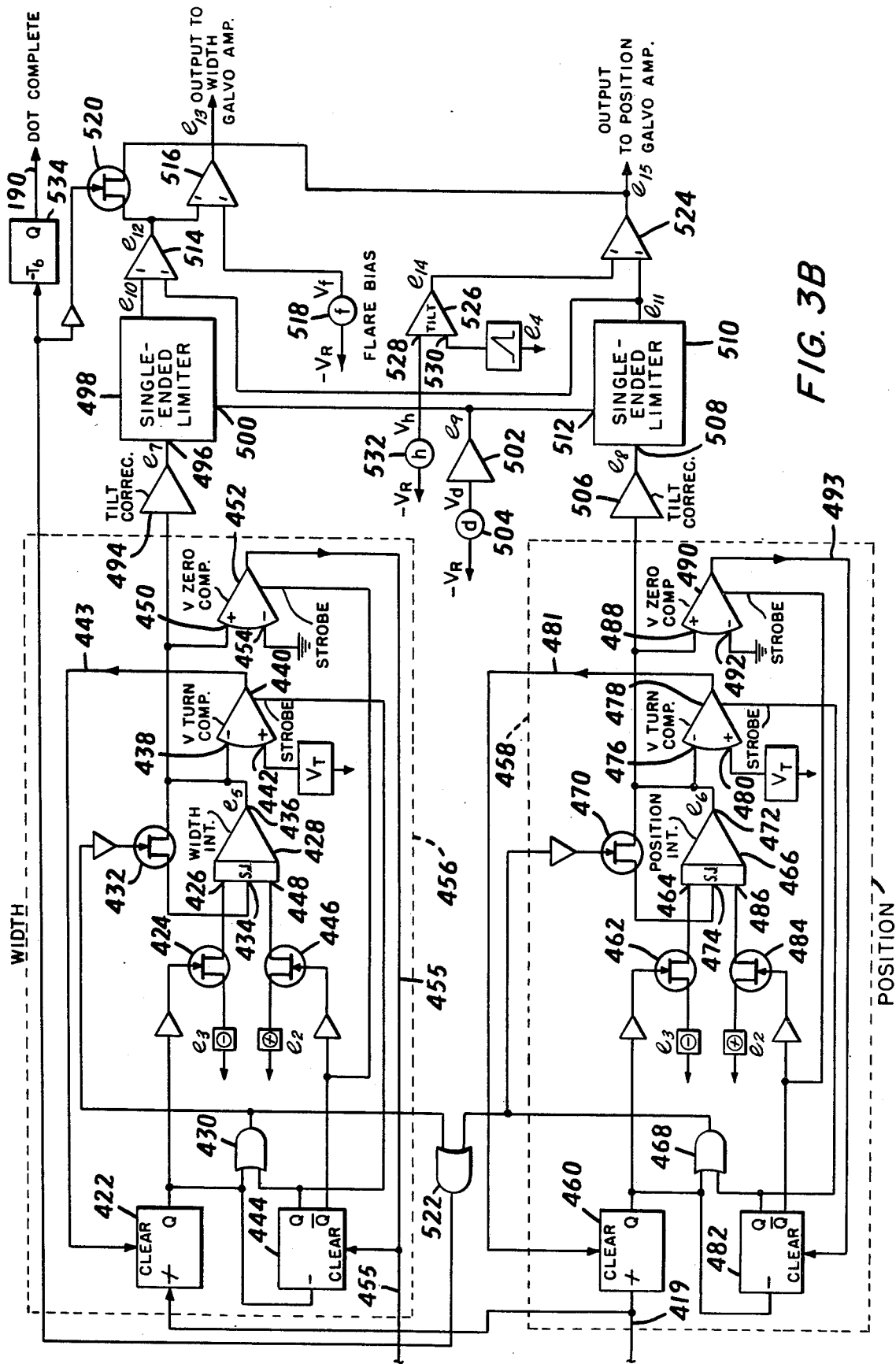

When the signal $e_5$ equals $V_T$ (FIG. 3B), the turnaround comparator 440 goes negative and produces on a line 443 an output that clears the timer 422'. This opens the switch 424 and terminates the ascending integration of the width integrator 428.

When the timer 422 times out, the trailing edge of the timing pulse, which is negative-going, starts a timer 444. The output Q of the timer 444 is supplied to the OR-gate 430 so that the FET switch 432 remains open. At the same time, the loss of the complementary output $\overline{Q}$ causes an FET switch 446 to close and permits application of a voltage $e_2$, which is generated by the frequency-to-voltage converter 406 and is equal in absolute magnitude to the voltage $e_3$ but of positive instead of negative polarity, to the terminal 448 of the width integrator 428. In the case of signals applied to the terminal 448, the integrator 428 has a gain proportional to $1/(\cos\theta - \sin\theta)$. This permits a linearly-descending integration to start. The output $e_5$, which is now linearly descending, is supplied to the positive input terminal 450 of a $V_O$ comparator 452, the other input terminal 454 of which is grounded. Accordingly, when the voltage $e_5$ returns to zero, the comparator 452 produces on a line 455 an output that clears the timers 398 and 444. The timers 398, 422, 444 are then ready for the next print command or "when" signal. Moreover, the OR-gate 430 no longer produces an output, so that the switch 432 closes and shorts the output terminal 436 of the width integrator 428 to its own summing junction 434, preparing the integrator 428 for the next cycle of operation.

The signal $e_5$ generated by the circuitry described above and included within a box 456 is used in conjunction with other signals as described later on for the control of the width galvanometer. Control of the position galvanometer is effected by means including circuitry 458. This circuitry is nearly identical to circuitry 456 except for time constants. The signal $e_6$ within the circuitry 458 is generated as follows:

When the comparator 416 goes positive, indicating that $e_4$ equals $V_S$, a positive-going signal appears and starts a timer 460. The timer 460 generates a signal that closes an FET switch 462, which permits the negative signal $e_3$ to be supplied as an input to one terminal 464 of a position integrator 466 having for signals applied to the terminal 464 a gain proportional to $1/(\cos\theta - \sin\theta)$, where $\theta$ is the screen angle. The output of the timer 460 is also supplied as an input to an OR-gate 468, which opens an FET switch 470 and removes the short between the output 472 and the summing junction 474 of the position integrator 466. This allows integration to start. The output $e_6$ of the position integrator 466 is supplied as an input to the minus terminal 476 of a turnaround-voltage comparator 478. The input to the plus terminal 480 of the comparator 478 is the voltage $V_T$ generated by the operational amplifier 422 (FIGS. 3A & B).

When the voltage $e_6$ (FIG. 3B) equals the voltage $V_T$, the voltage-turnaround comparator 478 generates on a line 481 an output that clears the timer 460, terminating positive integration by the integrator 466. The negative-going signal from the timer 460 when it clears starts a timer 482, which produces an output Q supplied as input to the OR-gate 468 so that the FET switch 470 remains open. At the same time, the disappearance of the complementary output $\bar{Q}$ permits an FET switch 484 to close and a positive signal $e_2$ equal in absolute magnitude to the negative signal $e_3$ to be supplied to the input terminal 486 of the position integrator 466. The integrator 466 has for signals applied to the terminal 486 a gain proportional to $1/(\cos\theta + \sin\theta)$, where $\theta$ is the screen angle. The position integrator 466 then begins to integrate negatively, so that the output $e_6$ decreases linearly. This voltage $e_6$ is supplied to the plus input terminal 488 of a $V_O$ comparator 490, the other input terminal 492 of which is grounded. When the voltage $e_6$ reaches zero, the comparator 490 produces on a line 493 an output that clears the timer 482, and this stops the integration. Also, the OR-gate 468 no longer produces an output, so that the FET switch 470 closes and shorts the summing junction 474 of the position integrator 466 to the output 472, thus preparing the integrator 466 for the next cycle of operation.

The purpose of the strobes applied to the comparators 440, 452, 478, 490 is to make sure that the outputs of these comparators are in the proper state so that the timers they control are also in the proper state to start timing upon receipt of the input signals to the respective timers.

The circuitry 456, 458 ensures that the signals $e_5$ and $e_6$ have the right duration. Additional circuitry described below ensures that they have the right amplitudes.

The signal $e_5$ is supplied to a tilt-correcting amplifier 494 the gain of which is proportional to $\cos \theta + \sin \theta \tan \theta$, where $\theta$ is the screen angle. The tilt-correcting amplifier 494 produces a signal $e_7$ that is supplied to an input terminal 496 of a single-ended limiter 498. The other input terminal 500 of the single-ended limiter 498 receives a voltage $e_g$ generated by an operational amplifier 502 having a gain proportional to $(\cos \theta + \sin \theta \tan \theta)$/screen ruling. The input to the operational amplifier 502 is a voltage $V_d$ which is a reference voltage set at a constant value such as $-2.4375$ volts, a figure derived by calculation for scaling purposes but not critical. This reference voltage is obtained from a potentiometer 504 which is set by a reference voltage $V_R$ of, say, $-9$ volts.

The output of the single-ended limiter 498 is equal to the voltage $e_7$ so long as the voltage $e_7$ does not exceed in absolute value the voltage $e_9$. If the absolute value of $e_7$ exceeds the absolute value of $e_9$, then the output of the single-ended limiter 498 is simply the voltage $e_9$. In either case, the output of the single-ended limiter 498 is designated $e_{10}$.

The voltage $e_6$ is supplied as an input to a tilt-correcting amplifier 506 which has a gain proportional to $\cos \theta + \sin \theta \tan \theta$, where $\theta$ is the screen angle. This produces an output $e_8$ that is supplied as an input to one terminal 508 of a single-ended limiter 510. The input to the terminal 512 of the single-ended limiter 510 is the DC voltage $e_9$. The single-ended limiter 512 produces an output $e_{11}$ that is supplied as an input to a summer 514. The summer 514 sums the waveforms $e_{10}$ and $e_{11}$ to produce a waveform $e_{12}$, which is an input to a summer 516. The other input to the summer 516 is a flare-bias reference voltage $V_f$, which is derived from a potentiometer 518 supplied by the reference voltage $V_R$.

The summer 516 sums $V_f$ and $e_{12}$ to produce $e_{13}$. The voltage $e_{13}$ is the same as $e_{12}$ except that $e_{13}$ rides on a flare-bias pedestal when an FET switch 520 is opened by a dot-window signal from an OR-gate 522. This flare-bias $V_f$ overcomes the mechanical bias of the galvanometer. When the flare-bias $V_f$ is removed, the mechanical bias of the galvanometer moves the laser beam a distance from the knife edge 256 (FIG. 8) sufficient to prevent any flare from going around the knife edge. This prevents premature or otherwise unwanted exposure of the film.

The OR-gate 522 produces an output when the OR-gate 430 or 468 produces an output: i.e., whenever a dot is in the process of formation. The output of the OR-gate 522 thus lasts for the duration of the dot-forming process. That is why its output is called the dot-window signal. At the end of the dot-forming process, the FET switch 520 is closed, the output and input of the summer 516 are shorted, and $e_{13}$ goes to zero.

Figure 11:
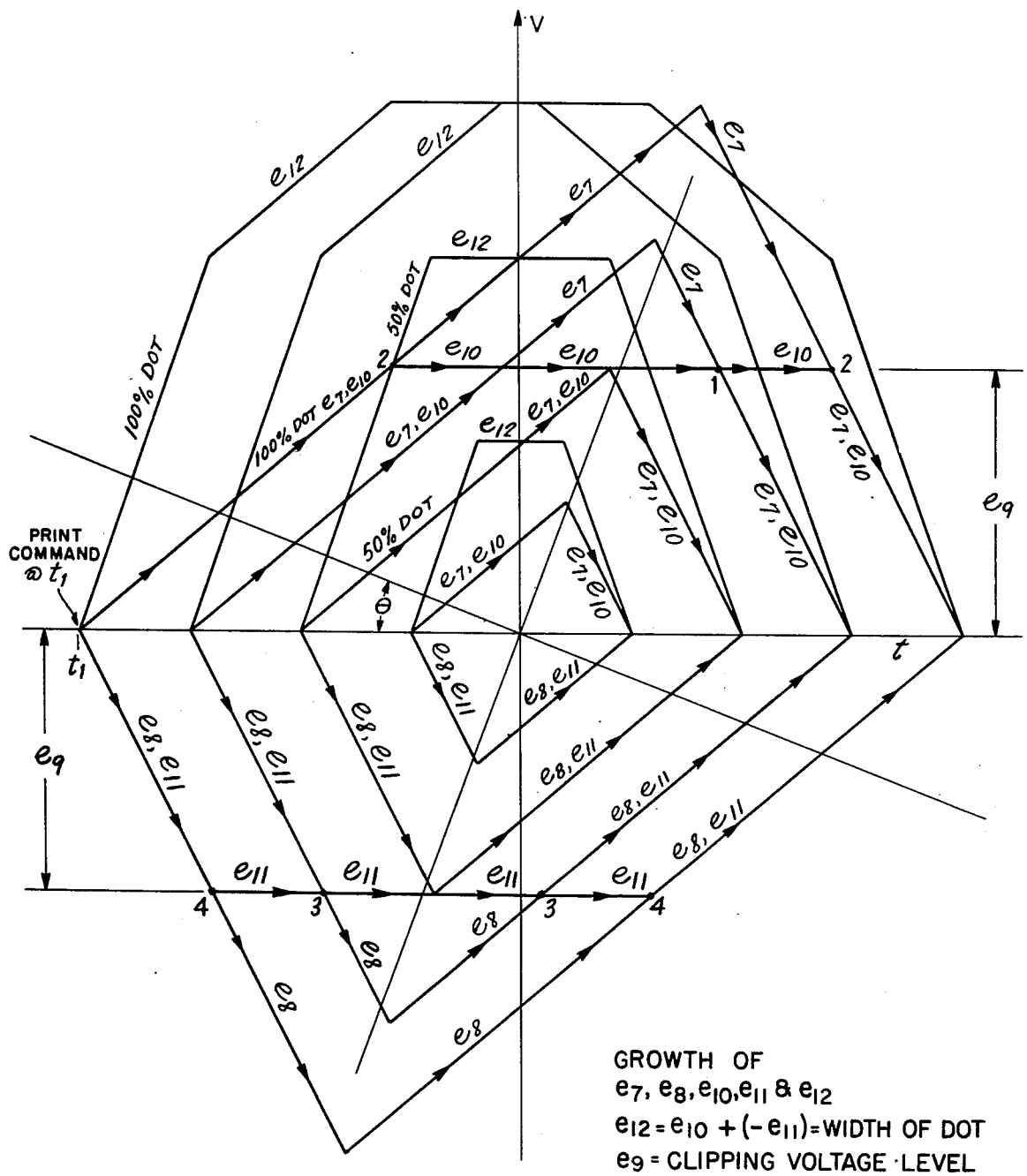
FIGS. 11-16 are graphs showing the dot-forming process in accordance with the invention.

The output $e_{11}$ of the single-ended limiter 510 is also supplied to a summer 524. The other input to the summer 524 is from a tilt amplifier 526 having a gain in the case of signals applied to its input terminal 528 proportional to $\sin \theta$/screen ruling, and having a gain in the case of signals applied to its input terminal 530 proportional to $\sin \theta$, where $\theta$ is defined as before. The tilt amplifier 526 has as an input to its terminal 528 a constant voltage $V_h$ which is equal to a convenient constant such as $-1.2617$ volts. The voltage $V_h$ is determined by calculation for scaling purposes and is physically derived from a potentiometer 532 supplied by the reference voltage $V_R$. The input to the terminal 530 of the tilt amplifier 526 is the waveform $e_4$, which is generated by the integrator 404 (FIG. 3A). The output voltage $e_{14}$ (FIG. 3B) of the tilt amplifier 526 is a negative-going ramp voltage. The voltage $e_{14}$ is summed with the voltage $e_{11}$ by the summer 524 to produce the waveform $e_{15}$. The result is a negative-going ramp voltage up to the point where the dot formation starts. The knife edge 256 (embodiment of FIG. 8) is "positioned" along the line $e_{15}$ to produce a dot symmetrical about the line $e_{14}$. The line $e_{14}$ is coincident with the screen axis, the direction of which is proportional to the angle $\theta$. At the end of the dot, gate 522 goes low and a timer 534 produces in response a "dot complete" pulse on the appropriate one of the leads 190–196 (FIGS. 1B and C and 3B). The signals $e_7$, $e_8$, $e_9$, $e_{10}$, $e_{11}$ and $e_{12}$ are shown in FIG. 11 for dots representing different percentages of the maximum.

Figure 12:
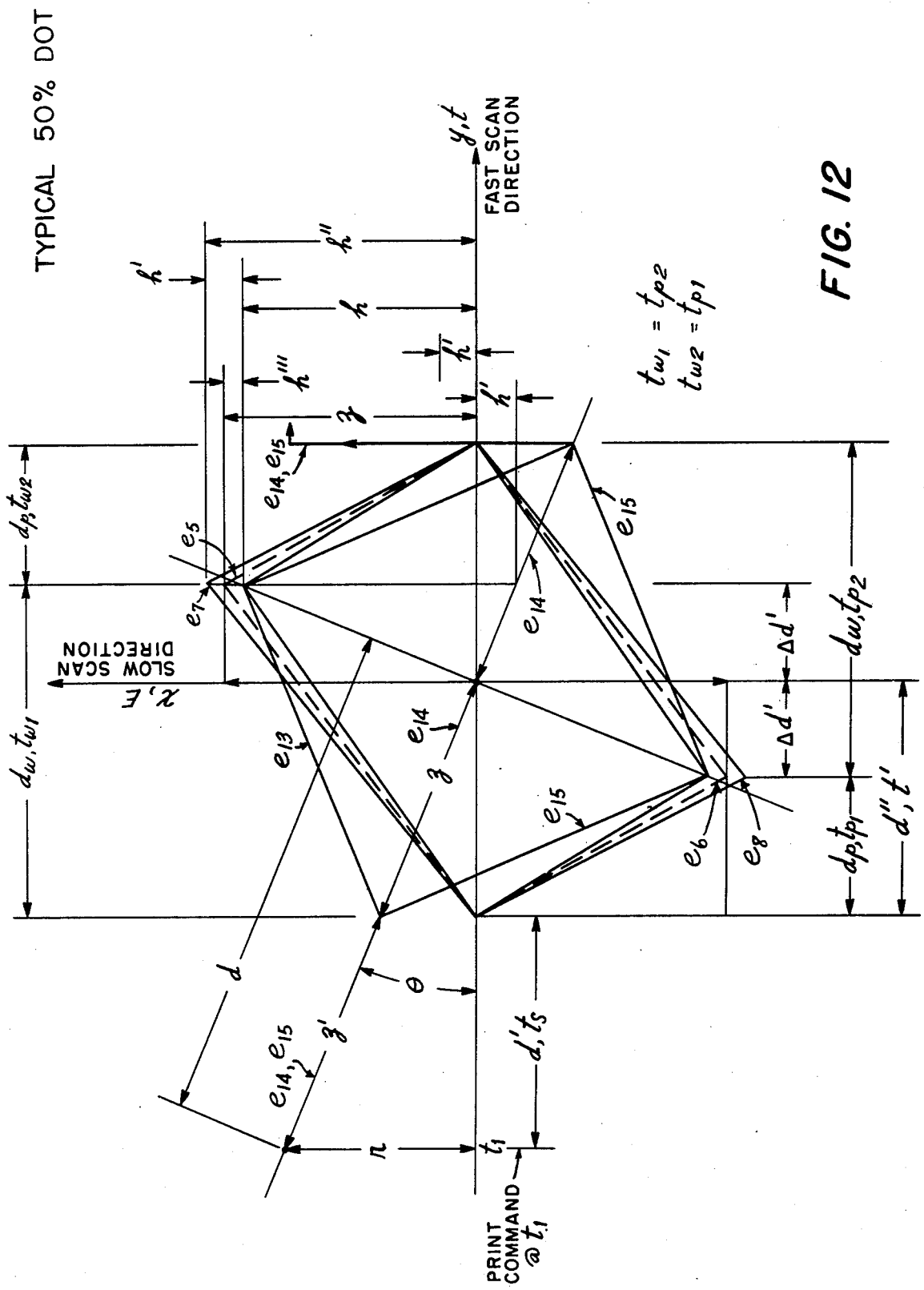

FIG. 12 can be better understood with the help of the following mathematical discussion. For purposes of this discussion, the following definitions must be understood:

R = Ruling in dots per inch
d = Linear distance in inches measured along the surface of the drum 28 of FIG. 1D from the position of the scan at the time of the print command
W = Angular velocity of the drum 28 in rotations per second
V = Linear velocity at the surface of the drum 28 in inches per second
D = Diameter of the drum 28 in inches
$e_c$ = Color signal from the computer 86 in volts
$\theta$ = Screen angle, not as usually defined in the printing art but as defined above for the calculations of the dot-forming circuits The maximum value of $e_c$ is 6.5 volts, and the minimum dot size, which could theoretically be 0%, is generated in response to this voltage. The minimum value of $e_c$ is 0 volts, and the maximum dot size, which could theoretically be 100%, is generated for this value. For an intermediate value of $e_c$ of 3.25 volts, a 50% dot is generated. Actually, in a practical system, limits are set on the sizes of the dots, so that they are never smaller than, say, 5% or larger than, say, 95%. That is the purpose of the double-ended limiter 423 shown at the left of FIG. 3A and of similar circuitry shown schematically in FIGS. 4A and 5A and mentioned in detail later. Disregarding these end limits, dot size is in general equal to a percentage of the maximum theoretical dot size which is expressed by the following relation:

$$\left(100 - \frac{100 e_c}{6.5}\right)\%$$

The value d is of course a function of the ruling R. Specifically:

$$d(R) = 1/R$$

The value r indicated in FIG. 12 is the height measured parallel to the ordinate from the line $e_{14}$, $e_{15}$ to the abscissa. This value is a function of screen ruling $\theta$ and of the magnitude of the ruling R. That is:

$$r(\theta, R) = \frac{\sin\theta}{R}$$

This is easy to see from FIG. 12 since $r = d \sin\theta$.

The value d', which is the linear distance in inches measured along the surface of the drum 28 of FIG. 1D from the position of the scan at the time of the print command to the position of the scan at the time the dot actually begins to be formed, is a function of $\theta$, R, and $e_c$. That is:

$$d'(\theta, R, e_c) = \frac{e_c \cos\theta}{6.5R}$$

For a 50% dot:

$$d'(\theta, R, 3.25) = \frac{\cos\theta}{2R}$$

As FIG. 12 shows, the value h, which is the maximum ordinate of the signal $e_{13}$, is a function of $\theta$, R, $e_c$. That is:

$$h(\theta, R, e_c) = \frac{(6.5 - e_c)\cos\theta}{6.5R}$$

For a 50% dot:

$$h(\theta, R, 3.25) = \frac{\cos\theta}{2R}$$

The value $\Delta d'$ is the distance, measured in the fast-scan or y direction, between the point where $e_6$, $e_8$, and $e_{15}$ reach their minimum ordinates and the point where $e_{14}$ crosses the abscissa. It is also the distance, measured in the fast-scan or y direction, between the point where $e_{14}$ crosses the abscissa and the point where $e_7$, $e_5$, and $e_{13}$ reach their maximum ordinates. It is a function of $\theta$, R, $e_c$:

$$\Delta d'(\theta, R, e_c) = \frac{(6.5 - e_c)\sin\theta}{6.5R}$$

For a 50% dot:

$$\Delta d'(\theta, R, 3.25) = \frac{\sin\theta}{2R}$$

The value h' is equal to the difference between the maximum ordinate of $e_7$ and $e_{13}$. It is a function of $\theta$, R, and $e_c$:

$$h'(\theta, R, e_c) = \Delta d' \tan\theta = \frac{(6.5 - e_c)\sin\theta\tan\theta}{6.5R}$$

For a 50% dot:

$$h'(\theta, R, 3.25) = \frac{\sin\theta\tan\theta}{2R}$$

The value h" is the maximum ordinate of $e_7$. It is a function of $\theta$, R, and $e_c$:

$$h''(\theta, R, e_c) = h + h' = \frac{(6.5 - e_c)(\cos\theta + \sin\theta\tan\theta)}{6.5R}$$

For a 50% dot:

$$h''(\theta, R, 3.25) = \frac{(\cos\theta + \sin\theta\tan\theta)}{2R}$$

The value z is equal to the maximum ordinate of the voltage $e_5$ and is also equal to the distance measured along the curve of the voltage $e_{14}$ from the point where dot formation begins to the point where the curve $e_{14}$ intercepts the abscissa. It is a function of R and $e_c$:

$$z(R, e_c) = \frac{(6.5 - e_c)}{6.5R}$$

For a 50% dot:

$$z(R, 3.25) = \frac{3.25}{6.5R} = \frac{1}{2R}$$

The value $z'$ is the distance measured along the waveforms $e_{14}$ and $e_{15}$ from the position of the scan at the time of the print command to the point where dot formation begins. It is a function of $R$ and $e_c$:

$$z'(R, e_c) = d - z = \frac{1}{R} - \frac{(6.5 - e_c)}{6.5R} = \frac{e_c}{6.5R}$$

For a 50% dot:

$$z'(R, 3.25) = \frac{1}{2R}$$

The value $h'''$ is the difference between the maximum ordinate of $e_c$ and the maximum ordinate of $e_{13}$. It is a function of $\theta$, $R$, and $e_c$:

$$h'''(\theta, R, e_c) = z - h = \frac{(6.5 - e_c) - (6.5 - e_c)\cos\theta}{6.5R} = \frac{(6.5 - e_c)(1 - \cos\theta)}{6.5R}$$

For a 50% dot:

$$h'''(\theta, R, 3.25) = \frac{1 - \cos\theta}{2R}$$

From the equations for $h''$ and $z$, we find:

$$\frac{h''}{z(\theta)} = \frac{(6.5 - e_c)(\cos\theta + \sin\theta\tan\theta)(6.5R)}{6.5R(6.5 - e_c)} = \cos\theta + \sin\theta\tan\theta$$

The value $d''$ is the linear distance in inches measured along the surface of the drum 28 of FIG. 1D from the position of the scan at the beginning of the formation of the dot to the point where $e_{14}$ intercepts the abscissa. It is the function of $\theta$, $R$, and $e_c$:

$$d''(\theta, R, e_c) = z\cos\theta = \frac{(6.5 - e_c)\cos\theta}{6.5R}$$

For a 50% dot:

$$d''(\theta, R, 3.25) = \frac{\cos\theta}{2R}$$

The value $d_w$ is the linear distance in inches measured along the surface of the drum 28 of FIG. 1D from the start of dot formation to the position where $e_5$, $e_7$ and $e_{13}$ reach maximum ordinates. It is a function of $\theta$, $R$, and $e_c$:

$$d_w(\theta, R, e_c) = d'' + \Delta d' = \frac{(6.5 - e_c)\cos\theta + (6.5 - e_c)\sin\theta}{6.5R} = \frac{(6.5 - e_c)(\cos\theta + \sin\theta)}{6.5R}$$

For a 50% dot:

$$d_w(\theta, R, 3.25) = \frac{(\cos\theta + \sin\theta)}{2R}$$

The value $d_p$ is the distance from the beginning of the formation of the dot to the point where $e_6$, $e_8$ and $e_{15}$ reach their minimum ordinates, measured parallel to the abscissa. It is a function of $\theta$, $R$, and $e_c$:

$$d_p(\theta, R, e_c) = d'' - \Delta d' = \frac{(6.5 - e_c)(\cos\theta - \sin\theta)}{6.5R}$$

For a 50% dot:

$$d_p(\theta, R, 3.25) = \frac{(\cos\theta - \sin\theta)}{2R}$$

In the system disclosed, $D = 4.138''$. In any system, $V = W\pi D$. Therefore, in the system disclosed, $V = 13W$.

The value $t_{w1}$ is the time between the start of dot formation and the instant when $e_5$, $e_7$ and $e_{13}$ reach their maximum ordinates. It is a function of $\theta$, $R$, $e_c$ and $W$:

$$t_{w1}(\theta, R, e_c, W) =$$
$$t_{p2}(\theta, R, e_c, W) = \frac{d_w}{V} = \frac{(6.5 - e_c)(\cos\theta + \sin\theta)}{(6.5R)(13W)}$$

For a 50% dot:

$$t_{w1}(\theta, R, 3.25, W) = t_{p2}(\theta, R, 3.25, W) = \frac{\cos\theta + \sin\theta}{2R(13W)}$$

The value $t_{w2}$ is the time between the instant when $e_5$, $e_7$ and $e_{13}$ reach their maximum ordinates and the end of the dot. It is a function of $\theta$, $R$, $e_c$, and $W$:

$$t_{w2}(\theta, R, e_c, W) =$$
$$t_{p1}(\theta, R, e_c, W) = \frac{d_p}{V} = \frac{(6.5 - e_c)(\cos\theta - \sin\theta)}{6.5R(13W)}$$

For a 50% dot:

$$t_{w2}(\theta, R, 3.25, W) = t_{p1}(\theta, R, 3.25, W) = \frac{\cos\theta - \sin\theta}{2R(13W)}$$

The value $t_s$ is the time interval between the time of the print command and the time of the beginning of the formation of the dot. It is a function of $\theta$, $R$, $e_c$, and $W$:

$$t_s(\theta, R, e_c, W) = \frac{d'}{V} = \frac{e_c \cos\theta}{6.5R(13W)}$$

For a 50% dot:

$$t_s(\theta, R, 3.25, W) = \frac{\cos\theta}{2R(13W)}$$

The value $t'$ is the time interval between the beginning of the dot formation and the time when the curve $e_{14}$ crosses the abscissa. It is a function of $\theta$, $R$, $e_c$, and $W$:

$$t'(\theta, R, e_c, W) = \frac{d''}{V} = \frac{(6.5 - e_c)\cos\theta}{6.5R(13W)}$$

For a 50% dot:

$$t'(\theta, R, 3.25, W) = \frac{\cos\theta}{2R(13W)}$$

FIG. 11 shows the growth of $e_7$, $e_8$, $e_{10}$, $e_{11}$, $e_{12}$ with increases in dot size. The width of the dot is determined by $e_{12}$, which is equal to $e_{10}-e_{11}$, the latter being a negative voltage. The signal $e_9$ also shown in FIG. 11 is a constant clipping voltage level. It limits the displacement of the galvanometers in the x direction for dots greater than 50% dots. This reduces the load on the galvanometers and prevents dot overlap. For dots up to and including a 50% dot, the waveforms $e_7$ and $e_{10}$ are identical. Similarly, the waveforms $e_8$ and $e_{11}$ are identical. For dots larger than a 50% dot, the waveforms $e_7$ and $e_8$ continue to increase in absolute magnitude to a peak as before. However, the waveforms $e_{10}$ and $e_{11}$ are limited by the voltage $e_9$ to their maximum values attained in the case of a 50% dot. For dots up to 50%, the voltage $e_{12}$, which is a measure of the width of the dot, is a constant between the time when the voltage $e_{11}$ reaches its minimum value and the time when the voltage $e_{10}$ reaches its maximum value. For dots larger than 50%, the voltage $e_{12}$ has a relatively steep positive slope up to the point where the clipping voltage level $e_9$ limits $e_{11}$ and a shallower positive slope, parallel to $e_{10}$, from that point to the point where $e_{10}$ is limited by $e_9$. That is the maximum value of $e_{12}$. Similarly, it has a relatively shallow negative slope equal in absolute value to the slope of $e_{11}$ but of opposite sign, between the point where $e_{11}$ acquires a value having an absolute magnitude less than $e_9$ and the point where the waveform $e_{10}$ becomes less than $e_9$. From the latter point on, the waveform $e_{12}$ has a steeper descending slope, which is the same as its slope (for a given screen angle $\theta$) in the case of dots equal to or less than 50% of maximum size.

Figure 13:
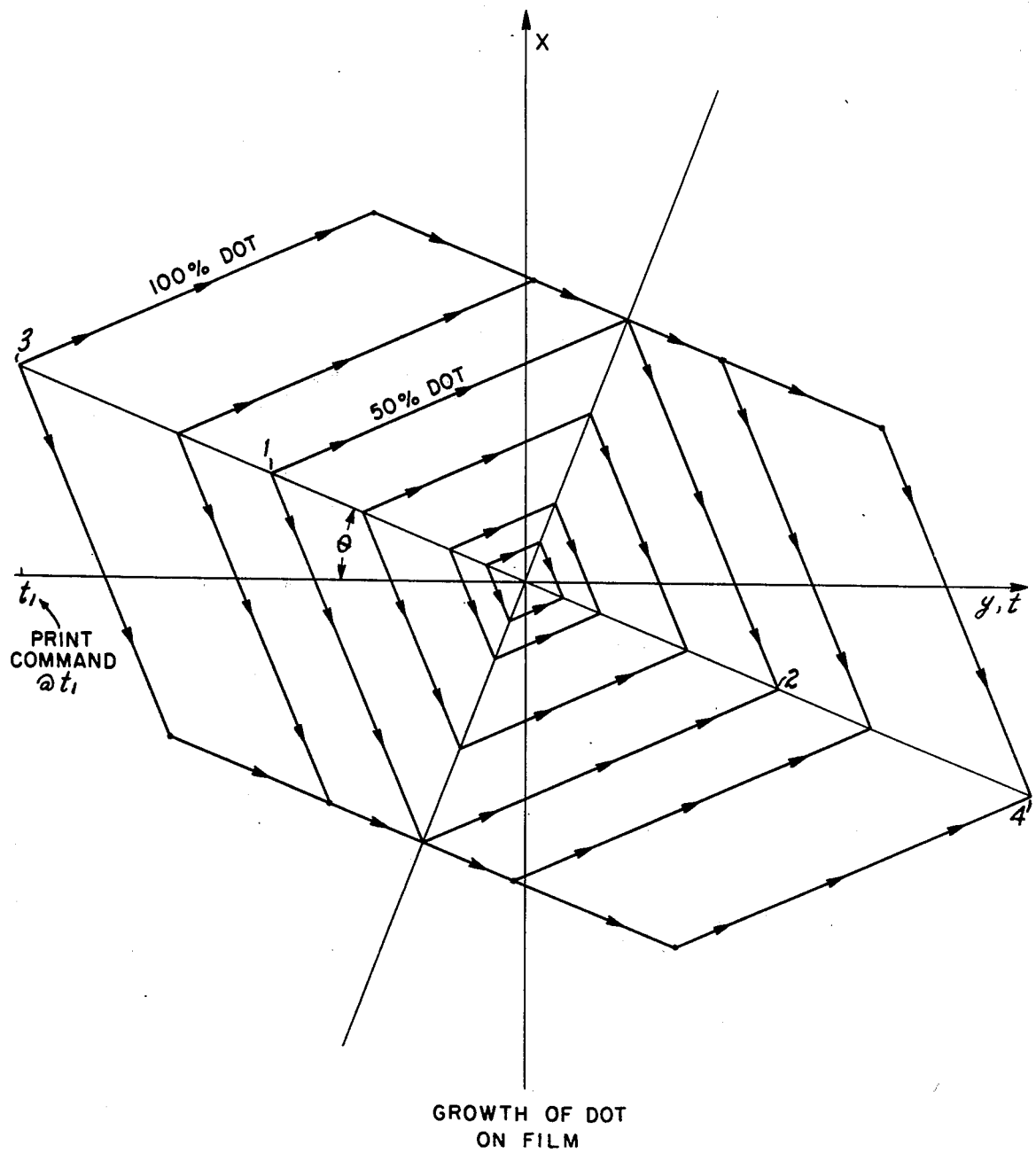

FIG. 13 shows the growth of dots of various sizes on the film. The same screen angle $\theta$ is illustrated as in FIGS. 11 and 12. The time of the print command $t_1$ is indicated in FIG. 13. Dots up to 50% dots are square; dots larger than 50% have six sides, the two first sides and the two last sides being equal to the sides of a 50% dot, and the two middle sides ranging in length from 0 (in the case of a 50% dot) to twice an edge of a 50% dot divided by the square root of 2 (in the case of a 100% dot). A 50% dot begins formation at point 1 and ends formation at point 2, while a 100% dot begins formation at point 3 and ends formation at point 4. The arrowheads indicate the direction of growth of the dot edges.

Figure 14:
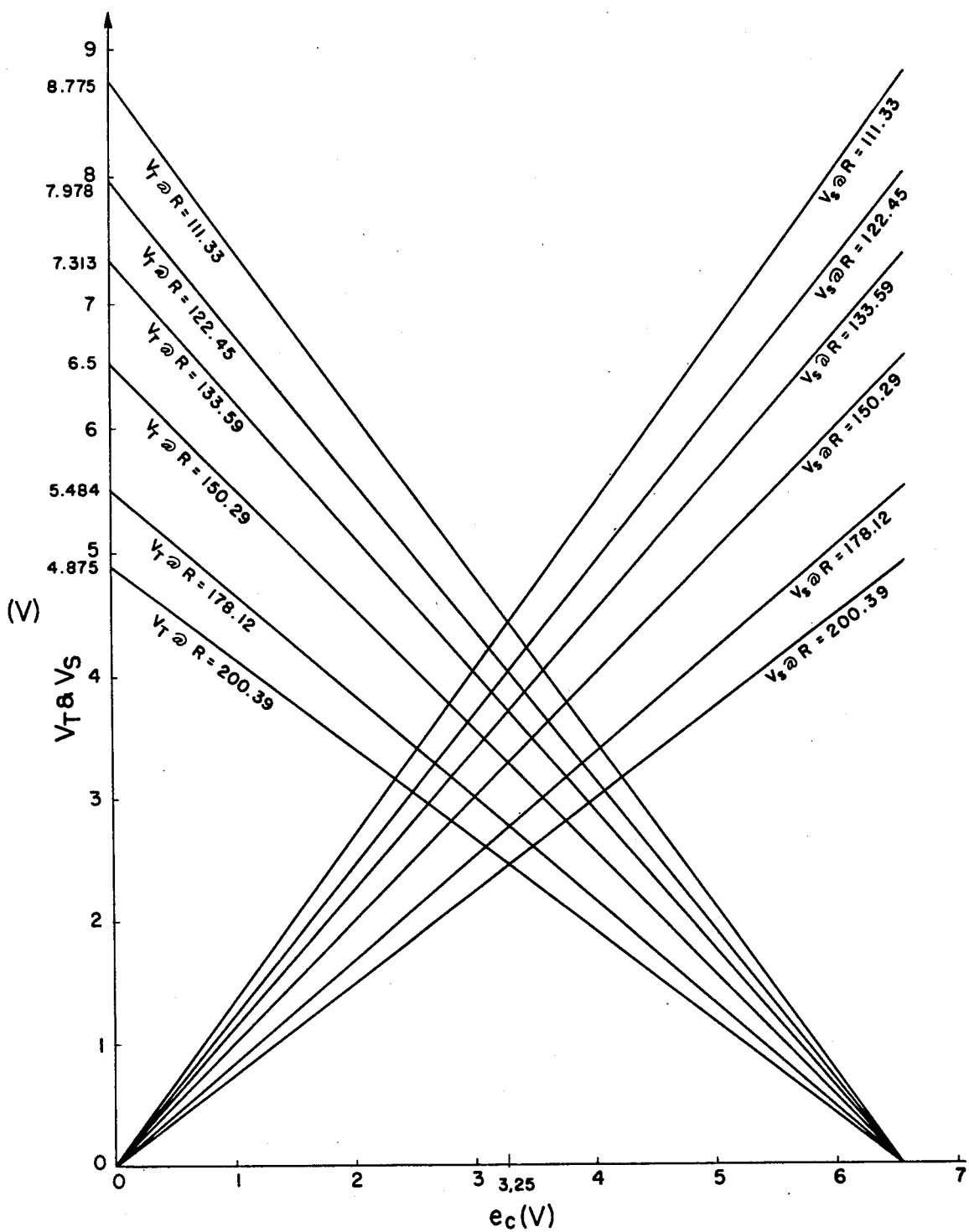

FIG. 14 plots $V_T$ and $V_S$ as functions of $e_c$. All units are in volts. The values of $V_T$ and $V_S$ range between 0 and 8.775 volts in the case of the coarsest screen ruling and between 0 and smaller maximum voltages in the case of finer screen rulings. As explained above, the screen rulings, designated R, can assume any value such as 110, 120, 133, 150, 175 and 200 lines per inch. The value of $e_c$ ranges between 0 and 6.5 volts regardless of the screen ruling. The values of $V_T$ and $V_S$ as functions of $e_c$ are linear and vary with the screen ruling. The plots for $V_T$ and $V_S$ are symmetrical about $e_c=3.24$ volts, the values of $V_T$ being linearly descending and the values of $V_S$ being linearly ascending.

Much of the description of drawing FIGS. 3A and B applies also to FIGS. 4A and B. The significant differences between the two relate to the fact that FIGS. 3A and B disclose the circuitry for forming dots where the screen angle is conventionally designated 30°, 60°, 75° or 105° (15°) whereas FIGS. 4A and B disclose the circuitry in the case where the screen angle is 45°.

In the case of FIGS. 4A and B, the print-command signal from the appropriate lead (say 150) of the dot-position generator 146 (FIG. 1B) is supplied to a circuit 536 that produces alternate outputs Q and $\bar{Q}$ in response to successive print-command signals. The output Q on a line 537 starts a timer 538. When the timer 538 goes positive, it closes an FET switch 540. This permits the negative voltage $e_3$ generated by a frequency-to-voltage converter 542 to be supplied as an input to the terminal 544 of a "width" integrator 546. The amplification coefficient for signals applied to this terminal is proportional to $1/(\cos\theta + \sin\theta)$, where $\theta$ is the screen angle as specially defined above. The output of the timer 538 is supplied also as an input to an OR-gate 548. The OR-gate 548 produces an output in response, which opens an FET switch 550. This isolates the summing junction input terminal 552 of the width integrator 546 from the output $e_5$ and allows integration to start. That is, the opening of the FET switch 550 removes the short across the integrating amplifier 546. The output $e_5$ is supplied as one input to a turnaround comparator 554. The other input to the comparator 554 is the voltage $e_9$ generated by an amplifier 556. The input to the amplifier 556 is a voltage $V_d$, which equals a constant $-2.4375$ volts. The amplification coefficient for signals applied to the amplifier 556 is proportional to $(\cos\theta + \sin\theta \tan\theta)/$screen ruling, where $\theta$ is the screen angle as specially defined above. This input voltage $V_d$ is derived from a potentiometer 558 supplied by the reference voltage $V_R$.

When the voltage $e_5$ equals $e_9$, the comparator 554 goes negative and produces an output that clears the timer 538. This terminates the positive integration of the width integrator 546. When the timer 538 times out, the trailing edge of the timing pulse, which is negative-going, starts a timer 560. The output Q of the timer 560 is supplied to the OR gate 548 so that the FET switch 550 remains open. At the same time, the disappearance of the complementary output $\bar{Q}$ closes an FET switch 562 and permits application of the positive voltage $e_2$, generated by the frequency-to-voltage converter 542, to the terminal 564 of the width integrator 546. The amplification of signals applied to this terminal is proportional to $1/(\cos\theta - \sin\theta)$, where $\theta$ is the screen angle as specially defined above. This permits a linearly-descending integration to start. The linearly-descending output $e_5$ is supplied to an input terminal 566 of a $V_o$ comparator 568, the other input terminal 570 of which is grounded. Accordingly, when the voltage $e_5$ returns to 0, the comparator 568 produces an output that clears the timer 560. The timer 560 is then ready for the next print-command signal. The timer 538 is cleared by the turnaround comparator 554 so that it, too, is ready for the next print-command signal.

The circuitry 572 described above helps to control the width galvanometer. Control of the position galvanometer is effected by means including circuitry 574. This circuitry is identical to circuitry 572 except for time constants. The position galvanometer is controlled as follows: When the signal $\bar{Q}$ is generated on a line 575 by the circuitry 536, this starts a timer 576. The timer 576 produces an output Q that closes an FET switch 578, which permits the negative signal $e_3$ developed by the frequency-to-voltage converter 542 to be applied to the terminal 580 of the position integrator 582. The amplification of signals applied to this terminal 580 is proportional to $1/(\cos\theta - \sin\theta)$, where $\theta$ is the screen angle as specially defined above. The output of the timer 576 is also supplied as an input to an OR gate 584, which opens an FET switch 586 and removes the short between the output 588 and the summing junction 590 of the position integrator 582. This allows integration to start. The output $e_6$ of the position integrator 582 is supplied as one input to the turnaround-voltage comparator 592. The other input to the comparator 592 is the limit voltage $e_9$ generated by the amplifier 556. When the voltage $e_6$ equals the voltage $e_9$, the turnaround comparator 592 generates an output at the output terminal 594 that clears the timer 576, terminating positive integration by the integrator 582. The negative-going signal from the timer 576 starts a timer 596, which produces an output Q through the OR gate 584 so that the FET switch 586 remains open. At the same time, the loss of the complementary output $\bar{Q}$ from the timer 596 closes an FET switch 598 and permits the positive signal $e_2$ generated by the circuitry 542 to be supplied to the input terminal 600 of the position integrator 582. The amplification of signals applied to this terminal is proportional to $1/(\cos\theta + \sin\theta)$, where $\theta$ is the screen angle as specially defined above. The position integrator 582 then begins to integrate negatively, so that the output $e_6$ decreases linearly. This voltage is supplied to one input terminal 602 of a $V_o$ comparator 604 the other input terminal 606 of which is grounded. When the voltage $e_6$ reaches 0, the comparator 604 produces an output at the output terminal 608 that clears the timer 596. The clearing of the timer 596 stops the integration. Also, the OR gate 584 no longer produces an output, so that the FET switch 586 closes and shorts the summing junction 590 of the position integrator 582 to the output 588.

The purpose of the strobes Q, $\bar{Q}$ generated by the timer 560 and applied to the comparators 554 and 568 and of the strobes Q, $\bar{Q}$ generated by the timer 596 and applied to the comparators 592 and 604 is to make sure that the outputs of these comparators are in the proper state so that the timer switches they control are in condition to start timing upon receipt of the input signals to the respective timers.

The circuitry 572, 574 ensures that the signals $e_5$ and $e_6$ have the right duration. The circuitry now to be described ensures that they have the right amplitude.

The signals $e_5$ and $e_6$ are supplied to the two input terminals of a "greater-of" circuit 610 that produces an output $e_{17}$ equal to the greater of $e_5$ and $e_6$. The signal $e_{17}$ is supplied to a tilt-correcting amplifier 612, the gain of which is proportional to $\cos\theta + \sin\theta \tan\theta$, where $\theta$ is the screen angle as specially defined above.

The tilt-correcting amplifier 612 produces a signal $e_7$ that is supplied to one input terminal 614 of a single-ended limiter 616. The other input terminal 618 of the single-ended limiter 616 receives a voltage $V_T$. This is not a fixed voltage as is the voltage $e_9$ in FIG. 3B but rather the variable output of an amplifier 620 (FIG. 4A). The amplifier 620 produces an output which is variable in dependence on $e_c'$. The latter is the same as the tonal density signal $e_c$ on the appropriate line, say the line 96, from the computer 86 (FIGS. 1C & D) limited by a double-ended limiter 624 so that it stays within the range $V_b < e_c' < V_a$, where $V_b$ corresponds to the absolute minimum dot size and $V_a$ corresponds to the absolute maximum dot size. The signal $e_c'$ is supplied to the input terminal 624 of the amplifier 620 and is amplified proportionally to the screen ruling. The other terminal 626 of the amplifier 620 receives a constant input derived by a potentiometer 628 from the reference voltage $-V_R$.

The output of the single-ended limiter 616 is a voltage $e_{10}$, which is the smaller of the voltages $V_T$ and $e_7$.

The voltage $e_{17}$ is also supplied as an input to a tilt-correcting amplifier 630 which has a gain proportional to $\cos\theta + \sin\theta \tan\theta$, where $\theta$ is the screen angle as specially defined above. This produces an output $e_8$ that is supplied to one input terminal 632 of a single-ended limiter 634. The input to the other input terminal 636 of the single-ended limiter 634 is the voltage $V_T$. The single-ended limiter 634 produces an output $e_{11}$ that is supplied as an input to a summer 636. The other input to the summer 636 is the voltage $e_{10}$. The summer 636 sums the voltages $e_{10}$ and $e_{11}$ to produce a voltage $e_{12}$. The voltage $e_{12}$ is one input to a summer 638. The other input to the summer 638 is a flare-bias reference voltage $V_f$, which is derived from a potentiometer 640 supplied by the reference voltage $-V_R$. The summer 638 sums $V_f$ and $e_{12}$ to produce $e_{13}$, the output to the width galvanometer amplifier (FIG. 10). The voltage $e_{13}$ is the same as $e_{12}$ except that the flare bias $V_f$ is applied when an FET switch 642 is opened by the dot window signal $e_{16}$ from a width gate comparator 644. This comparator 644 produces an output when its input $e_{17}$ exceeds the voltage $V_s$. The latter is the output of an amplifier 646 (FIG. 4A) that receives the signal $V_T$ at its input terminal 648 and the signal $V_c$ at its input terminal 650. The gain for signals applied to the first input terminal 648 is unity and for signals applied to the second input terminal 650 is proportional to the reciprocal of the screen ruling. The output of the width gate comparator 644 thus lasts for the duration of the dot-forming process.

At the end of the dot-forming process, the FET switch 642 is closed, the output and input of the summer 638 are shorted, and $e_{13}$ goes to zero. A dot-complete pulse is generated on, say the line 192 (see also FIGS. 1B & C), by a timer 652 upon termination of the signal from the width gate comparator 644. When the voltage $e_{13}$ goes to zero, this removes the flare bias $V_f$, and the laser beam is moved a distance from the knife edge 256 shown by way of example in FIG. 8 sufficient to prevent any flare from going around the knife edge 256.

The output of the single-ended limiter 634 is also supplied to an inverter 654. This inverts the signal to produce $e_{15}$, which is the output to the position galvanometer amplifier (FIG. 10).

Thus, in the case of the 45° dot-forming circuitry, the width and position integrators 546, 582 perform identical functions alternately. Each controls the width and the position of the dot, since the dot is symmetrical about a screen axis forming an angle of 45° with respect to the scan direction. In this special case of screen direction, either the circuitry 572 or the circuitry 574 could be used alone. There is advantage in using both on a time-shared basis, however, since the circuitry then corresponds more closely to that used in the case of the other screen angles.

Figure 15:
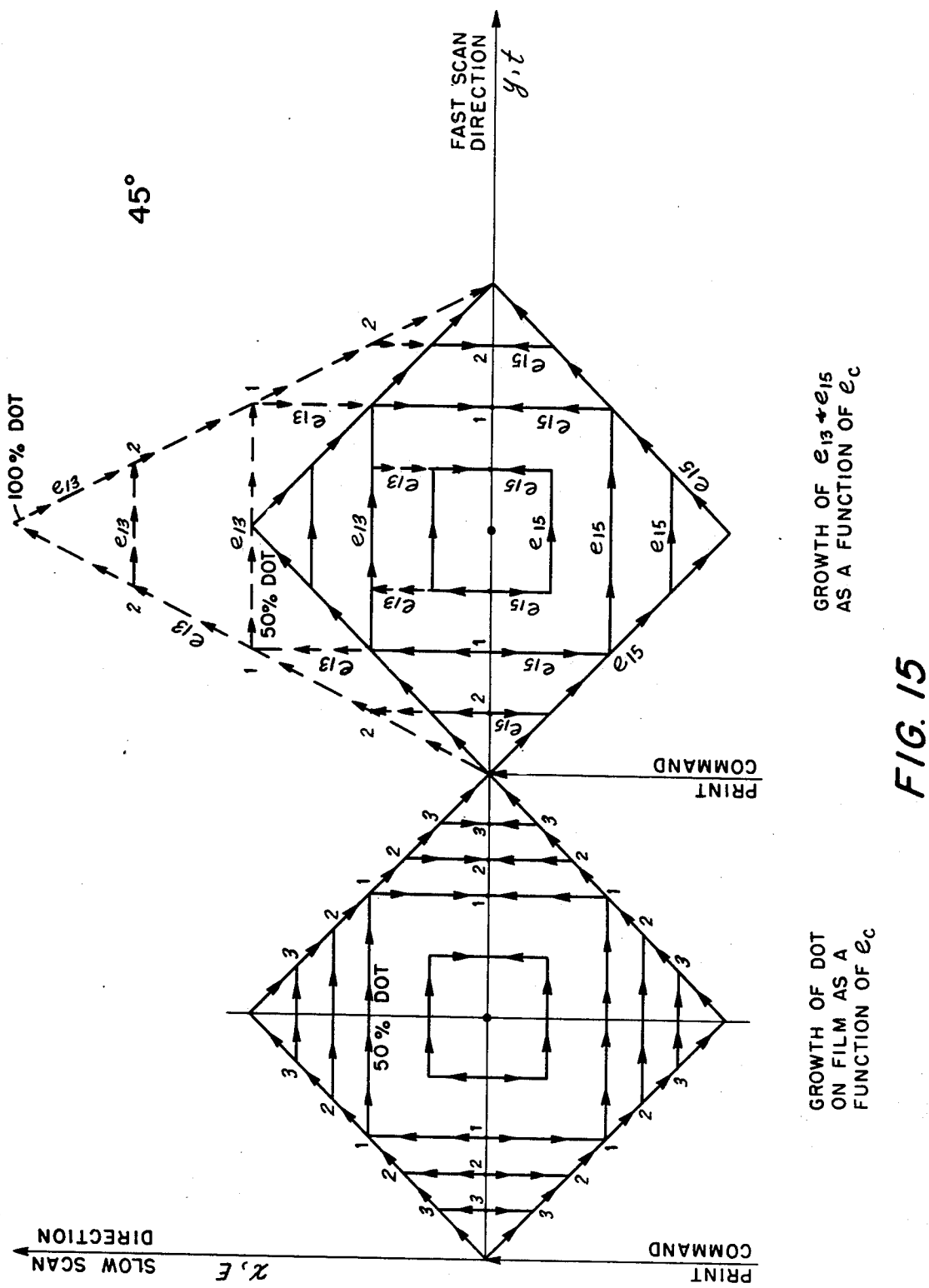

FIG. 15 shows in the left half the growth of a dot on film as a function of $e_c$ and in the right half the growth of $e_{13}$ and $e_{15}$ as a function of $e_c$. The x or E axis (representing the slow scan direction or voltage) is vertical and the y or t axis (representing the fast scan direction or time) is horizontal. Two print commands are shown, marking the starts of successive dot-forming processes. The left half traces with numbers 1 the formation of a 50% dot, with numbers 2 the formation of a dot larger than 50%, and with numbers 3 the formation of a still larger dot. Inside the 50% dot is a square representing the formation of a dot smaller than 50%. The outside line represents the formation of a 100% dot.

In the right half, the numbers 1 again represent the formation of a 50% dot. The value $e_{13}$ is twice the inverted value of $e_{15}$. The numbers 2 represent the formation of a dot larger than 50%, and the outside graph represents the formation of a dot of 100%. Inside the 50% dot is an additional tracing representing the formation of a dot smaller than 50%.

Figure 5B:
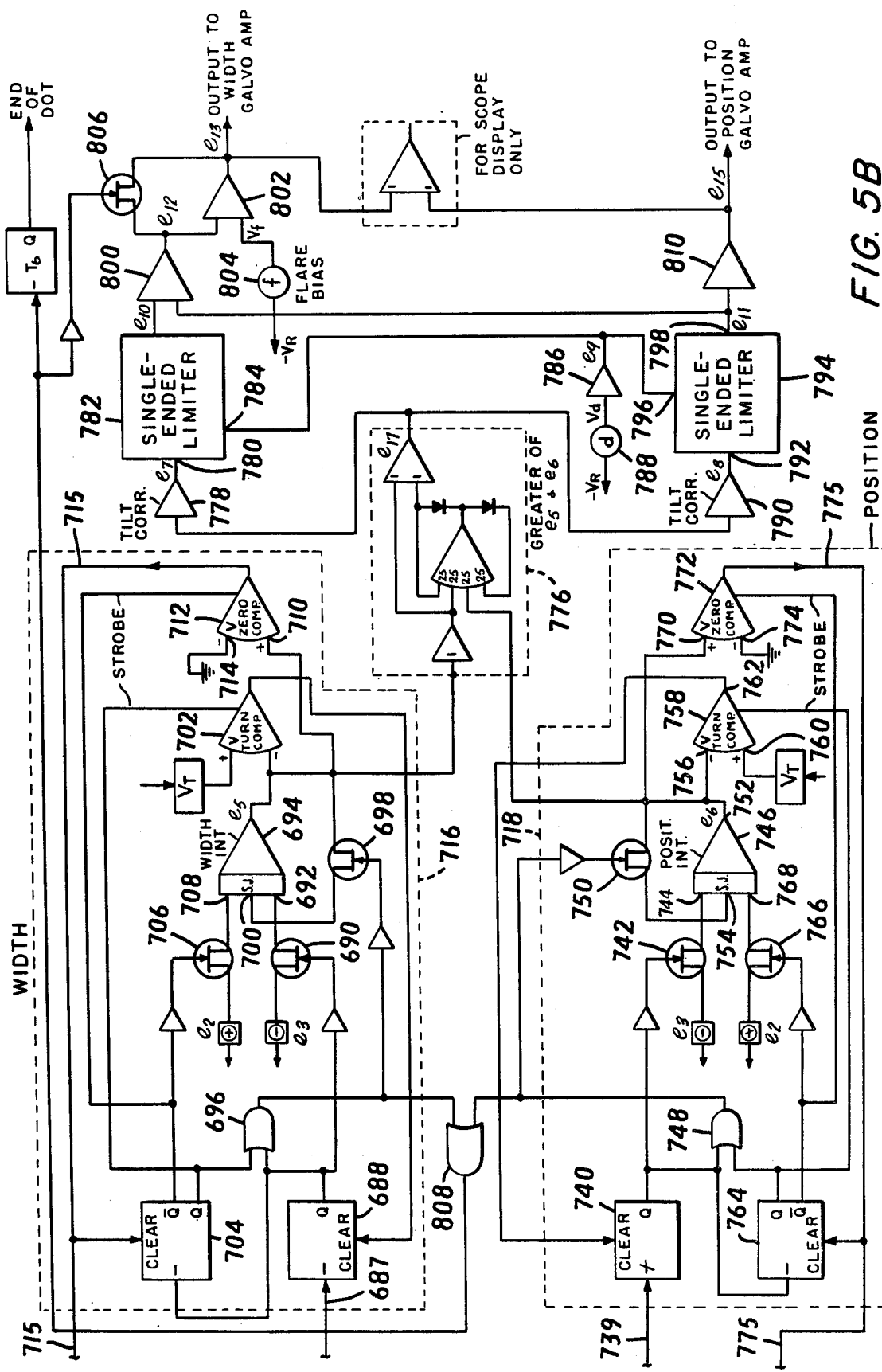

In FIGS. 5A and B, which show circuitry helping to control the forming of dots where the screen angle is 90°, a print-command or when signal from the associated digital mini-computer is supplied to circuitry 656 on, say the line 154 (see also FIGS. 1B and C). The circuit 656 produces alternately outputs Q and $\bar{Q}$ in response to successive print-command signals. The signal Q starts a timer 658. The timer 658 then generates a positive voltage that closes an FET switch 660 so that the negative voltage $e_3$ generated by a frequency to voltage converter 662 is supplied to the input 664 of an integrator 666. The gain for signals applied to this terminal 664 is proportional to $1/\cos\theta$, where $\theta$ is the screen angle as specially defined above. The signal from the timer 658 also opens an FET switch 668, which removes the short between the output 670 of the integrator 666 and its summing junction 672. The integrator 666 begins to integrate and produces a ramp voltage $e_4$. The ramp voltage $e_4$ is supplied as an input to a terminal 674 of a V start comparator 676, which produces a signal at its output terminal 678 at the start of one start dot. The input to the other input terminal 680 of the comparator 676 is a voltage $V_s$, which is the output of an operational amplifier 682. One of the inputs to the operational amplifier 682 is a voltage $V_T$, which is the voltage at the turnaround. The other input to the amplifier 682 is a reference voltage $V_c$, which is $-6.5$ volts. The voltage $V_T$ is produced by an operational amplifier 684, which has as one of its inputs the same reference voltage $V_c$ and as its other input the signal $e_c'$, which is the signal $e_c$ on the appropriate one of the lines 94–100, say the line 100, from the computer 86 (see also FIGS. 1C and D) as limited by a double-ended limiter 686 so that it cannot be less than $V_b$, corresponding to the absolute minimum dot size, or greater than $V_a$, corresponding to the absolute maximum dot size. The comparator 676 changes states when the voltage $V_s$ supplied to its input terminal 680 exceeds the voltage $e_4$ supplied to its input terminal 674. When the comparator 676 changes states, it produces an output on a line 687, and a timer 688 (FIG. 5B) goes positive and closes an FET switch 690. This permits the negative voltage $e_3$ generated by the frequency-to-voltage converter 662 (FIG. 5A) to be supplied to the input terminal 692 (FIG. 5B of a "width" integrator 694. Signals applied to this terminal 692 are amplified proportionally to $1/(\cos\theta + \sin\theta)$, where $\theta$ is the screen angle as specially defined above. The output of the timer 688 is supplied also to an OR gate 696. The OR gate 696 produces an output in response which opens an FET switch 698. This isolates the summing junction 700 of the width integrator 694 from the output $e_5$ and allows integration to start. That is, the opening of the FET switch 698 removes the short across the integrating amplifier 694. The output $c_5$ is supplied as one input to a turnaround comparator 702. The other input to the comparator 702 is the voltage $V_T$ produced by the operational amplifier 684 (FIG. 5A). When the signal $e_5$ (FIG. 5B) equals $V_T$, the comparator 702 goes negative and produces an output that clears the timer 688. This terminates the positive integration of the width integrator 694. When the timer 688 times out, the trailing edge of the timing pulse, which is negative-going, starts a timer 704. The output Q of the timer 704 is supplied to the OR gate 696 so that the FET switch 698 remains open. The loss of the complementary output $\bar{Q}$ from the timer 704 closes an FET switch 706 and permits application of the positive voltage $e_2$, generated by the frequency-to-voltage converter 662, to the terminal 708 of the width integrator 694. The gain for signals applied to the terminal 708 is proportional to $1/(\cos\theta - \sin\theta)$, where $\theta$ is the screen angle as specially defined above. This permits a linearly-descending integration to start. The linearly-descending output $e_5$ is supplied to the plus input terminal 710 of a $V_O$ comparator 712, the minus input terminal 714 of which is grounded. Accordingly, when the voltage $e_5$ returns to 0, the comparator 712 produces an output on a line 715 that clears the timers 658 (FIG. 5A) and 704 (FIG. 5B). These timers 658 and 704 are then ready for the next print command.

The circuitry 716 described above helps to control the width galvanometer. Control of the position galvanometer is effected by means including circuitry 718. This circuitry is identical to circuitry 716 except for time constants. The circuitry 718 for helping to control the position galvanometer operates as follows:

The circuit 656 (FIG. 5A) generates a signal $\bar{Q}$ alternately with its generation of the signal Q. The signal $\bar{Q}$ starts a timer 720. The timer 720 then generates a positive voltage level that closes an FET switch 722 so that the negative voltage $e_3$ generated from the encoder signal $e_1$ on the line 170 (see also FIGS. 1C and D) by the frequency-to-voltage converter 622 is supplied to the input terminal 724 of a T start integrator 726. The gain of signals applied to the terminal 724 is proportional to $1/\cos\theta$, where $\theta$ is the screen angle as specifically defined above. The signal from the timer 720 also opens an FET switch 728, which removes the short between the output 730 of the T start integrator 726 and its summing junction 732. The T start integrator 726 then begins to integrate and produces a ramp voltage $e_4$. The ramp voltage $e_4$ is supplied as one input to a V start comparator 734. The other input to the comparator 734 is the voltage $V_S$, which is the output of the operational amplifier 682. The comparator 734 changes states when the voltage $e_4$ supplied to its input terminal 736 extends the voltage $V_S$ supplied to its input terminal 738. When the comparator 734 changes states, it produces a signal on a line 739 and timer 740 (FIG. 5B) goes positive and closes an FET switch 742. This permits the negative voltage $e_3$ generated by the frequency-to-voltage converter 662 (FIG. 5A) to be supplied to an input terminal 744 (FIG. 5B) of a position integrator 746. The output of the timer 740 is supplied also as an input to an OR-gate 748. The OR-gate 748 produces an output that opens an FET switch 750 and removes the short between the output terminal 752 and the summing junction 754 of the position integrator 746. This allows integration to start. The output $e_6$ of the position integrator 746 is supplied to one input terminal 756 of a turn-around-voltage comparator 758. The input to the other input terminal 760 of the comparator 758 is the voltage $V_T$ generated by the operational amplifier 684 (FIG. 5A). When the voltage $e_6$ equals the voltage $V_T$, the comparator 658 generates an output at its output terminal 762 which clears the timer 740, terminating positive integration by the integrator 746. The negative-going signal from the timer 740 starts a timer 764, which supplies an output Q to the OR-gate 748 so that the FET switch 750 remains open. At the same time, the disappearance of the complementary output $\overline{Q}$ from the timer 764 closes an FET switch 766 and permits the positive signal $e_2$, generated by the circuit 662 (FIG. 5A), to be supplied to the input terminal 768 of the position integrator 746. The position integrator 746 then begins to integrate negatively so that the output $e_6$ decreases linearly. The voltage $e_6$ is supplied to the plus input terminal 770 of a $V_O$ comparator 772 the minus input terminal 774 of which is grounded. When the voltage $e_6$ reaches zero, the comparator 772 produces an output on a line 775 that clears the timers 720 (FIG. 5A) and 764 (FIG. 5B). The clearing of these timers 720, 764 places them in condition for their next cycle of operation, and the clearing of the latter 764 stops the integration. Also, the OR gate 748 no longer produces an output, so that the FET switch 750 closes and shorts the summing junction 754 of the position integrator 746 to the output terminal 752.

The purpose of the strobes applied to the comparators 702, 712 by the Q, $\overline{Q}$ outputs of the timer 704 and of the strobes applied to the comparators 758, 772 by the Q, $\overline{Q}$ outputs of the timer 764 is to make sure that the outputs of these comparators 702, 712, 758, 772 are in the proper state so that the timers they control are in condition to start timing upon receipt of the input signals to the respective timers.

The circuitry 716, 718 described above ensures that the dots are of proper duration. The circuitry now to be described ensures that they are of proper amplitude.

The signals $e_5$ and $e_6$ are supplied to a "greater-of" circuit 776, which produces an output $e_{17}$ equal to the greater of $e_5$ and $e_6$. The signal $e_{17}$ is applied to a tilt-correcting amplifier 778, the gain of which is proportional to $\cos \theta + \sin \theta \tan \theta$, where $\theta$ is the screen angle as specially defined above. The tilt-correcting amplifier 778 produces a signal $e_7$ that is supplied to one input terminal 780 of a single-ended limiter 782. The other input terminal 784 of the single-ended limiter 782 receives the limit voltage $e_9$ generated by an operational amplifier 786. The input to the operational amplifier 786 is a voltage $V_d$, which is a reference voltage set at a constant $-2.4375$ volts. This reference voltage is obtained from a potentiometer 788, which is supplied by the reference voltage $-V_R$. The output of the single-ended limiter 782 is equal to the voltage $e_7$ so long as the voltage $e_7$ does not exceed in absolute value the voltage $e_9$. In either case, the output of the single-ended limiter 782 is designated $e_{10}$.

The voltage $e_{17}$ is supplied also as an input to a tilt-correcting amplifier 790, which has a gain proportional to $\cos \theta + \sin \theta \tan \theta$, where $\theta$ is the screen angle as specially defined above. This produces an output $e_8$ that is supplied to one input terminal 792 of a single-ended limiter 794. The other input terminal 796 of the single-ended limiter 794 receives the limit voltage $e_9$. The single-ended limiter 794 produces at its output terminal 798 an output $e_{11}$ that is supplied as a second input to a summer 800. The summer 800 sums the waveforms $e_{10}$ and $e_{11}$ to produce a waveform $e_{12}$. The waveform $e_{12}$ is one input to a summer 802. The other input to the summer 802 is a flare-bias reference voltage $V_f$, which is derived from a potentiometer 804, supplied by the reference voltage $-V_R$. The summer 802 sums $V_f$ and $e_{12}$ to produce $e_{13}$, the output to the appropriate width galvanometer amplifier (FIG. 10). The voltage $e_{13}$ is the same as $e_{12}$ except that the flare-bias $V_f$ is applied when an FET switch 806 is actuated by the dot-window signal from an OR gate 808. The OR gate 808 produces an output when the OR gate 696 or 748 produces an output. The output of the OR gate 808 thus lasts for the duration of each dot-forming process. At the end of a dot-forming process, if a new dot-forming process has not been initiated, the FET switch 806 is closed, the output and input of the summer 802 are shorted, and $e_{13}$ goes to zero. This applies the flare-bias $V_f$, and the laser beam is moved a distance from the knife edge 256 shown by way of example in FIG. 8, sufficient to prevent any flare from going around the knife edge 256.

The output of the single-ended limiter 794 is also supplied to an inverter 810 to produce a signal $e_{15}$, which is the output to the appropriate position galvanometer amplifier (FIG. 10).

Figure 16:
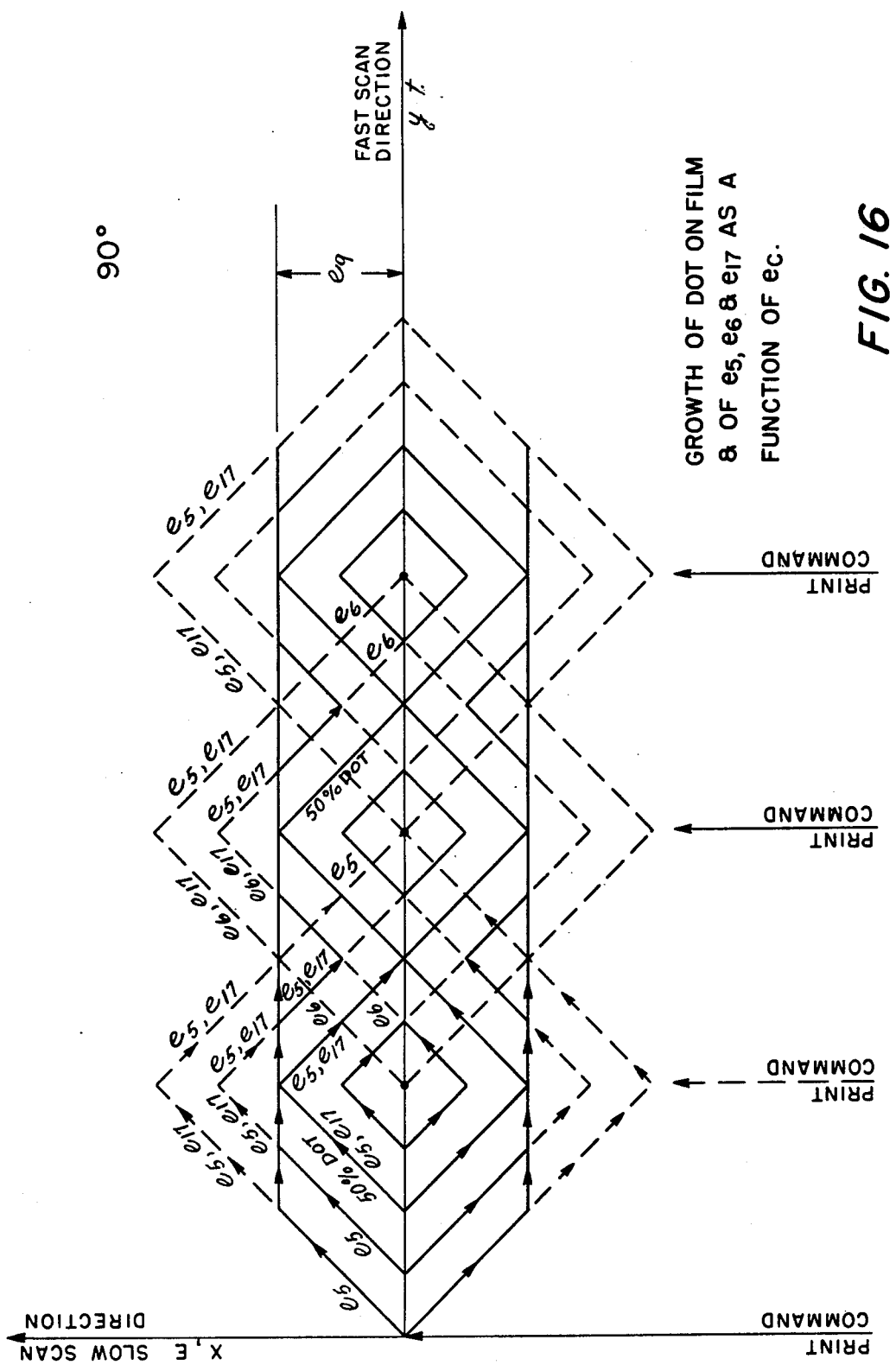

FIG. 16 shows the growth of a dot on film and of $e_5$, $e_6$, and $e_{17}$ as a function of $e_c$. Values of x or E (representing the slow scan direction or voltage) are plotted vertically, and values of y or t (representing the fast scan direction or time) are plotted horizontally. Four successive "when" or print-command signals are represented. The values $e_5$ and $e_6$ appear in alternate cycles following successive print commands. The values $e_{17}$ are identical to $e_5$ or $e_6$, as the case may be. Dot size is limited by the constant $e_9$, and values of $e_5$, $e_{17}$ extending beyond the limits imposed by $e_9$ are not reflected in dot growth and so are shown in broken outline. Similarly, values of $e_5$ or $e_6$, as the case may be, and of $e_{17}$ that are smaller than the corresponding values of an adjacent cycle are not effective in reducing dot size, since it is the larger signals that are controlling up to the limit set by $e_9$. Such smaller values of $e_5$, $e_6$ and $e_{17}$ are indicated in broken outline.

A series of 50% dots is labelled in FIG. 16, and these form squares touching at the corners as in a chess or checkerboard. Dots smaller than 50% are illustrated inside the 50% dots, and these form similar squares, but they are small and isolated from one another. In the case of 100% dots, after growing to the limit set by $e_9$, they follow along the lines on either side of the y, t axis set by $e_9$ as $e_5$, $e_6$, $e_{17}$ alternately increases from $e_9$ to a maximum and then decrease back to $e_9$. Between the 50% dots and the 100% dots an intermediate series of dots is illustrated. These dots grow to the limits set by $e_9$, stay at this limit for a period of time, and then decrease only part way back to zero, whereupon they begin to increase in the subsequent dot. This thus forms an image similar to a chess or checkerboard but in which the "holes" rather than the dots form isolated squares.

D. Dot-Position Generator

As explained above, inputs to the dot-forming circuits 102 (FIG. 1C) come from the dot-position generator 146 (FIG. 1B) and the computer 86 (FIG. 1D). Those from the computer 86 are tonal-density signals developed in a conventional manner. The inputs from the dot-position generator 146 are print-command pulses ("when" signals) that tell the dot-forming circuits 102 when to form each dot. Essentially, each dot-forming circuit forms a new dot each time the scan arrives at a point where the associated one of four dedicated minicomputers included in the dot-position generator 146 has calculated that a dot should be formed. That is, a dot-forming circuit forms a new dot each time there is a match between the actual position of the scan and the calculated position of a dot.

Figure 17:
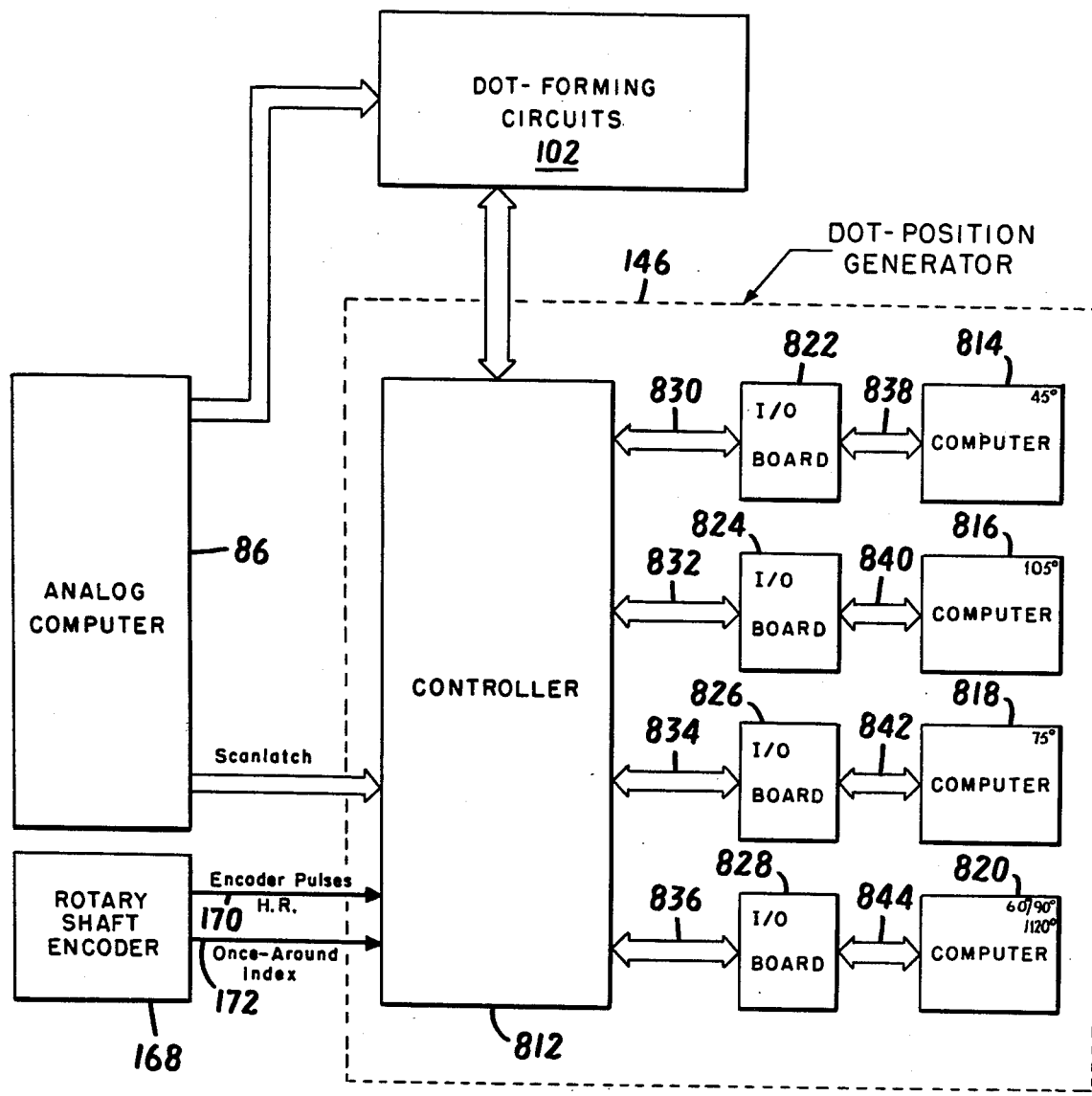
FIG. 17 is a block diagram of structure including a dot-position generator according to the invention.

The dot-position generator 146 (FIG. 1B) is shown in somewhat greater detail in FIG. 17. It comprises a controller 812, four dedicated minicomputers 814, 816, 818, 820, and input-output (I/O) boards 822, 824, 826, 828. The controller 812 communicates via byte lines 830, 832, 834, 836 with the I/O boards 822, 824, 826, 828. The I/O boards in turn communicate via byte lines 838, 840, 842, 844 with the digital computers 814–820. The computers are "dedicated" in the sense that they are pre-programmed with semi-permanent read-only memories (ROMs) that are usually not alternatable once placed in service. These fixed-program computers perform the calculations for locating the positions of the halftone dots to be printed on the output films 20, 22, 24, 26 (FIG. 1D). A different computer performs the calculations for each screen angle or, alternatively, for each color channel. Another possibility is to use a single digital computer for all calculations. In the embodiment illustrated, the computer 814 performs calculations for a screen angle conventionally designated 45°, the computer 816 performs calculations for a screen angle conventionally designated 105°, the computer 818 performs calculations for a screen angle conventionally designated 75°, and the computer 820 performs calculations for a screen angle conventionally designated 60°, 90°, or 120°. Note that these angles are defined not as in the equations set forth above but as they are customarily defined in the printing art.

Figure 2A:
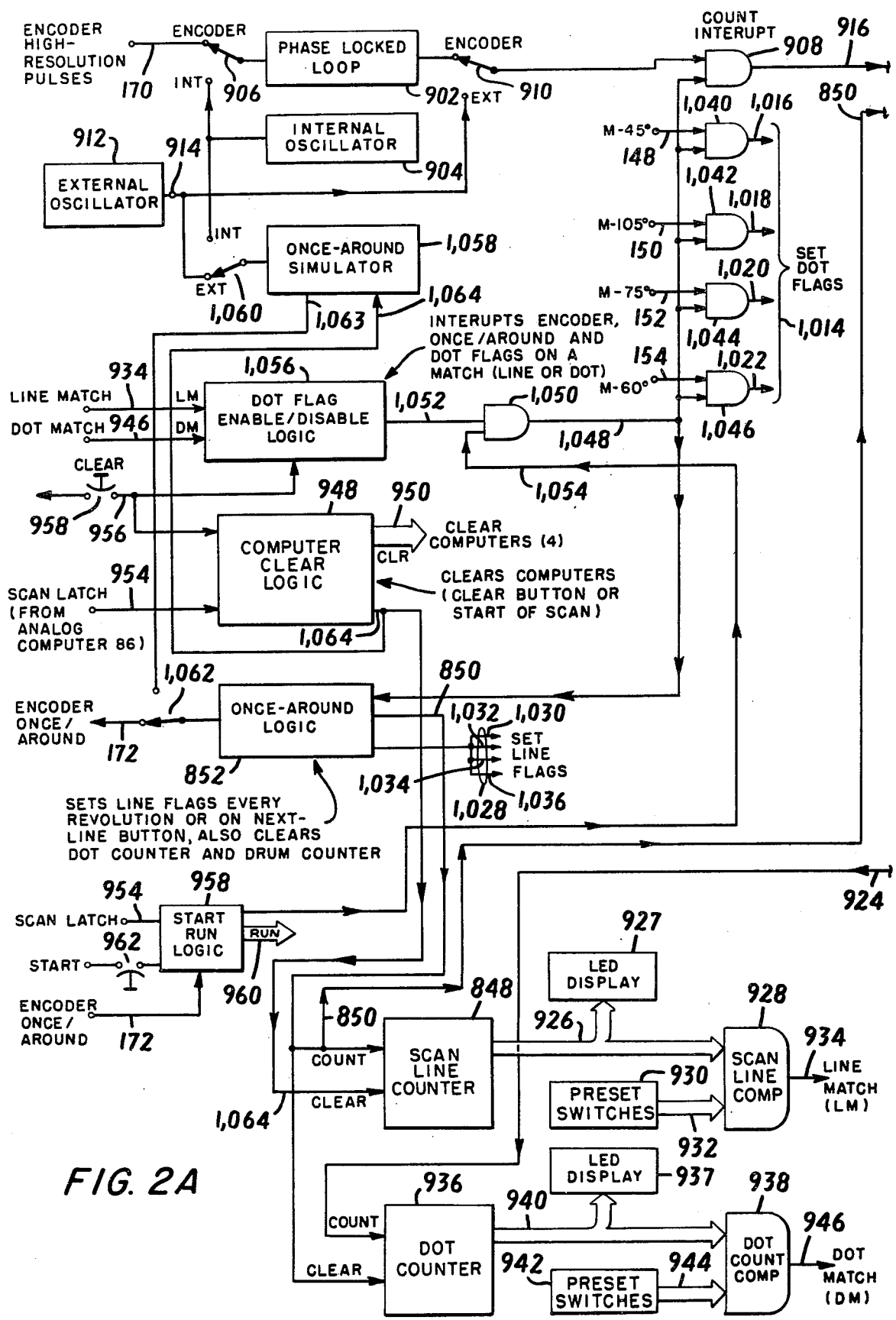
FIGS. 2A and B when arranged according to FIG. 2 constitute a block diagram of structure including the controller section of a dot-position generator in accordance with the invention.

The controller 812 is shown in greater detail in FIGS. 2A and B.

The rotary shaft encoder 168 (FIGS. 1D and 17) is attached directly to the film output drum shaft 30 and includes conventional electro-optical means for generating a 4,096-pulses-per-revolution square wave on the line 170 and a short-duration "once-around" pulse once every revolution on the line 172. These waveforms are processed by the dot-position generator 146 to keep track of the position of the exposing light beams 232, 234, 236, 238 (FIG. 1D) on the films 20, 22, 24, 26.

The distance along any given scan line between the instantaneous position of the scanning light spot produced by the beam 232, 234, 236, or 238 and the position of origin of the scan line is proportional to the number of high-resolution pulses transmitted on the line 170 since the time of origin of the scan line. These pulses are counted by a drum counter 846 (FIG. 2B) and provide a measure of the y-coordinate (fast scan direction) of the scan. The distance between any given scan line of the original film or of any one of the output films and the first scan line of the same film is proportional to the number of once-around pulses transmitted on the line 172 since the start of the scan. These pulses are counted by a scan line counter 848 (FIG. 2A) and provide a measure of the x-coordinate (slow scan direction) of the scan.

The drum counter 846 (FIG. 2B) in effect counts the pulses transmitted on the line 170. Since a new count is desired for each line, the drum counter 846 is cleared every revolution by the encoder once-around generated on a line 850 (FIGS. 2A and B) by once-around logic 852 (FIG. 2A). The same signal on the line 850 that indexes the scan line counter 848 (FIG. 2A) thus clears the drum counter 846 (FIG. 2B).

The output of the drum counter 846 is supplied over byte lines 854, 856, 858, 860 to four comparators 862, 864, 866, 868. These comparators receive on byte lines 870, 872, 874, 876 signals from the I/O boards 822, 824, 826, 828, respectively (FIGS. 2B and 17). The latter signals are derived from the computers 814, 816, 818, 820 (FIG. 17), respectively, and represent the desired positions of the dots on the films 20, 22, 24, 26 (FIG. 1D) as determined by calculation. Each comparator 862, 864, 866, 868 (FIG. 2B) thus compares two numbers, one representing the actual position of the scanning beam 232, 234, 236, 238 (FIG. 1D) and the other representing the desired position of the next dot. When the coordinates match (i.e., when the light source arrives at the point where a dot is to be formed), a match, print command, or "when" signal M-45, M-105, M-75, or M-60 is formed on line 148, 150, 152, or 154 (FIGS. 1B and 2B), as the case may be. These signals indicate, respectively, a match in the 45°, 105°, 75°, or 60°/90°/120° channel. For purposes of illustration, it is assumed that these are the yellow, magenta, cyan, and black channels, respectively, although any color can be assigned to any computer. Alternatively, each minicomputer can be permanently assigned a color, and then any of six angles and any of six rulings can be assigned to any computer. In either case, the end result is the same; the dot coordinate grid for any color can be constructed at any angle (45°, 60°, 75°, 90°, 105°, or 120°) and ruling (111, 122, 133, 150, 175, or 200 lines per inch).

The signals M-45, M-105, M-60 are supplied to the dot-forming circuits, which then prepare for dot formation, and to strobe enable/disable circuits 878, 880, 882, 884, respectively. The circuit 878 also receives a "next dot calculated" signal on a line 886 from the computer 814 (FIG. 17) indicating that the computer has completed its calculation of the desired position of the next dot for the 45° channel and a "last dot complete" signal on the line 190 from the dot-forming circuits 102 (see also FIGS. 1B and C) indicating that the formation of the previous dot for the 45° channel is complete and that the dot-forming circuits 102 are ready to form the next dot. Similarly, the circuits 880, 882, 884 receive "next dot calculated" signals on lines 888, 890, 892, respectively, relating to the 105°, 75°, and 60°/90°/120° channels and "last dot complete" signals on lines 192, 194, 196 relating respectively to the same channels.

When the strobe enable/disable circuit 878 receives signals simultaneously on lines 886, 190, it produces a strobe output signal on the line 184. Similarly, simultaneous signals on lines 888, 192 cause the circuit 880 to produce a strobe output signal on the line 176; simultaneously signals on the lines 890, 194 cause the circuit 882 to produce a strobe output signal on the line 178; and simultaneous signals on the lines 892, 196 cause the circuit 884 to produce a strobe output signal on the line 180.

Figure 7:
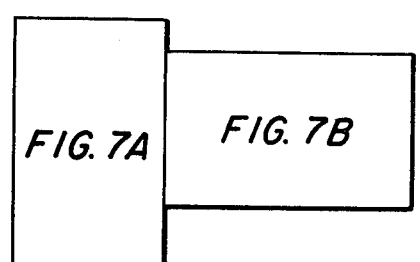
Figure 7B:
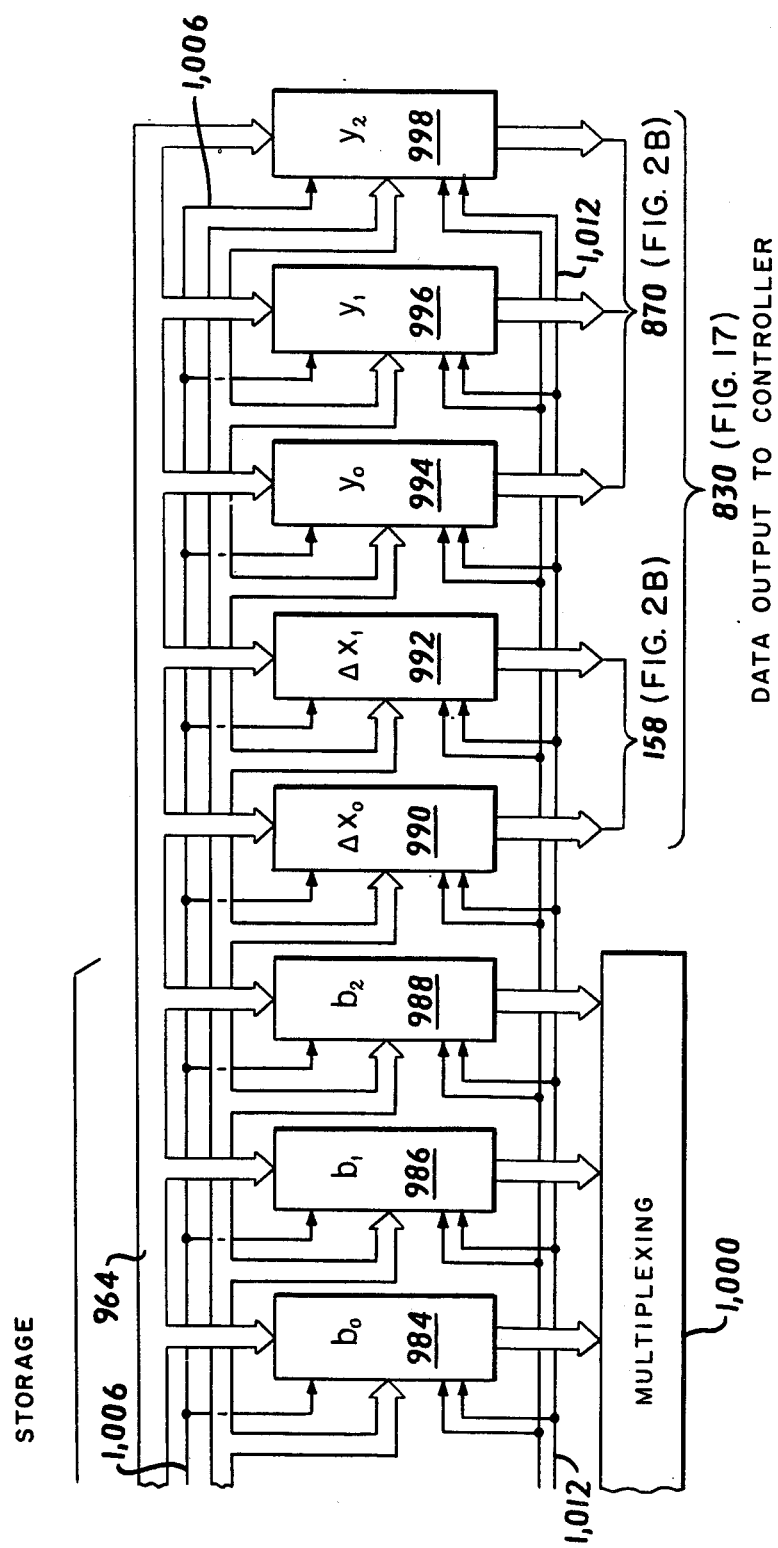
FIGS. 7A and B when arranged according to FIG. 7 constitute a block diagram of structure including an input-output board according to the invention.

The strobe outputs enable digital-to-analog (D/A) converters 894, 896, 898, 900, respectively. These D/A circuits are represented schematically as the D/A converter 156 in FIG. 1C. When enabled, they produce updated signals on the lines 182, 184, 186, 188. These signals contain $\Delta x$ or "where" information in analog form corresponding to the $\Delta x$ information in digital form supplied to the D/A circuits on byte lines 158, 160, 162, 164. The information in the byte lines 158, 160, 162, 164 comes from the dedicated minicomputers 814, 816, 818, 820 (FIG. 17) through the I/O boards 822, 824, 826, 828, respectively. For the 45° channel, for example, the byte lines 158 and 870 carrying $\Delta x$ and y information in digital form are shown in FIG. 7B as well as FIG. 2B.

The $2^{12}$ (4,096) cycles-per-scan-line encoder signal $e_1$ on the line 170 (FIGS. 1B, C and D) is supplied to a phase-locked loop (PLL) 902 to ensure that all signals generated by the PLL 902 will be synchronized with the rotary shaft encoder 168 (FIG. 1D). If the drum 28 on which the images 20, 22, 24, 26 are being formed should change speed, the encoder 168 and the output of the PLL 902 will all change frequency proportionally. The purpose of the PLL 902 is to multiply 4,096 Hz byan appropriate factor to minimize the effect of truncation error and increase the dot-position resolution.

For purposes of testing, the encoder 168 can be disconnected from the PLL 902 and an internal oscillator 904 substituted by means of a front-panel switch 906. In addition, the encoder 168 and PLL 902 can both be disconnected from count-interrupt logic 908 by means of a front-panel switch 910 and an external oscillator 912 can be plugged in on a front panel connector 914 and its use selected by the switch 910. The output of the count-interrupt logic 98 is supplied on a line 916 to the drum counter 846 (FIG. 2B).

The dot-position coordinates from the I/O boards 822, 824, 826, 828 (FIG. 2B) are moreover supplied via byte lines 918 to a multiplexer and switch circuit 920. The multiplexer and switch circuit 920 selects any one of the four channels for a positional readout display on a front panel x, y readout display 922 in binary notation. The readout receives an input on a line 924 connected to the multiplexer 920 and displays the coordinates of the last dot printed when the machine is stopped in mid-program. It serves as a check on the computer program, since the correct position of the dot can be calculated independently of the machine.

Mid-program stopping is accomplished as follows. The scan line counter (848 (FIG. 2A) counts the number of encoder once-around pulses, which is equal to the cummulative number of scan lines produced as of any given instant. The scan line counter 848 produces an output on byte lines 926 that is supplied to an LED display 927 and a scan line comparator 928. Another input to the scan line comparator 928 is a signal generated in accordance with preset front panel switches 930 and supplied on byte lines 932. A line-match signal LM is generated on a line 934 when the number of elapsed scan lines matches the number preset by means of the panel switches 930.

Similarly, a dot counter 936 receives dot pulses over the line 924 from the multiplexer 920 for any selected channel. The dot counter 936 counts these pulses, which equal the number of dots produced as of any given instant since the start of the scan line in which the dot occurs. The dot counter 936 produces an output to an LED display 937 and to a dot-count comparator 938 on byte lines 940. Another input to the dot-count comparator 938 is a signal generated in accordance with preset front panel switches 942 and supplied on byte lines 944. A dot-match signal DM is generated on a line 946 when the number of dots formed since the start of a given line matches the number preset by means of the panel switches 942.

When both the line-match signal LM and the dot-match signal DM are present for a particular channel, the computer for that channel is held in a waiting loop. This enables the operator to select a specific line and a specific dot in that line to check the x, y coordinates of that dot by means of the x, y readout 922. Both the line counter 848 and the dot counter 936 have BCD (binary-coded decimal) readouts.

Computer-clear logic 948 included in the controller generates a signal CLR on byte lines 950 to clear and reset the program for each minicomputer to the first instruction before the start of the first scan line response to a scan-latch signal generated by scan-latch logic 952 in the analog computer 86 (FIG. 1D). The scan-latch signal is supplied on a line 954 (FIGS. 1B, C, & D and 2A). The logic 948 generates the CLR signal also in response to a signal on an input line 956 when a "clear" button 958 is pressed. The CLR signal causes all I/O registers, all registers in the minicomputers, and all flags to be cleared to zero. This is explained more fully below.

Start/run logic 958 included in the controller generates a signal RUN on byte lines 960 to put the four minicomputers into the program-run mode at the beginning of a scan. The circuit is set by the scan latch signal on the line 954, or by pressing a start button 962. The first encoder once-around signal on the line 172 initiates the start/run sequence so that the system is ready for the start of the program.

The front panel of the controller includes all switches necessary to select the different functions of which the controller is capable and to provide the "pointers" for the computer program. In addition to the front panel pointers discussed below, there are permanent links on the 45°, 75°, and 105° I/O boards that are used as pointers for the screen angle. They are seldom changed and are therefore not available to the operator but only to an engineer.

As FIG. 17 shows, there are four I/O boards, one for each minicomputer. The I/O boards provide interfacing between the computers and the controller. FIGS. 7A & B show the I/O board for one of the minicomputers. It is identical to those for the other minicomputers and comprises a number of semiconductor storage registers and associated logic modules for controlling the flow of data into and out of the minicomputer.

Each I/O board storage register is connected to the associated computer output data byte lines such as lines 964 over which all data from that computer exit. Computer input/output control lines 966, 968, 970 supply signals from the associated minicomputer to an input/output control register decoder 972. The decoder 972 transmits a signal COXX generated by the associated minicomputer under program control on a line 974 that is supplied to enable a control word storage register 976. The control word storage register 976 then receives an address code from the associated minicomputer on the line 964. This address code addresses one of the storage registers 978, 980, 982, 984, 986, 988, 990, 992, 994, 996, 998. The addressed storage register then receives data from the computer if a signal DOXX is present on a line 999a or transmits data to the computer if a signal DOXX is present on a line 999b. The word in the control word storage register 976 determines which storage register receives data from the associated computer. Of the eleven storage registers thus controlled, five are used as transfer registers for $\Delta x$ and y from the computer to the controller (two for $\Delta x$, three for y) and six are used as temporary or scratchpad storage registers for a and b (three for a, three for b). The meanings of a and b are explained below. The registers 978, 980, 982 are used for scratchpad storage of $A_o$, $A_1$, and $A_2$, respectively, the registers 984, 986, 988 as scratchpad storage of $b_0$, $b_1$, and $b_2$, respectively, the registers 990, 992 for storage of $\Delta x_0$, $\Delta x_1$, respectively, and the registers 994, 996, 998 for storage of $y_0$, $y_1$, and $y_2$, respectively. Multiple registers are provided for a, b, Δx, and y simply because the words to be stored are too long for one register. Alternatively, a and b can be stored in the computer proper if they have sufficient storage.

The outputs of the Δx, y registers can go only to the controller, via lines 830 (FIGS. 7B and 17), which are subdivided into lines 158 and 870 (FIGS. 2B and 7B). the outputs of the a, b registers can only be inserted back into the computer via the signal multiplexer 1,000 and byte lines 1,002. The lines 1,000 and 1,002 in FIG. 7A together make up the lines 838 (or 840, 842, or 844) in FIG. 17. Each Δx, y register output is connected bit-for-bit into the controller, but the a, b registers are multiplexed or encoded into eight bits of data for sequential reinsertion, one byte of eight bits at a time, back into the computer.

In addition to the a, b inputs to the multiplexer 1,000, there is an input over byte lines 147d from the front panel ruling select switch 147a (see also FIG. 1B). This transfers an 8-bit pointer word into the computer at the beginning of the computer program.

Each minicomputer generates two out-of-phase clock pulses CP 1 and CP 2 supplied to a strobe logic circuit 1,004 of the associated I/O board, which generates a strobe pulse for the registers 978–998 and the signal multiplexer 1,000 on a line 1,006. The line 1,006 also supplies the strobe pulses to the control word storage register 976. The strobe pulses determine the timing of the register inputs and outputs.

The CLR signal from the controller (FIG. 2A) causes each minicomputer to generate a master reset signal at the start of the scan. It is supplied on a line 60 to clear-signal-driver logic of the associated I/O board. The signal drivers 1,010 generate a register clear signal on a line 1,012. This signal clears (sets to zero) each register 978–998 at the start of the scan or on the appearance of the CLR signal.

FIG. 2A shows set-dot-flag signals on byte lines 1,014. These byte lines include bit lines 1,016, 1,018, 1,020, 1,022 to the respective I/O boards. One of these, the line 1,016, is shown in FIG. 7A. The set-dot-flag signal on the line 1,016 is supplied to flag logic circuits 1,024, which generate a dot-flag input to the associated minicomputer on a line 1,026. The signals are used by the associated digital computer in executing the program at the "dot-printed" test described below.

FIG. 2A also shows set-line-flag signals on byte lines 202. These byte lines include a bit line 1,030, 1,032, 1,034, 1,036 to each I/O board, one of which, the line 1,030, is shown in FIG. 7A. The set-line-flag signal on the line 1,030 is supplied to the flag logic circuits 1,024, which generate a line-flag input to the associated minicomputer on a line 1,038.

The set-line-flag signals on the lines 1,030–1,036 tell the computer program when a new line has occurred and are generated by the once-around logic 852. The set-dot-flag signals on the lines 1,016–1,022 tell the computer program that a dot has been printed and are generated as follows: AND gates 1,040, 1,042, 1,044, 1,046 (FIG. 2A) receive respectively as one of two inputs the signals M-45, M-105, M-75, M-60 (see also FIG. 2B). A second input to each AND gate 1,040, 1,042, 1,044 1,046 is a signal on a line 1,048 from an AND gate 1,050. The AND gate 1,050 generates an output on the line 1,048 when it simultaneously receives inputs on lines 1,052, 1,054. The signal on the line 1,052 is generated by dot-flag enable/disable logic 1,056 and the signal on the line 1,054 is generated by the start/run logic 958.

A once-around simulator 1,058 is connected by a switch 1,060 to the external oscillator 912 or internal oscillator 904. It can also be connected by a switch 1,062 and line 1,063 to the once-around logic 852. Moreover, it receives the signal CLR generated by the logic 948 on a line 1,064. It can thus be switched in to take the place of the once-around signal generated by the rotary shaft encoder 168 (FIG. 1D) on the line 172. This permits simulated operation for testing purposes.

The dot-position program is a general-case computer program in all four digital minicomputers 814, 816, 818, 820 to calculate the position of the screening dots on the output film for all screen angles and rulings. In one embodiment of the invention, each digital computer is permanently assigned a screen angle, except that the computer 820 (FIG. 17) can be switched by the operator to 60°, 90°, or 120° by a front panel angle selector 147b, which provides pointer outputs to the counters on byte lines 147e (FIG. 1B). Each computer can be switched to the desired screen ruling by the ruling selector 147a, which supplies outputs on byte lines 147d to each minicomputer. The switch 147d is a ganged switch to ensure that each computer is on the same ruling.

Figure 19:
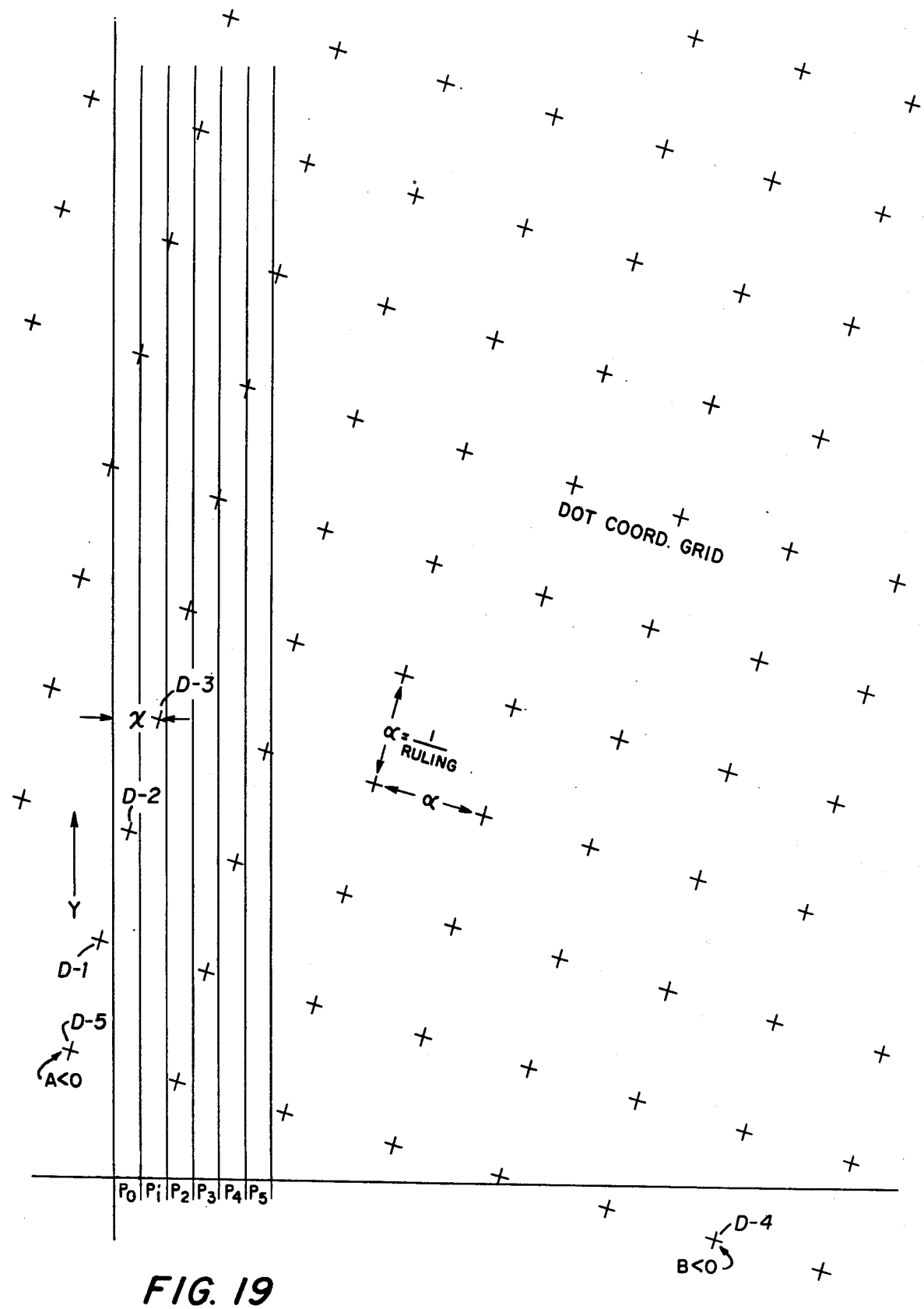
FIG. 19 is a schematic view of scanning and dot coordinate systems in accordance with the invention.

The dedicated program in each minicomputer read-only memory (ROM) is based on a representation of the position of the exposing light source by a first x, y coordinate grid and of the calculated dot positions by a second x, y coordinate grid rotated with respect to the first by the amount of the screen angle $\theta$. In FIG. 19, the first grid is represented by push lines $P_0$, $P_1$, $P_2$, $P_3$, $P_4$, $P_5$, ... $P_n$. Each line extends vertically in FIG. 1 (the y direction or direction of fast scan), and successive lines represent changes in the x coordinate (slow direction of scan) of the first grid. The dot coordinate grid is rotated 15° clockwise with respect to the light-position grid and is represented by a matrix of crosses. The distance d between adjacent crosses in the vertical or horizontal (with respect to the dot coordinate grid) direction is defined as the reciprocal of the ruling. That is, for a screen ruling of 200 lines/inch, for example, the distance is 1/200 inches or 0.005 inches.

The purpose of the computer program is to move mathematically along the dot coordinate grid until an indicated dot position is found within the area that the exposing light source is about to scan, and then to cause a dot to be printed when the light source arrives at this position.

The displacement of the exposing light source on the film is of course finite, and any dot lying within this displacement will be printed as the light sweeps past the dot position. This displacement is less than P.

Figure 18:
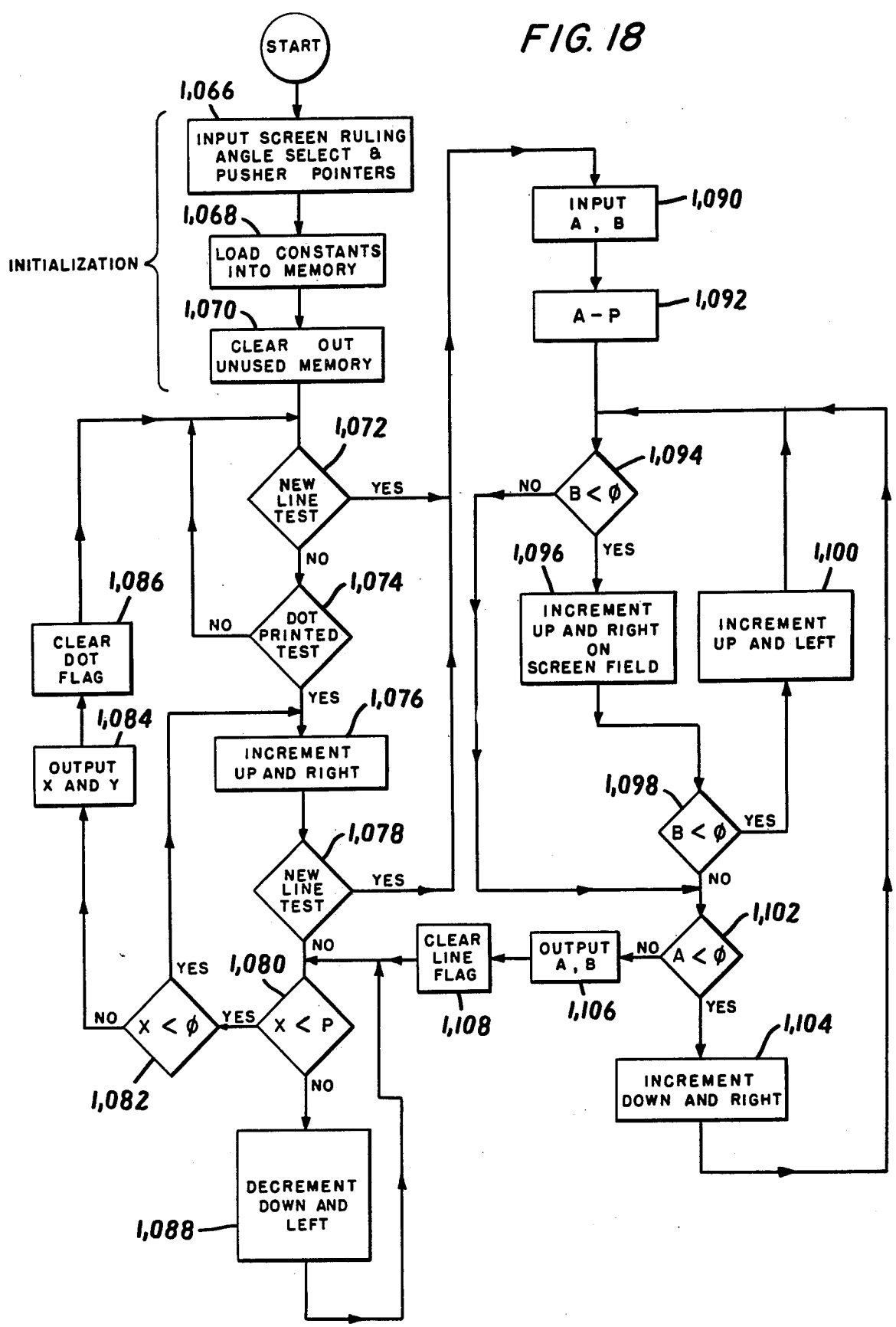
FIG. 18 is a flow chart of a computer program that can be used in the implementation of the invention in one embodiment thereof.

The program sets up "initial conditions" at the beginning of a scan by causing the computer to read the front panel control pointers as established by the selectors 147a, 147b, 147c in FIG. 1B to determine the screen ruling, screen angle, and push distance to be used during the scan. As FIG. 18 shows at 1,066, 1,068, 1,070, the control pointers cause selection of the proper parameters to be used in the program. One such parameter is R. At this time the values of x and y in the dot coordinate grid are set to zero, so that the position of the first dot is at the beginning of the scan.

The controller section indicates to each computer whether a new line has been initiated since the last dot was formed. This is the "new line" test at decision box 1,072 in FIG. 18 and is implemented by looking for the line flag signal (FIG. 2A). If a new line has not been initiated, the program performs a "dot printed" test (decision box 1,074). This test is implemented by looking for the dot flag signal (FIG. 2A). If a new line has been initiated; the program jumps to an $a$, $b$ update section discussed below.

At the beginning of a line, if the indicated answer to the "dot printed" test is yes, then the program proceeds to calculate the coordinates of the next dot within the P field (FIG. 19). If the answer is no, the program continues to loop until a dot is printed or a new line occurs.

The program contains an "increment up and right" section 1,076 that mathematically moves along the dot coordinate grid a distance equal to $a$, the reciprocal of the screen ruling, and in a direction of increasing x on the dot coordinate grid and increasing x, y on the light grid. For example, starting in FIG. 19 at position D-2, the action taken by the program when it arrives at box 1,076 is to move mathematically to position D-3.

As the program mathematically moves along the dot coordinate grid, there must be a repeated test to determine if a dot can be printed. Assuming the next new line test at decision box 1,078 is negative, an $x<P$ test is performed at decision box 1,080 to determine the position of the dot as calculated by the computer with respect to the P field. The "x" of the test is the distance parallel to the light grid x axis between the center of the dot position just calculated by the computer and the y axis of the light grid. This distance x with respect to dot D-3 is shown in FIG. 19. The logic of the $x<P$ test at decision box 1,080 is as follows:

yes—The calculated dot position is on or behind the current P field. If behind, the P field swept this dot position in a previous scan line, or the dot position lies behind the first scan line. This is illustrated in FIG. 19 by the dot position D-1, which is behind (to the left of) the current push line $P_0$, and by the dot D-2, which is in the current push line $P_0$. Successive push lines $P_1, P_2, \ldots P_n$ are formed to the right.

no—The calculated dot position is ahead of the current P field $P_0$. This is illustrated in FIG. 19 by the dot position D-3, which is to the right of the push line $P_0$.

If the answer to the previous test is yes, then it becomes necessary to distinguish the case where the calculated not position is on the P field from the case where the calculated dot position is behind the P field. In the former case a dot can be printed and in the latter it cannot. This distinction is made by an $x<0$ test at decision box 1,082 (FIG. 18), the logic of which is this:

yes—The calculated dot position is behind the P field. This is illustrated by the dot position D-1 (FIG. 19). Since a dot in this position cannot be printed in the current push line $P_0$, the program jumps to the "increment up and right" section 1,076 and again mathematically moves from that dot position up and right on the dot coordinate grid to the next dot position (D-2 in the example).

No—The calculated dot position is in the P field, by process of elimination. In that case, a dot can be printed in the current push line as soon as the scanning beam arrives at the calculated dot position (D-2 in the example). A set of output coordinates $\Delta x$, y is generated at 1,084 and held in the I/O board registers 990–998 (FIG. 7B) until the scanning light source arrives at that point. At that time a dot is printed on the output film in response to a match ("when" or print-command) signal generated by the appropriate comparator 862, 864, 866, 868 (FIG. 2B), and the controller flag logic under the direction of "clear dot flag" box 1,086 (FIG. 18) tells the computer that the dot has been printed. The $\Delta x$ is the distance measured parallel to the x axis of the light grid between (a) the calculated dot position and (b) the y axis of the light grid, and the y is the distance measured parallel to the y axis of the light grid between (a) the calculated dot position and (b) the x axis of the light grid.

If the answer to the $x<P$ test is no, it indicates that the dot position is on or ahead of the P field and that the program must decrement back (down and left) in accordance with box 1,088 until the answer to the $x<P$ test is yes and then resume its position checking. In this section of the program, equations are generated to move mathematically down and left to a position behind the P field. When this section is completed, as indicated by a yes answer to the $x<P$ test, the program jumps back to the $x<0$ test and checks the new dot position for P field compatibility.

a, b update

Whenever the controller indicates to the computer by line-flag signals transmitted over byte lines 1,028 (FIG. 2A) that a new line has been initiated, and the computer is at the point in the program where a new line is tested, a jump is executed to the a, b update section of the program. This section of the program allows for the fact that, with every revolution of the output film, the exposing light source path (P field) is incremented (to the right in FIG. 1) a distance equal to the width of P.

In the main section of the program, the values of a and b, which indicate the origin or starting point of the row of dots to be printed, remain unchanged. However, each time the program jumps to the a, b update section, new values of a and b must be generated to define the new starting point for the next-row of dots to be printed. The purpose of the a, b update, then, is to recall the old values of a and b, to compute new values, and to reinsert in memory updated a, b values to be used by the main program in determining dot positions. The detailed operation of the a, b update section is as follows:

As soon as this section of the program is entered, a and b are recalled from memory at step 34, and P is subtracted from a at step 1,090. This has the effect of mathematically moving the dot coordinate grid (FIG. 19) a distance P to the left to account for the fact that the exposing light source has moved a distance P to the right. This subtraction of P from a, as indicated at 1,092, moves the origin of the dot coordinate grid to the left of the $x=0$ boundary of the light coordinate grid. It is therefore necessary to relocate a new dot coordinate grid origin that lies at a point of intersection of the dot coordinate lines spaced 1/R apart on the previous dot coordinate system that is (1) closest to the $y=O$ boundary, (2) closest to the previous origin, and (3) whose x, y (a,b) coordinates are both greater than zero. That is the purpose of the remainder of the program.

$b<0$ Test

At decision step 1,094 of the program, a test is made for $b<0$. The implications of this test are as follows:

yes—The new origin of the dot coordinate grid is outside (below) the $y=0$ boundary of the light grid. This condition, illustrated by dot D-4 in FIG. 1, means that the program must mathematically increment the origin of the dot coordinate grid up and right at step 1,096, after which a $b<0$ test is done again at decision step 1,098. The implications of the second b<0 test are as follows:
- yes—The new origin of the dot coordinate grid is still outside (below) the y=0 boundary of the light grid. The program jumps to the equations for mathematically incrementing the origin of the dot coordinate grid up and left at step 1,100, after which a return to the original b<0 test is effected.
- no—If the answer to the b<0 test at step 1,094 or 1,098 is no, this implies that the origin of the dot coordinate grid is within (above) the y=0 boundary of the light grid, and the program proceeds to the a<0 test.

a<0 Test

The implications of this final test, at step 1,102 are as follows:
- yes—The new origin of the dot coordinate grid is outside (to the left of) the x=0 boundary of the light grid. This is illustrated by dot D-5 in FIG. 19. Equations are generated at step 1,104 to increment the origin of the dot coordinate grid down and right. After this occurs, the program returns to the original b<0 test at step 1,094, and the program continues as before.
- no—The new origin of the dot coordinate grid is within the y=0 boundary, and the new values of x and y, which are the same as a and b, are inserted into the main program at step 1,106. The line flags are cleared at step 1,108.

E. Dot offset circuits

The dot position generator 146 performs all the functions of prior devices intended to generate dot coordinate positions at regular intervals. An example of an early and well-known such prior device is a silk screen. A problem with generating dots at regular intervals is that the dot positions are then independent of the positions of feature edges in the images. This leads to fuzzy image edges, since they are not, in general, aligned with the dots.

In accordance with the present invention, the dot positions are offset by the dot offset circuits 134 (FIG. 1B) so that they are aligned with feature edges. The dot offset circuits 134 receive inputs on the lines 136, 138, 140 representative of relative image brightness to the right and left of the center of the scan line and process these inputs to produce a dot offset voltage on the line 142 that causes the dot positions to be shifted towards the darker side of the scan line. The dot-offset circuits 134 function as follows:

The signals L, C, and T, which represent brightness as measured by the leading, center and trailing photocells, respectively, are supplied on the lines 136, 138, 140, which are shown in FIGS. 1A and B, 6A and B, and 20. Signals L, C, and T are first processed as follows to derive signals L', C', and T' (FIG. 6A): Signal L is offset or reduced slightly by a resistor 1, 110 to develop the signal L'; signal C is offset or reduced slightly by a resistor 1,112 to develop signal C'; and signal T is offset or reduced slightly by a resistor 1,114 to develop signal T'. The purpose of developing the offset signals L', C' and T' is to ensure that, when comparisons are made between signals L' and C by the comparator 1,116, for example, it will not be indicated that L is greater than C unless the amount by which L exceeds C is greater than some predetermined minimum which is determined by the resistor 1,110 and which represents a dead band or safety factor so that the circuit will not be triggered by noise.

Four comparators 1,116, 1,118, 1,120, and 1,122 make four different comparisons between signals L, C, and T. Four possible conditions are recognized by these comparisons:

L is greater than C, which is designated condition $X_1$;
C is greater than T, which is designated condition $X_2$;
C is greater than L, which is designated condition $X_3$; and
T is greater than C, which is designated condition $X_4$.

The four comparisons and the corresponding conditions and transitions are summarized in Table I:

TABLE I

| Comparison | Condition | Transition |
|---|---|---|
| L > C | $X_1$ | dark to light |
| C > T | $X_2$ | dark to light |
| C > L | $X_3$ | light to dark |
| T > C | $X_4$ | light to dark |

These conditions are to some extent but not entirely mutually exclusive. Our purpose is to generate one of seven voltage states at the output lead 142 (FIGS. 1B and 6A and B) respectively having maximum values (where highlight dots are to be formed) of +3 volts, +2 volts, +1 volt, zero volts, −1 volt, −2 volts, or −3 volts, depending on how signals L, C, and T compare. As explained below, these values are scaled down during the formation of other than highlight dots. Table II shows the combination of conditions $X_1$ through $X_4$ which correspond to the seven maximum voltage states:

TABLE II

| Condition | Voltage at output 214 (during formation of highlight dot) |
|---|---|
| $X_1$ | +1 |
| $X_1, X_2$ | +2 |
| $X_2$ | +3 |
| $X_1, X_4$ or $X_2, X_3$ or none of above ($X_1, X_2, X_3$ all equal) | 0 |
| $X_3$ | −3 |
| $X_3, X_4$ | −2 |
| $X_4$ | −1 |

The comparators 1,116, 1,118, 1,120, 1,122 work as follows: Each comparator generates an output if the input voltage applied to the lower input terminal (marked +) exceeds (i.e., is more positive than) the input voltage applied to the upper input terminal (marked −).

Thus, if L', is greater than C, which means that L is greater than C (since L is greater than L'), the comparator 1,116 generates a signal $X_1$ as one input to an AND-gate 1,124. Similarly, if T' is greater than C, which means T is greater than C (since T is greater than T'), the comparator generates output signal $X_4$ supplied as a second input to the AND-gate 1,124. With the inputs $X_1$ and $X_4$ simultaneously present, the AND-gate 1,124, because of an inverter 1,126 at its output, generates, through an OR-gate 1,128, an inhibit "signal" of zero volts, which is supplied on a line 1,130 as an input to each of the six AND-gates 1,132 through 1,142, disabling each. Because of inverters 1,144 through 1,154, all of the outputs on leads 1,156 through 1,166 are then 5 volts. This turns off transistors 1,168 through 1,178. With all the transistors turned off, there is no signal or line 1,180 or 1,182, the inverters 1,184 and 1,186 produce zero output, and the output at 142 is also zero. That is, if the brightness on each side of the scan line exceeds the brightness at the scan line (conditions $X_1$ and $X_4$ are recognized simultaneously) no dot offset voltage is generated, and the dot position is shifted neither right nor left.

Similarly, if C' is greater than T, which means that C is greater than T (since C is greater than C'), the comparator 1,118 generates a signal $X_2$ as one input to an AND-gate 1,188; and, if C' is greater than L, which means that C is greater than L (since C is greater than C'), the comparator 1,120 generates a signal $X_3$ as a second input to the AND-gate 1,188. With the signals $X_2$ and $X_3$ simultaneously present, the AND-gate 1,188, because of an inverter 1,190 at its output, generates, through the OR-gate 1,128, an inhibit "signal" of zero volts, which is supplied on the line 1,130 as an input to each of the six AND-gates 1,132 through 1,142, disabling each and resulting in zero output at 142. In this case too, no dot-offset voltage will be generated. That is, if the brightness on each side of the scan line is less than the brightness at the scan line (conditions $X_2$ and $X_3$ are recognized simultaneously), no dot offset voltage is generated, and the dot position is shifted neither right nor left.

In summary, if:
signal L exceeds signal C
AND
signal T exceeds signal C
OR if:
signal C exceeds signal T
AND
signal C exceeds signal L,
then the output at 142 is zero. This means there will be no displacement of the dot position.

On the other hand, if these conditions do not exist, then a displacement of the dot position is desired. Such displacement is effected by generating the proper output voltage at 142. These output voltages are set forth in table II for highlight dots. For other dots, the voltages are scaled down, as explained below. The generation of the different voltage levels is effected as follows:

The transistors 1,168 through 1,178 are identical and, when switched on, generate identical outputs. Their bases are respectively connected to identical circuits 1,192 through 1,202, and their emitters are respectively connected to resistors 1,204 through 1,214.

The resistors 1,204 through 1,208 have successively larger resistances so that a first maximum voltage level, say +3 volts, is impressed on line 1,180 if the transistor 1,168 is switched on and the transistors 1,170 and 1,172 remain off; a lower maximum voltage level, say +2 volts, is impressed on line 1,180 if the transistor 1,170 is switched on and the transistors 1,168 and 1,172 remain off; and a still lower maximum voltage level, say +1 volt, is impressed on line 1,180 if the transistor 1,172 is switched on and the transistors 1,168 and 1,170 remain off.

Similarly, the resistors 1,210, 1,212, 1,214 have successively smaller resistances, the resistance of 1,174 being the same as that of 1,172, the resistance of 1,176 being the same as that of 1,170, and the resistance of 1,178 being the same as that of 1,168. Thus, if the transistor 1,174 is switched on and the transistors 1,176 and 1,178 remain off, the same lowest maximum voltage level (+1 volt in the example given above) is impressed on line 1,182; if the transistor 1,176 is switched on and the transistors 1,174 and 1,178 remain off, the same higher maximum voltage level (+2 volts in the example given above) is impressed on line 1,182; and, if the transistor 1,178 is switched on and the transistors 1,174 and 1,176 remain off, the same highest maximum voltage level (+3 volts in the example given above) is impressed on line 1,182.

The voltage levels are scaled down in dependence on the output of an amplifier 1,216, the input of which is the tonal-density signal for black generated by the analog computer 86 on the line 100 (FIG. 1D). The output of the amplifier 1,216 goes from 0 to 5 volts in inverse dependence on dot size. That is, for dots of minimum size (highlight dots), the amplifier 1,216 produces an output of 5 volts, and the maximum voltage levels mentioned above (+3, +2, or +1 volts) are impressed on the lines 1,180 and 1,182; while, for dots of maximum size (shadow dots), the amplifier 1,216 produces an output of 0 volts, so that no voltage is impressed on the lines 1,180 and 1,182, regardless of which transistors are switched on. The reason for such scaling is that, in view of the physiological response of the eye, the smaller the dot, the larger the correction of dot position that is desired. Moreover, the shift is proportional to $R \sin \theta$.

Depending on which one of the transistors 1,174 through 1,178 is switched on, the line 1,182 carries, during the formation of a highlight dot, one of the three voltages, +1, +2, and +3, listed in Table II. If all of the transistors 1,174 through 1,178 are off, the line 1,182 carries zero volts. Similarly, depending on which one of the transistors 1,168 through 1,172 is switched on, the line 1,180 carries, during the formation of a highlight dot, +3, +2, or +1 volts. Except for a reversal of polarity, these latter voltages correspond to the three negative voltages, −3, −2, −1, listed in Table II. If all of the transistors 1,168 through 1,172 are off, the line 1,180 carries zero volts.

The signal on the line 1,180 is passed through the inverter 1,186. This produces an inverted (negative) output at 142 which is, in the case of highlight dots, a dot-offset signal of −3, −2, or −1 volts, in accordance with Table II. The signal on the line 1,182 is inverted twice—first by the inverter 1,184 and again by the inverter 1,186. This produces a doubly inverted, positive, output at 142. In the case of highlight dots, this signal is +1, +2, or +3 volts, in accordance with Table II.

Only one of the transistors 1,168 through 1,178 can be on at a time, or they can all be off. This produces, during formation of highlight dots, any of the seven voltage states indicated in Table I at the output 142, possibly scaled down in accordance with the output of the amplifier 1,216.

In order to switch on the proper one of the transistors 1,168 through 1,178, signals $X_1$ through $X_4$, generated by the comparators 1,116 through 1,112, are further processed and applied as follows:

The signal $X_1$, generated by the comparator 1,116, is supplied on a line 1,218 to the AND-gate 1,138 as one of three inputs and to a complement-signal generator 1,220. The generator 1,220 generates a signal $\bar{X}_1$ when signal $X_1$ is not present and does not generate the signal $\bar{X}_1$ when signal $X_1$ is present. Signal $\bar{X}_1$ is supplied on a line 1,221 to the AND-gate 1,142 as one of three inputs.

Signal $X_2$, generated by the comparator 1,118, is supplied on a line 1,222 to the AND-gates 1,140 and 1,142 as one of three inputs to each and to a complement-signal generator 1,224. The generator 1,224 generates a signal $\bar{X}_2$ when signal $X_2$ is not present and does not generate the signal $\bar{X}_2$ when signal $X_2$ is present. Signal $\bar{X}_2$ is supplied on a line 1,226 to the AND-gate 1,138.

Signal $X_3$, generated by the comparator 1,120, is supplied on a line 1,228 to the AND-gates 1,134 and 1,136 as one of three inputs to each and to a complement-signal generator 1,130. The generator 1,130 generates a signal $\bar{X}_3$ on a line 1,132 when signal $X_3$ is not present and does not generate the signal $\bar{X}_3$ when signal $X_3$ is present. Signal $\bar{X}_3$ is supplied to the AND-gate 1,132 as one of three inputs.

Finally, signal $X_4$, generated by the comparator 1,122, is supplied on a line 1,134 to the AND-gates 1,132 and 1,134 as one of three inputs to each and to a complement-signal generator 1,136. The generator 1,136 generates a signal $\bar{X}_4$ on a line 1,138 when signal $X_4$ is not present and does not generate the signal $\bar{X}_4$ when signal $X_4$ is present. Signal $\bar{X}_4$ is supplied to the AND-gate 1,136.

Figure 6A:
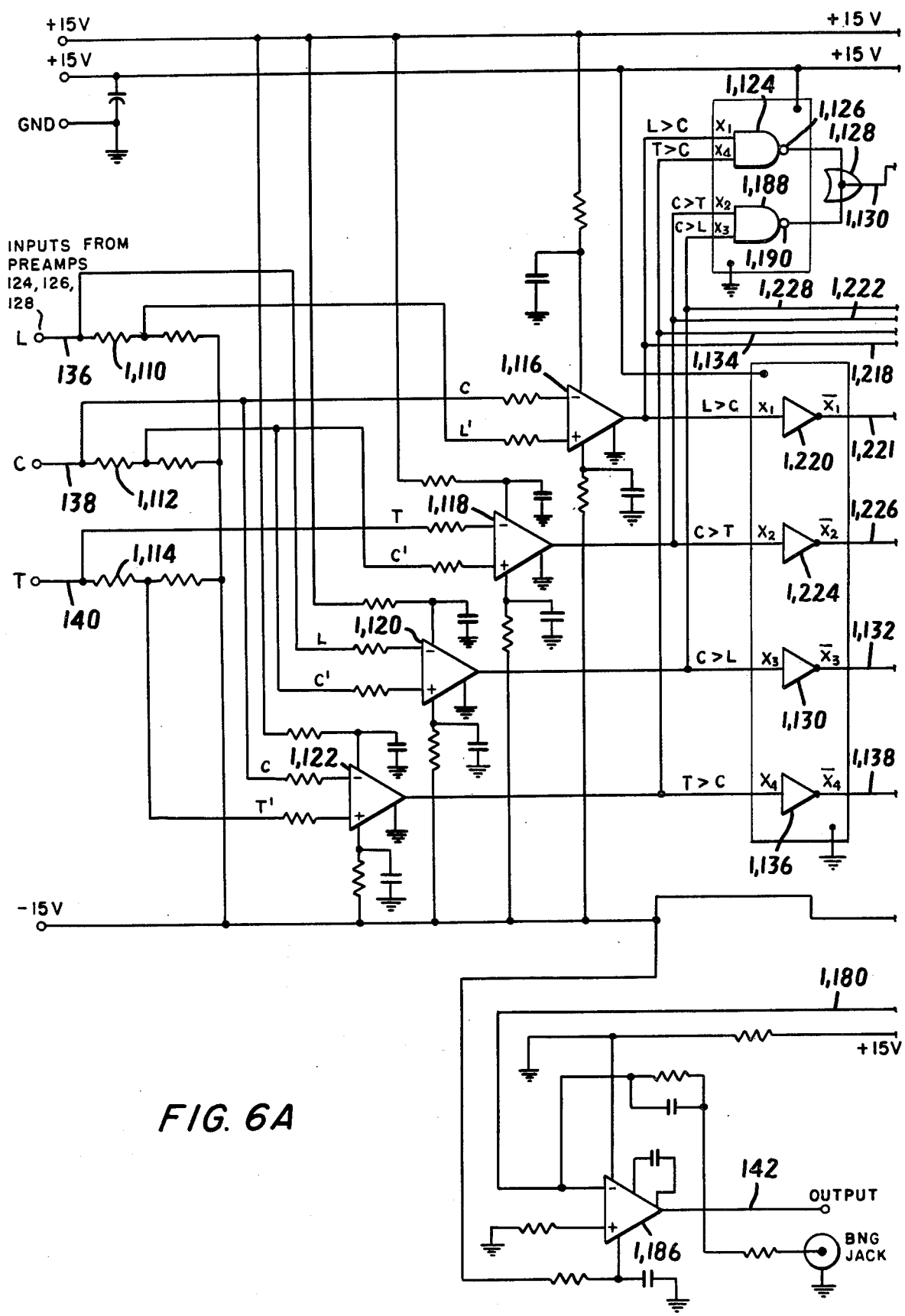
FIGS. 6A and B when arranged according to FIG. 6 constitute a dot-offset logic schematic according to the invention.
Figure 6B:
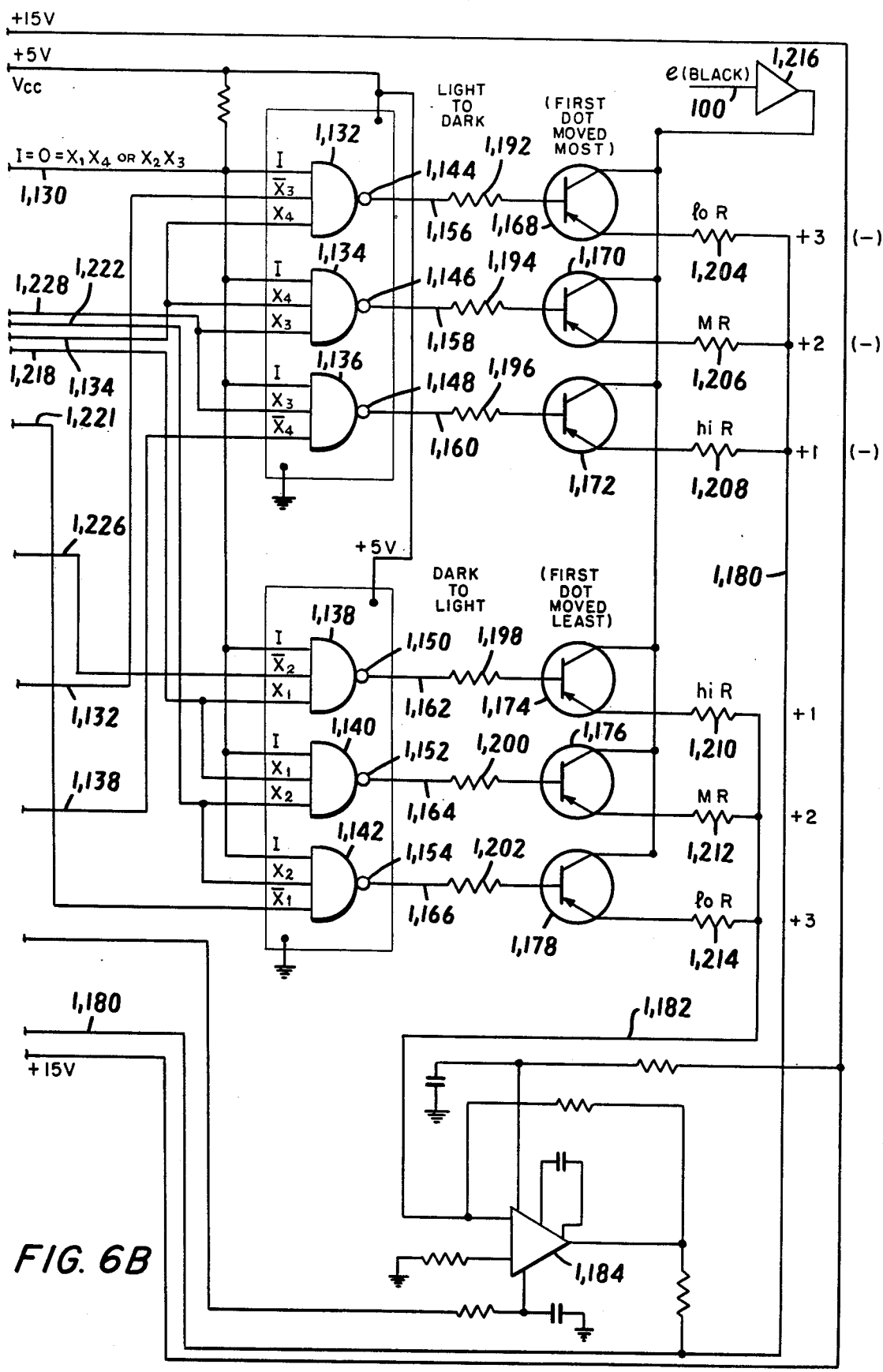

As Tables I and II and FIGS. 6A and 6B show, if signal L exceeds signal C, condition $X_1$ is recognized, condition $X_2$ or $X_4$ (but not both) may be recognized, and condition $X_3$ cannot be recognized. The AND-gates 1,138 and 1,140 both receive the $X_1$ input, and none of the other AND-gates 1,132 through 1,142 receives the $X_1$ input. Inspection shows that, of the AND-gates 1,132 through 1,142, only the gates 1,138 and 1,140 then have any possibility of producing an output. If $X_2$ is not present, its complement, $\bar{X}_2$, is present, and vice versa. Thus, in the presence of $X_1$ and assuming no inhibition due to the gate 1,128, the AND-gate 1,138 or 1,140 produces an output, depending on whether signal $X_2$ is or is not present. This actuates transistor 1,176 or 1,174 and produces a signal on the line 1,182 which at maximum is +1 or +2 volts.

Tables I and II and FIGs. 6A and 6B further show that, if signal C exceeds signal T, condition $X_2$ is recognized, condition $X_1$ or $X_3$ (but not both) may be recognized, and condition $X_4$ cannot be recognized. The AND-gates 1,140 and 1,142 both receive the $X_2$ input, and none of the other AND-gates 1,132 through 1,142 receives the $X_2$ input. Inspection shows that, of the AND-gates 1,132 through 1,142, only the gates 1,140 and 1,142 then have any possibility of producing an output. If $X_1$ is not present, its complement, $\bar{X}_1$, is present, and vice versa. Thus in the presence of $X_2$ and assuming no inhibition due to the gate 1,128, the AND-gate 1,140 or 1,142 produces an output, depending on whether signal $X_1$ is or is not present. This actuates transistor 1,176 or 1,178 and produces a signal on the line 1,182 which at maximum is +3 volts or +2 volts.

A similar analysis shows that, when condition $X_3$ is recognized, transistor 1,170 is switched on if condition $X_4$ is also recognized, while transistor 1,172 is switched on if condition $X_4$ is not recognized. This produces a signal on the line 1,180 which at maximum is +2 volts or +1 volt.

Finally, when condition $x_4$ is recognized, transistor 1,170 is switched on if condition $x_3$ is also recognized, while transistor 1,168 is switched on if condition $x_3$ is not recognized. This produces a signal on the line 1,180 which at maximum is +2 or +3 volts.

If the dot offset voltage changes during the drawing of a dot, the shape of that dot changes.

F. Dot-Offset Preamplifiers

The circuitry for generating the signals L, C, and T supplied on lines 136, 138, 140 as inputs to the dot-offset circuits 134 so that the latter can generate the dot-offset voltage on the line 142 is shown schematically in FIG. 1A at 112 through 128 and in detail in FIG. 20, which discloses a preferred embodiment of the photodiode array 112, photodiode switching 114, preamplifier gain switching 122, and preamplifiers 124, 126, 128.

Photodiodes 1,140 through 1,156 are arranged in a linear array so that there is a center photodiode 1,148, a pair of photodiodes 1,146, 1,150 in closely-spaced-apart relation to the center photodiode 1,148, a second pair of photodiodes 1,144, 1,152 more widely spaced apart from the center photodiode 1,148, a third pair of photodiodes 1,142, 1,154 still more widely spaced apart on opposite sides of the center photodiode 1,148, and a pair of outboard photodiodes 1,140, 1,156 still more widely spaced apart on opposite sides of the center photodiode 1,148.

The center photodiode 1,148 is always used, and so it is permanently connected by a line 1,158 to a preamplifier 1,160. The preamplifier 1,160 supplies an output to the line 118. The line 118 contains a fixed resistor 1,162 and a variable resistor 1,164 for adjusting the gain in the amplifier circuit. The signal is supplied to the preamplifier 126, and this preamplifier develops the signal C on the line 138 that is supplied to the dot-offset circuits 134.

This spacing should be adjusted to give optimum image enhancement and can be varied depending on ruling, the type of feature detail, etc. The total width of the photodiode array should generally be roughly comparable to the maximum width of one halftone dot. In prior systems, at an edge transition, dots of progressively decreasing size are drawn extending from the dark region into the light region. In accordance with the present invention, in a light-to-dark transition where the edge has a component parallel to the fast-scan direction, the dark region is detected first by the leading photodiode, then by the leading and center photodiodes, and later by all three photodiodes. In accordance with Tables I and II and the accompanying disclosure of the dot-offset logic, this results in a shift of the positions of dots first formed in a dark-to-light transition that is less than the shift of the positions of dots later formed in a dark-to-light transition. In case the dot-offset voltage changes during the formation of a dot, it also modifies the dot shape. See also FIG. 21, which represents only the shifts in positions and not the changes in dot sizes.

Photodiode switcing 114 and preamplifier gain switching 122 (FIG. 1A) are provided in order selectively to switch in different pairs of photodiodes with the center photodiode 1,148 and thereby achieve a proper correspondence between the photodiode spacing and the push distance P. As FIG. 20 shows, these comprise four four-position switches 1,168 through 1,174. These switches are mechanically, ganged, as indicated by the dotted line 123 in FIGS. 1A and 20, so that they are operated together. For example, when the switch 1,168 is at position 1,168-1, as shown in FIG. 20, the switch 1,170 is at position 1,170-1, the switch 1,172 is at position 1,172-1, and the switch 1,174 is at the position 1,174-1. The switches similarly move together to their second positions 1,168-2 through 1,174-2, their third positions 1,168-3 through 1,174-3, and their fourth positions 1,168-4 through 1,174-4. In this manner, one of the upper photodiodes 1,140, 1,142, 1,144 or 1,146 is paired with a corresponding one of the lower photodiodes 1,156, 1,154, 1,152 or 1,150 in circuit with upper preamplifiers 1,176, 124 and lower preamplifiers 1,178, 128, respectively.

For example, in the position shown, the photodiode 1,150 supplies an output on a lead 1,180 that passes through the switch 1,168 at switch position 1,168-1 and through a lead 120 to the preamplifier 1,178. The signal is amplified by this preamplifier, which produces an output that passes through the switch 1,174 at its switch position 1,174-1 and to the preamplifier 128. This preamplifier amplifies the signal further and develops the signal T on the lead 140. Similarly, the photodiode 1,146 develops a signal on the lead 1,182 that passes through the switch 1,170 at the switch position 1,170-1 and through the lead 116 to the preamplifier 1,176. The signal is amplified by this preamplifier, which develops a signal that passes through the switch 1,172 at its switch position 1,172-1 to the preamplifier 124. This preamplifier further amplifies the signal and develops the signal L on the output lead 136.

The operation of the apparatus in the other three switch positions is exactly comparable to the operation in the first switch position, except that the other switch position enable the centerline photodiode 1,148 to be matched with a pair of photodiodes on either side the distances of which from the centerline diode are progressively greater. The purpose is to adjust the correction made possible by the photodiode array 112 in dependence on the magnitude of the push distance P. In the case of a small push distance, the centerline photodiode 1,158 should be used in combination with the photodiodes 1,146 and 1,150 closely spaced apart therefrom. For a somewhat larger push distance, the centerline photodiode should be used in combination with the photodiodes 1,144 and 1,152. Switching in the photodiodes 1,142 and 1,154 would then be appropriate for a still larger push distance, and switching in the photodiodes 1,140 and 1,156 would be appropriate for the largest push distance the system is adapted to accommodate.

Associated with the switch positions 1,172-1 through 1,172-4 and with the switch positions 1,174-1 through 1,174-4 are variable resistors 1,184 through 1,198, respectively. These enable the gain to be made equal for all amplification paths and all switch positions. These adjustments are made initially and, once made, need not be changed, unless the characteristics of the photodiodes or certain other circuit conditions change.

Thus there are provided in accordance with the invention novel and highly-effective methods and apparatus facilitating the electronic reproduction of images for use in the printing art. The images as reproduced with a given screen ruling are sharper than the images as reproduced with the same screen ruling by the methods and apparatus heretofore available.

Many modifications of the represntative embodiments of the invention disclosed herein will readily occur to those skilled in the art upon consideration of this disclosure. For example, instead of the dot-position generator means 146, other means (signals prerecorded on magnetic tape, means for scanning a pre-existing halftone screen, etc.) can be employed for obtaining signals representing regularly-spaced positions of the halftone dots. Moreover, dot-offset signals can be developed using two photodiodes or more than three. In case more than three are used, they can provide a separate signal from each cell or can be tied together to produce three signals. Or, a zoom lens can be used. Also, an electroacoustic modulator means can be substituted for the galvanometers. Accordingly, the invention is not limited except by the appended claims.

We claim:

1. Apparatus comprising means for optically scanning an input image, a radiation-sensitive output film, means for generating a beam of electromagnetic radiation for forming halftone dots on said output film by which at least one output image corresponding to said input image is constituted, means including a position mirror and modulator means controlling the orientation of said position mirror for controlling the position of said beam on said output film, and means including a width mirror, modulator means controlling the orientation of said width mirror, and chopper means for independently controlling the width of said beam on said output, said position mirror being optically between said chopper means and said output film and said width mirror being optically between said generating means and said chopper means.

2. Apparatus according to claim 1 wherein said means for generating electromagnetic radiation is a laser and said beam of electromagnetic radiation is a laser beam.

3. Apparatus according to claim 1 wherein said chopper means comprises knife edge means for intercepting at least a portion of the width of said beam as reflected by said width mirror.

4. Apparatus according to claim 1 wherein said chopper means comprises chopper mirror means for reflecting a variable proportion of the width of said beam as reflected by said width mirror.

5. Apparatus according to claim 1 wherein said modulator means for said position mirror and said modulator means for said width mirror comprise galvanometer means.

6. Apparatus according to claim 5 further comprising galvanometer drive amplifier means for controlling said galvanometer means.

7. Apparatus according to claim 6 further comprising dot-forming circuit means for generating at least two output signals for input to said galvanometer drive amplifier means.

* * * * *

UNITED STATES PATENT AND TRADEMARK OFFICE
CERTIFICATE OF CORRECTION

PATENT NO. : 4,189,752

DATED : Feb. 19, 1980

INVENTOR(S) : Moe et al.

Page 1 of 2

It is certified that error appears in the above-identified patent and that said Letters Patent are hereby corrected as shown below:

Col. 5, line 4, "signals" should read --signal--; line 35, "FIGS. 6A and E" should read --FIGS. 6A and B--. Col. 6, line 17, after "that" insert --are--. Col. 7, line 37, "FIG. 10" should read --FIG. 1C--; line 39, "galvanomter" should read --galvanometer--; last line, "souce and galvanomter" should read --source and galvanometer--. Col. 8, line 15, "bean" should read --beam--; line 47, "pointand" should read --point and--. Col. 10, line 10, "block" should read --black--; line 12, "by galvanometer" should read --by a galvanometer--; line 33, "charcters" should read --characters--; line 54, "directions" should read --direction--. Col. 11, line 40, "$e_{13}$" should read --$e_3$--. Col. 14, line 3, "voltage $e_g$" should read --voltage $e_9$--. Col. 17, line 24, "ordinate of $e_c$" should read --ordinate of $e_5$--. Col. 23, line 65, "output $c_5$" should read --output $e_5$--. Col. 24, line 49, "extends" should read --exceeds--. Col. 26, line 45, "increases" should read --increase--. Col. 27, line 13, "alternatable" should read --alterable--. Col. 28, line 27, after "M-105," insert --M-75,--; line 46, "line 184" should read --line 174--; lines 48 & 49, "simultaneously"

UNITED STATES PATENT AND TRADEMARK OFFICE
CERTIFICATE OF CORRECTION

PATENT NO. : 4,189,752

DATED : Feb. 19, 1980

INVENTOR(S) : Moe et al.

It is certified that error appears in the above-identified patent and that said Letters Patent are hereby corrected as shown below:

should read --simultaneous--. Col. 29, line 10, "byan" should read --by an--; line 20, "98" should read --908--; line 51, "which the" should read --which that--. Col. 30, line 4, after "line" insert --in--. Col. 33, line 45, "not" should read --dot--. Col. 40, line 61, "mechanically, ganged" should read --mechanically ganged--. Col. 41, line 28, "position enable" should read --positions enable--; line 58, "theimages" should read --the images--. Col. 42, line 1, before "methods" insert --best--.

Signed and Sealed this

Third Day of June 1980

[SEAL]

Attest:

SIDNEY A. DIAMOND

Attesting Officer

Commissioner of Patents and Trademarks